US012040973B2

(12) United States Patent
Hart et al.

(10) Patent No.: US 12,040,973 B2
(45) Date of Patent: *Jul. 16, 2024

(54) COMMUNICATIONS METHODS, APPARATUS AND SYSTEMS FOR PROVIDING EFFICIENT AND SCALABLE MEDIA SERVICES

(71) Applicant: Ribbon Communications Operating Company, Inc., Westford, MA (US)

(72) Inventors: Justin Hart, Purton (GB); Tolga Asveren, Bordentown, NJ (US); Ashish Sharma, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,737

(22) Filed: Jun. 12, 2023

(65) Prior Publication Data
US 2023/0344758 A1    Oct. 26, 2023

Related U.S. Application Data

(63) Continuation of application No. 17/325,866, filed on May 20, 2021, now Pat. No. 11,706,135.

(30) Foreign Application Priority Data

Mar. 11, 2021  (IN) .............................. 202141010261

(51) Int. Cl.
*H04L 12/28* (2006.01)
*G06F 9/455* (2018.01)
(Continued)

(52) U.S. Cl.
CPC .......... *H04L 45/64* (2013.01); *G06F 9/45558* (2013.01); *H04L 47/2483* (2013.01);
(Continued)

(58) Field of Classification Search
CPC ..... H04L 49/70; H04L 65/65; G06F 9/45558; G06F 2009/45595
See application file for complete search history.

(56) References Cited

U.S. PATENT DOCUMENTS 10,063,415 B1 *  8/2018  Kanakarajan ....... H04L 41/0806
10,355,989 B1 *  7/2019  Panchal .................. H04L 67/10
(Continued)

*Primary Examiner* — Elisabeth Benoit Magloire
(74) *Attorney, Agent, or Firm* — Straub & Straub; Stephen T. Straub; Michael P. Straub

(57) ABSTRACT

The present invention relates to communications methods, apparatus and systems for providing media micro-services in a scalable and efficient manner. In an exemplary method embodiment, a packet plane control service entity performs the following operations: (i) receives a request from a Signaling-Session Border Controller to implement one or more micro-services on a media packet stream, the request including information about the media packet stream including stream identification information; generates instructions for one or more entities under the control of the packet plane control service entity to implement the requested one or more micro-services on the media packet stream; and communicates the generated instructions to the one or more entities under the control of the packet plane control service entity for implementation on the media packet stream.

20 Claims, 24 Drawing Sheets

(51) Int. Cl.
*H04L 45/64* (2022.01)
*H04L 47/2483* (2022.01)
*H04L 49/00* (2022.01)
*H04L 65/65* (2022.01)

(52) U.S. Cl.
CPC .............. *H04L 49/70* (2013.01); *H04L 65/65* (2022.05); *G06F 2009/45595* (2013.01)

(56) References Cited

U.S. PATENT DOCUMENTS

| | | | | |
|---|---|---|---|---|
| 2010/0166153 | A1* | 7/2010 | Guleria | H04L 65/1076 379/45 |
| 2015/0319078 | A1* | 11/2015 | Lee | H04L 45/12 370/392 |
| 2018/0054355 | A1* | 2/2018 | Balser | H04L 41/0806 |
| 2018/0337862 | A1* | 11/2018 | Sharma | H04L 43/0829 |
| 2020/0099625 | A1* | 3/2020 | Yigit | H04L 45/302 |

* cited by examiner

| Bit Offset | 0-1 | 2 | 3 | 4-7 | 8 | 9-15 | 16-31 |
|---|---|---|---|---|---|---|---|
| 0 | Version | Padding | Ext. | CSRC Count | Marker | Payload Type | Sequence Number |
| 32 | Timestamp ||||||||
| 64 | Synchronization Source (SSRC) Identifier |||||||
| 96 | Contributing Source (CSRC) Identifier |||||||
| 96+32*CC | Payload |||||||

FIGURE 18

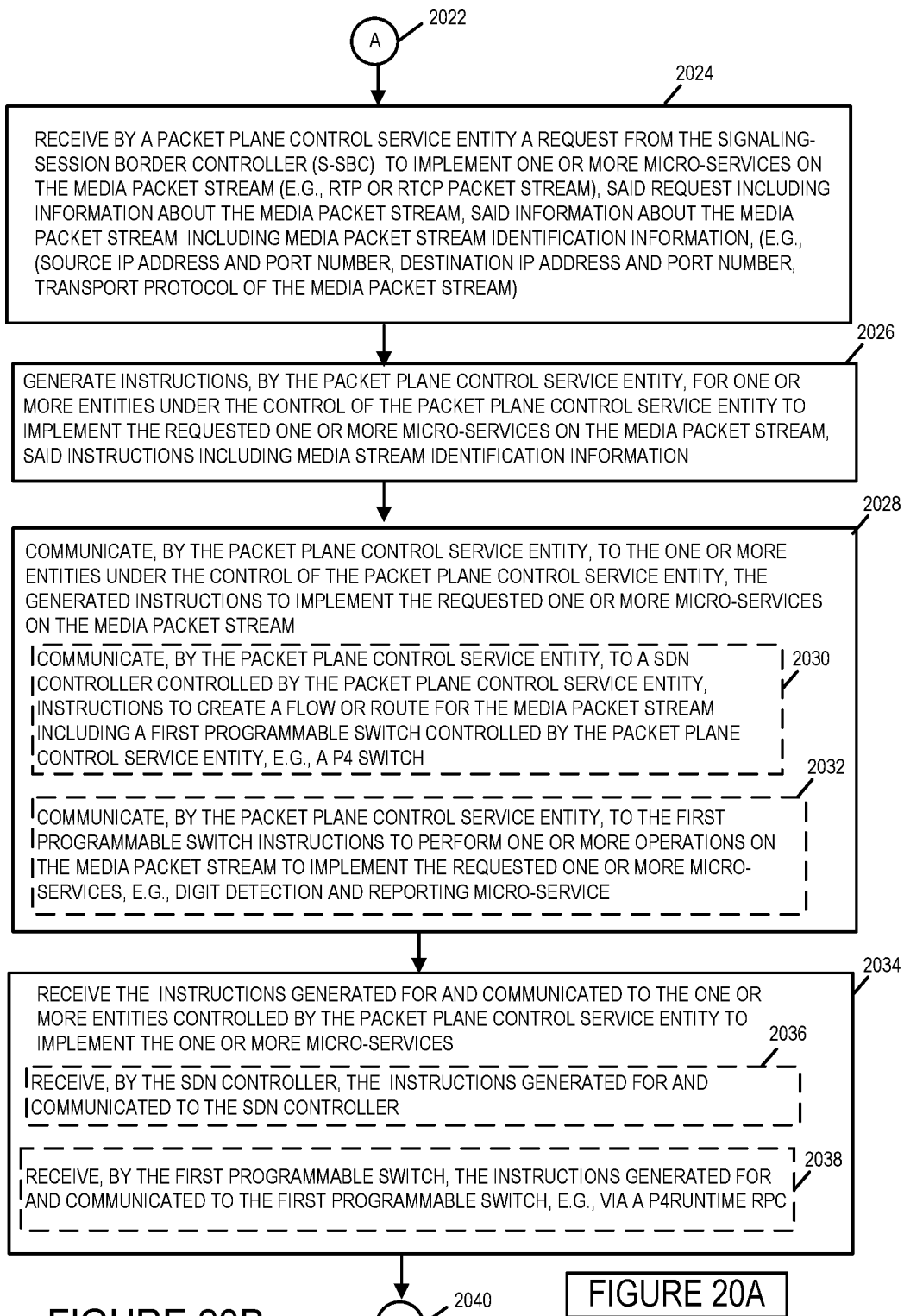

COMMUNICATIONS METHODS, APPARATUS AND SYSTEMS FOR PROVIDING EFFICIENT AND SCALABLE MEDIA SERVICES

RELATED APPLICATIONS

The present application is a continuation of U.S. patent application Ser. No. 17/325,866 filed on May 20, 2021 which published as U.S. Patent Application Publication No. 2022-0294732 A1 on Sep. 15, 2022 and which claims the benefit of Indian Provisional Patent Application Serial No. 202141010261 which was filed on Mar. 11, 2021. Each of the aforementioned U.S. applications and publications is hereby expressly incorporated by reference in its entirety.

FIELD OF INVENTION

The present invention relates to communications methods, systems and apparatus for providing media services for real time media flows in an efficient and scalable manner.

BACKGROUND

A key change in the communications landscape is that the Openflow protocol (which is used to push flows to a Software Defined Network (SDN) enabled switch) is being increasingly sunset or phased out by vendors. The latest versions of the Openflow protocol specifications are not even publicly available. With less and less support by the open source and wider communities it seems the future for mass adoption of Openflow may be limited. However, in its place a more flexible and efficient mechanism in the form of P4 (named for "Programming Protocol-independent Packet Processors") which has matured as an alternative/replacement technology. This technology goes further than Openflow in that it not only offers more extensive/flexible switch configuration (in P4 enabled switches) by default, but also includes a runtime execution environment that allows application/controllers to define their own packet processing behavior.

The traditional model for a Session Border Controller (SBC) is an integrated unit consisting of control and data plane. The control plane handles call signaling (Session Initiation Protocol), and specifies how the Internet Protocol (IP) packets for media pass through its data plane. And by virtue of this interaction the SBC is able to police, control, modify and otherwise impact the packets that are specifically routed through it.

Although this traditional approach has performed as required for many years, it has limitations and could be far more effective if the SBC were able to influence Internet Protocol flows at other points in the network and not just as the packets hit the SBC's packet plane; also sometimes referred to as a data plane herein. For example, it is typically desirable to block "bad" flows/packets, e.g., denial of service attack flow/packets as early as possible by moving the decision to forward or drop as close to the source as possible. Likewise an SBC is often expected to guarantee bandwidth for certain classes of traffic and indeed prioritize how to allocate contended bandwidth among flows based on one or more policies or rules. There is a limit to the SBC's effectiveness to do this task, when it is only able to perform this function at the point where the packets cross its data plane. The SBC has no visibility or influence on how bandwidth is utilized at other points in the network.

A conventional integrated or distributed SBC provides media services that include, among other things, Denial of Service (DOS)/Distributed Denial of Service (DDOS) protection, bandwidth policing, topology hiding, IPv4/IPv6 interworking, VLAN (Virtual Local Area Network) tagging, DSCP (Differentiated Services Code Point) marking, Network Address and Port Translation (NAPT), Far end Network Address and Port Translation Learning, and RTP/RTCP (Real-time Transport Protocol) Inactivity detection. These services need to be provided independent of whether the flow is relayed or requires media interworking. However, in conventional approaches the SBC is only able to effectuate these functions by taking an action when it receives the media packets of a media packet flow for a media stream that is when the packet flow hits the SBC's data plane. This results in congestion and bottlenecks at the SBC and requires that for the SBC to be able to scale up as the number of sessions increases the SBC must be able to scale both its session establishment and control processing capabilities (SIP capabilities) as well as its media resources capabilities. As the SBC is limited in the number of media sessions it can service by the amount of media resources/bandwidth it has available. If it only has media resources for N call sessions, e.g., Voice Over Internet Protocol sessions, it can only handle the control signaling for establishing N call sessions.

From the above discussion, it is apparent that there is a need for new and or improved systems and/or SBCs that are more efficient and effective which can provide and/or effectuate media services and impact packets/flows closer to their sources. There is also a need for systems that can provide media services in a scalable manner wherein providing media services is independent of dedicated media resources in an SBC controlling the signaling for the media session. There is a further need for new and improved methods, apparatus and systems that allow for SBCs to provide media services without anchoring the media sessions or flows at the SBC even though the SBC is anchoring the control signaling for the session. There is a further need to provide new and/or improved methods and/or apparatus for providing media services not currently available with the constraints of Openflow protocol and other current SDN protocols. There is a further need to be able to supplement media services in SDN networks by the addition of new elements without the need for upgrading all of the SDN switches already deployed in the SDN network. There is a further need for new and/or improved system architectures that can leverage existing P4 infrastructure already deployed at edge nodes to offload media processing at the edge of a network without resorting to loading a media specific device or virtual machine.

SUMMARY

The present invention is directed to various features relating to communications methods, systems and apparatus. One or more embodiments of the present invention addresses one or more of the various technical problems described above and herein and improves upon the efficiency and scalability of systems and/or SBCs and/or network architectures used for providing media services such as for example micro-services on media streams and/or flows.

Various embodiments of the present invention have one or more of the following advantages over conventional systems: (1) micro-services for media flows are realized from a network wide perspective using the underlying SDN devices supplemented by P4 enabled devices for micro-services which can not be provided by SDN enabled devices; (2)

enables a highly scalable and resilient model that is not otherwise realizable with a conventional SBC integrated or distributed SBC model; (3) reduces backhaul costs and additional hardware resources for media termination since media relay network elements are no longer required; (4) provides end-to-end Service Level Agreement (SLA) control; (5) allows for media manipulation services, e.g., transcoding without having to relay media streams or flows to SBCs or dedicated media manipulation devices such as for example transcoders.

The present invention leverages the capabilities of P4 devices to create a new architecture in which media microservices can be provided in an efficient and scalable manner.

An exemplary method in accordance with an embodiment of the present invention includes the steps of: receiving by a packet plane control service entity a request from a Signaling SBC (S-SBC) to implement one or more microservices on a media packet stream (e.g., RTP or RTCP packet stream), said request including information about the media packet stream, said information about the media packet stream including media packet stream identification information, said one or more micro-services including a first micro-service; generating instructions, by the packet plane control service entity, for one or more of entities under the control of the packet plane control service entity to implement the requested one or more micro-services on the media packet stream; and communicating, by the packet plane control service entity, the generated instructions to the one or more entities under the control of the packet plane control service entity to implement the requested one or more micro-services on the media packet stream.

In some embodiments, the method further includes the step of advertising by the packet plane control service entity the types of micro-services, the packet plane control service can implement to the S-SBC.

In some embodiments, the one or more entities under the control of the packet plane control service entity includes: one or more Software Defined Networking (SDN) controllers, one or more programmable switches, and one or more programmable network interface cards. The one or more programmable switches may be, and in some embodiments are, P4 switches. In some embodiments, the one or more programmable network interface cards are P4 enabled network interface cards.

In various embodiments of the invention, each of said one or more SDN controllers control one or more programmable switches, each of said one or more programmable switches being either a SDN switch, a P4 switch, or an enhanced SDN switch with both SDN capabilities and P4 capabilities. In some embodiments, the SDN controller and the packet control service entity each only control a sub-set of the functionality on the one or more P4 devices. In some of such embodiments, the SDN controller controls the P4 devices pass-through and routing functions used to generate a flow path or route and the packet plane control service controls the P4 devices functionality to perform micro-services on the media packets flowing through the P4 device such as for example digit detection and reporting or transcoding of the media.

In some embodiments, each of the one or more programmable switches controlled by one of the one or more SDN controllers is not also controlled by another SDN controller. That is first SDN controller may control SDN switches in a first IP connectivity domain and a second SDN controller may control SDN switches in a second IP connectivity domain with the packet plane control service entity controlling both the first SDN controller and the second SDN controller.

In some embodiments, the one or more SDN controllers include a first SDN controller controlling a first SDN switch located in a first Internet Protocol address domain and a second SDN controller controlling a second SDN switch located in a second domain.

In some embodiments, prior to generating said instructions for said one more entities, determining by the packet plane control service entity: (i) which of the one or more entities under the control of the packet plane control service entity can implement the requested one or more micro-services on the media packet stream or (ii) which combination of the one or more entities under the control of the packet plane control service entity can implement the requested one or more micro-services on the media packet stream.

In some embodiments, the method further includes the steps of: sending to the S-SBC a first IP address and port number for sending packets of the media packet stream upon which the one or more micro-services is to be performed; and sending to the S-SBC a second IP address and port number from which the packets of the media packet stream upon which the one or more micro-services has been performed will be egressed.

In some embodiments, the method further includes the packet plane control service entity maintaining network topology information including information on each of the programmable devices, e.g., SDN switches, P4 switches, P4 SmartNIC devices under the packet plane control service entity's control as well as information on the current utilization of each of those devices. In some of such embodiments, the packet plane control service determines the devices under its control through which packets of the media packet stream are to be routed. The instructions generated by the packet plane control service entity for each of the devices through which packets of the media packet stream are to be routed including information for each device to establish the flow, e.g., ingress and egress IP and/port number addressing for each device through which the packet is to flow. For example, the packet plane control service identifying for each device an ingress 5-tuple (source IP address, port number, destination IP address and port number, transport protocol) and an egress 5-tuple (source IP address, port number, destination IP address and port number, transport protocol).

In some embodiments, the first micro-service is a service which cannot be performed by an Openflow SDN switch.

In some embodiments, the one or more micro-services includes one of the following: (i) a media digit detection and reporting service; (ii) a media manipulation service (e.g., media transcoding operation); (iii) a Real-time Transport Protocol (RTP) payload type interworking service; (iv) a RTP sequence number manipulation service; (v) a RTP Synchronization Source (SSRC) Identifier manipulation service (e.g., modifies the SSRC identifier of a RTP packet header); (vi) reporting RTP statistics services; (vii) reporting Real-time Transport Control Protocol (RTCP) statistics service; (viii) a flow identification based on QUIC connection-id service; or (ix) performing an action service on an Internet Protocol (IP) packet or a portion of an IP packet based on a regular expression match on the payload of the IP packet (e.g., dropping an IP packet which has an IP payload which matches a particular expression or matching criteria). QUIC being a transport layer network protocol.

In some embodiments, the one or more micro-services includes one or more of the following: (i) topology hiding for media flows by address rewrites (of L2/L3 and L4 Internet Protocol packet header) for each flow entry; (ii) Internet Protocol version 4 (IPv4) and Internet Protocol version 6 (IPv6) interworking; (iii) metering of each identified flow using metered table; Differentiated Services Code Point (DSCP) marking or DSCP pass-through, Virtual Local Area Network (VLAN) tagging for each media flow using L2 rewrite; (iv) packet statistics counted or determined for each flow; (v) Far end Network Address Translation (NAT) traversal; (vi) Real-time Transport Protocol (RTP) inactivity detection, (vii) RTP forking to support legal interception and recording including adding new header programmatically using P4 Runtime gRPC which is an open source remote procedure call (RPC); and (viii) rogue media detection.

Another exemplary method embodiment of the present invention includes the steps of: receiving by a packet plane control service entity a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; determining, by the packet plane control service entity, whether the first micro-service can be implemented by one or more programmable switches being controlled by a first SDN controller; and in response to determining that the first micro-service can not be implemented by one or more programmable switches being controlled by the first SDN controller, determining whether the first micro-service can be implemented by a first programmable switch not controlled by the first SDN controller.

In some embodiments, the method further includes that in response to determining that the first micro-service can be implemented by a programmable switch not controlled by the SDN controller, the packet plane control service entity is operated to: (i) generate instructions to control the first programmable switch to implement the first micro-service; and (ii) send the generated instructions to the first programmable switch.

In some embodiments, the method further includes the steps of: generating instructions, by the packet plane control service entity, to control the first SDN controller to establish a flow through one or more programmable switches (e.g., SDN switches) to route packets of the media packet stream to the first programmable switch; and communicating to the first SDN controller said generated instructions to control the first SDN controller.

In some embodiments, the generated instructions to control the first SDN controller include instructions to generate a flow path for the media packet stream from an ingress peer Internet Protocol address and port number to an Internet Protocol address and port number of the first programmable switch, said ingress peer Internet Protocol address and port number being part of the media packet stream information provided by the S-SBC to the packet plane control service entity.

In some embodiments, the Internet Protocol address and port number of the first programmable switch is provided to the packet plane control service entity by the first programmable switch in response to receiving the instructions communicated from the packet plane control service entity.

In some embodiments, the method includes the additional steps of: sending, by the packet plane control service entity, an ingress IP address and port number of a programmable switch controlled by the first SDN controller to the S-SBC to which packets of the media packet stream are to be directed; and sending, by the packet plane control service entity, an egress IP address and port number of the first programmable switch from which packets of the media packet stream will be egressed after the first programmable switch has performed the first micro-service on the packets.

In some embodiments, prior to generating said instructions to control the first SDN controller, the packet plane control service entity determines whether data packets of the media packet stream need to be routed through one or more programmable switches controlled by the first SDN controller (e.g., SDN switches which do not have the capability to perform the first micro-service) to reach the first programmable switch (e.g., the originating device of the media stream is connected or coupled to SDN switches in a first IP domain controlled by the first SDN controller and the first programmable switch is in a second IP domain, packet plane control service being able to send instructions to control the SDN controller in the first IP domain as well as being able to send instructions to the first programmable switch to control its operations in the second IP domain), and performs said operation of generating said instructions to control the first SDN control in response to determining that the data packets of the media packet stream need to be routed through one or more programmable switches controlled by the first SDN controller to reach the first programmable switch.

In some embodiments, the generated instructions generate instructions to control the first programmable switch to implement the first micro-service include said media stream identification information.

In various embodiments, the first programmable switch is a Programming Protocol-Independent Packet Processors (P4) switch and instructions sent to the first programmable switch typically define the micro-service operations to be performed by the first programmable switch.

In various embodiments, the first micro-service includes one of the following: (i) a media digit detection and reporting service; (ii) a media manipulation service (e.g., transcoding operation); (iii) a Real-time Transport Protocol (RTP) payload type interworking service; (iv) a RTP sequence number manipulation service; (v) a RTP SSRC manipulation service; (vi) reporting RTP statistics services; (vii) reporting RTCP statistics service; (viii) a flow identification based on QUIC connection-id service; or (ix) performing an action service on an Internet Protocol (IP) packet or a portion of an IP packet based on a regular expression match on the payload of the IP packet (e.g., dropping an IP packet which has an IP payload which matches a particular expression or matching criteria).

In some embodiments, the packet plane control service entity is an application implemented on a first virtual machine executing on a first compute node in a cloud.

In some embodiments, the S-SBC is an application implemented on a second virtual machine executing on the first compute node.

In some embodiments, the packet plane control service entity is an application implemented on a first container executing on a first compute node in a cloud.

In some embodiments, the S-SBC is an application implemented on a second container executing on the first compute node or a second compute node in the cloud.

In some embodiments, the generated instructions are P4Runtime instructions which are executed during runtime by the first programmable switch to implement the first micro-service on the media packet stream.

In some embodiments, the method further includes the step of: receiving, at the packet plane control service entity, information about the capabilities of the first SDN controller and the programmable switches controlled by the first SDN controller prior to determining, by the packet plane control service entity, whether the first micro-service can be implemented by one or more programmable switches being controlled by a first SDN controller.

In come embodiment, the method further includes the step of receiving at the S-SBC prior to sending said request for said one or more micro-services to said packet plane control service entity, session initiation negotiation messages for initiating a session including the media packet stream between a first device and a second device, said session initiation negotiation messages including media stream identification information.

In some embodiments, the session initiation negotiation messages are Session Initiation Protocol (SIP) messages including SDP messages.

In some embodiments, the session initiation negotiation messages include a Session Description Protocol (SDP) Offer message from the first device and a SDP answer message from the second device.

In some embodiments, the session initiation negotiation information includes a first Internet Protocol address and port number to be used by the first device for the media packet stream, a second Internet Protocol address and port number to be used by the second device for the media packet stream and the transport protocol to be used for the media stream.

The present invention is applicable to apparatus and system embodiments wherein one or more devices implement the steps of the method embodiments. In some apparatus embodiments the packet plane control service entity, Signaling-SBC, controllers, e.g., SDN controllers, programmable switches/devices including for example, P4 switches/devices (such as for example devices programmed using $P4_{16}$ programming language, SDN switches, e.g., Openflow switches, and SmartNIC P4 devices, include one or more processors and a memory. The memory including instructions when executed by the one or more processors control the apparatus to operate to perform the steps of various method embodiments of the invention.

An exemplary communications system in accordance with an embodiment of the present invention includes: a packet plane control service entity that includes memory and a processor. The processor controlling the packet plane control service entity to perform the following operations: receive, by a packet plane control service entity, a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; generate instructions, by the packet plane control service entity, for one or more of entities under the control of the packet plane control service entity to implement the requested one or more micro-services on the media packet stream; and communicate, by the packet plane control service entity, the generated instructions to the one or more entities under the control of the packet plane control service entity to implement the requested one or more micro-services on the media packet stream.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 18 illustrates the format of a Real-time Transport Protocol packet including RTP packet header fields and RTP packet payload.

FIG. 20 comprises the combination of FIGS. 20A, 20B, and 20C.

FIG. 20B illustrates a second part of a flowchart of an exemplary method in accordance with an embodiment of the present invention.

DETAILED DESCRIPTION

SDN (Software Defined Networking) defines an architectural approach to building networks, primarily focusing on the separation of the control and data planes to allow more flexibility in how the control plane is built and what it exposes to applications. As more networks adopt SDN concepts, it opens up opportunities to redefine how an application such as a Session Border Controller (SBC) functions in an SDN environment.

As previously discussed, the traditional model for an SBC is a more or less vertically integrated unit, with a tightly coupled control and data plane of its own. The control plane is call signaling (Session Initiation Protocol) aware, and the SBC uses this information to dictate how the Internet Protocol (IP) packets for media pass through its data plane. And by virtue of this interaction the SBC is able to police, control, modify, and otherwise impact the packets that are specifically routed through it.

Be it an integrated SBC model or a distributed SBC model, the SBC is able to police media traffic specifically routed through it. However, the conventional SBC is constrained in that it is limited to providing media services to only those flows/packets which are specifically routed through it as the media packets/flows pass through it.

With the advent of Software Defined Networking, the entire network's forwarding plane (i.e., SDN-enabled switch infrastructure) can be used as one big data plane for the SBC. By using the SBC control plane (acting similar to an application on top of the SDN controller) and programming flow forwarding rules (typically via a controller) in SDN switches (e.g., programmable switches such as Open Flow (OF) enabled switches, the SBC can adjust the flow behavior of packets dynamically across the network. In other words, media forwarding rules can be applied at programmable switches directly as opposed to routing media streams through the SBC or to another media-aware node such as for example a media processing node. While the OpenFlow protocol is the most well-known of the SDN protocol for southbound Application Programming Interfaces (APIs), it is not the only one available. The same or similar approach can be used for non-openflow enabled or vendor specific switches using Network Configuration Protocol (NetConf), HTTP, or OPFlex to communicate with the switches and routers to install and make configuration changes.

However, Software Defined Networks including those networks implemented using the Openflow protocol have various limitations and drawbacks which will be discussed below.

Figure 1:
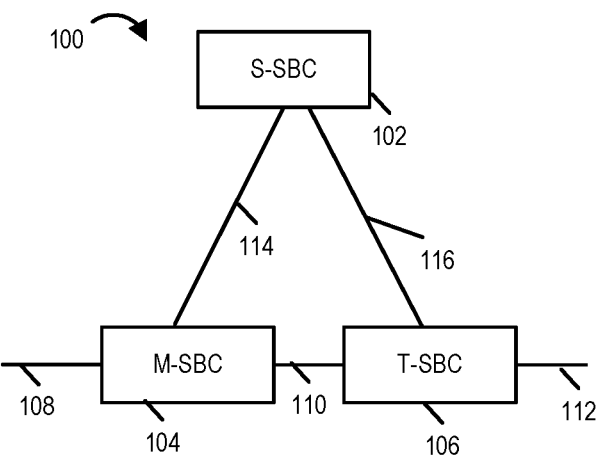
FIG. 1 illustrates a distributed SBC architecture with a S-SBC, M-SBC and a T-SBC.

Diagram 100 of FIG. 1 illustrates an existing Session Border Controller distributed architecture. The distributed SBC architecture includes 3 main components a signaling-SBC (S-SBC) 102, a Media-SBC (M-SBC) 104 and a Transcoding-SBC (T-SBC) 106. The S-SBC performs signaling communications operations for establishing and maintaining a flow. The M-SBC performs media packet processing on the media of a media packet flow, e.g., a Real-time Transport Protocol packet flow. The T-SBC performs media manipulation packet processing operations, e.g., audio transcoding, on the media of a media packet flow. The diagram 100 shows the three components being connected via communications paths 114, 116, 110 which are used to communicate information, messages, and instructions. Communications lines 108 and 112 illustrate links to peer devices or nodes on which messages containing media are received by or transmitted from the distributed SBC architecture. A significant drawback of this architecture is that for many applications, all three components of the distributed SBC architecture (S-SBC, M-SBC, and T-SBC) are required.

The following U.S. Patent and U.S. Patent Application Publication discuss the use of SBCs in SDN networks: (i) U.S. Pat. No. 10,587,502 which issued on Mar. 10, 2020 entitled, Communications Methods, Apparatus and Systems for Providing Scalable Media Services in SDN Systems; and (ii) U.S. Patent Application Publication No. US 2018-0337862 A1, which published on Nov. 22, 2018, entitled Communications Methods and Apparatus. The aforementioned U.S. Patent and U.S. Patent Application publication are hereby explicitly incorporated herein by reference in their entirety.

The present invention overcomes some of the drawbacks of current Software Defined Networking architectures through the use of Protocol Independent Switch Architecture (PISA) elements such as for example network equipment, software and hardware switches, routers, and network interface cards (NICs). In various embodiments of the present invention, models are implemented that center around the utilization of Software Defined Networking (SDN) and Programming Protocol-independent Packet Processors technologies as the core of the networking architecture. The combination of these technologies allows for flexibility and provides advantages regarding the ability to provide services using SDN capabilities when they are available without prohibiting deployment of the services when the SDN capabilities are not available.

Figure 2:
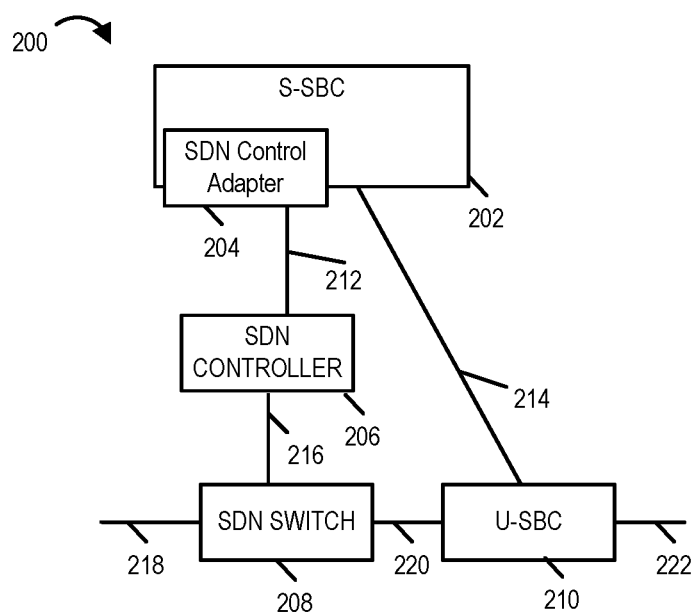
FIG. 2 illustrates an exemplary system in accordance with an embodiment of the present invention.

FIG. 2 illustrates an exemplary system 200 in accordance with a first exemplary embodiment of the present invention. In the architecture of system 200, there is a S-SBC 202 with a SDN Control Adapter component 204, a Software Defined Networking Controller (SDN controller) 206, a SDN Switch 208 and new element a User plane-SBC (U-SBC) 210. In some embodiments, the SDN Control Adapter is a separate element, device or application from the S-SBC which is coupled to the S-SBC 202 and the SDN Controller 206. Communications links 212, 216, 214 and 220 couple and/or connect the various elements of the system as shown and allow for the communication and exchange of signals, information, data, instructions, and/or messages between the various elements of system 200. The communications link 218 illustrates a link to peer devices and/or nodes on which messages containing media are exchanged with SDN switch 208, i.e., messages are received by the SDN switch 208 from the peer devices and/or nodes or are transmitted to the peer devices and/or nodes from the SDN switch 208. The communications link 222 illustrates a link to peer devices and/or nodes on which messages containing media are exchanged with U-SBC 210, i.e., messages are received by the U-SBC 210 from the peer devices and/or nodes or are transmitted to the peer devices and/or nodes from the U-SBC 210. While only a single SDN switch 208 is shown for purposes of illustrating the system architecture, it should be understood that in a typical system a plurality of SDN switches are employed, said plurality of SDN switches being controlled by the SDN controller 206. Similarly, a plurality of U-SBC 210 and a plurality of S-SBC 202 may be implemented.

In a second exemplary embodiment of the invention, SDN controller 206 and SDN switch 208 either do not exist or the operator/network service provider/enterprise customer is unwilling to provide access to the control Application Programming Interfaces for these elements and/or components.

Figure 3:
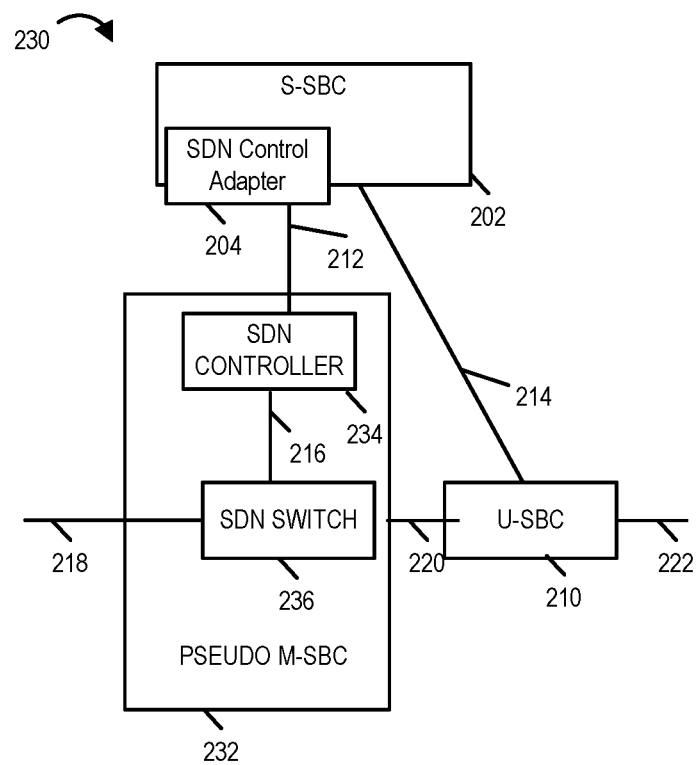
FIG. 3 illustrates another exemplary system in accordance with an embodiment of the present invention.

In such an embodiment, a network equipment provider can provide the SDN controller and/or the SDN switch or SDN switches (in a Virtual Machine (VM) or container) as if these elements and/or components are an M-SBC, e.g., a pseudo M-SBC. FIG. 3 illustrates system 230 which includes pseudo M-SBC 232 which includes the SDN capabilities of an SDN controller 234 and SDN switch 236 shown as sub-components of the pseudo M-SBC 232.

In various embodiments, the U-SBC is a user-plane element that is limited to a single Virtual Machine. In system 100 this functionality is split between the M-SBC and T-SBC. Most of the packet policing and header manipulation functionality can be off loaded to a PISA switch, e.g., a P4 capable switch. This leaves a few genuinely media-focused features that for economy and efficiency reasons have been hosted in the M-SBC VM previously but would in various embodiments of the invention being migrated to the U-SBC. The name U-SBC referring to its user plane functionality.

Figure 4:
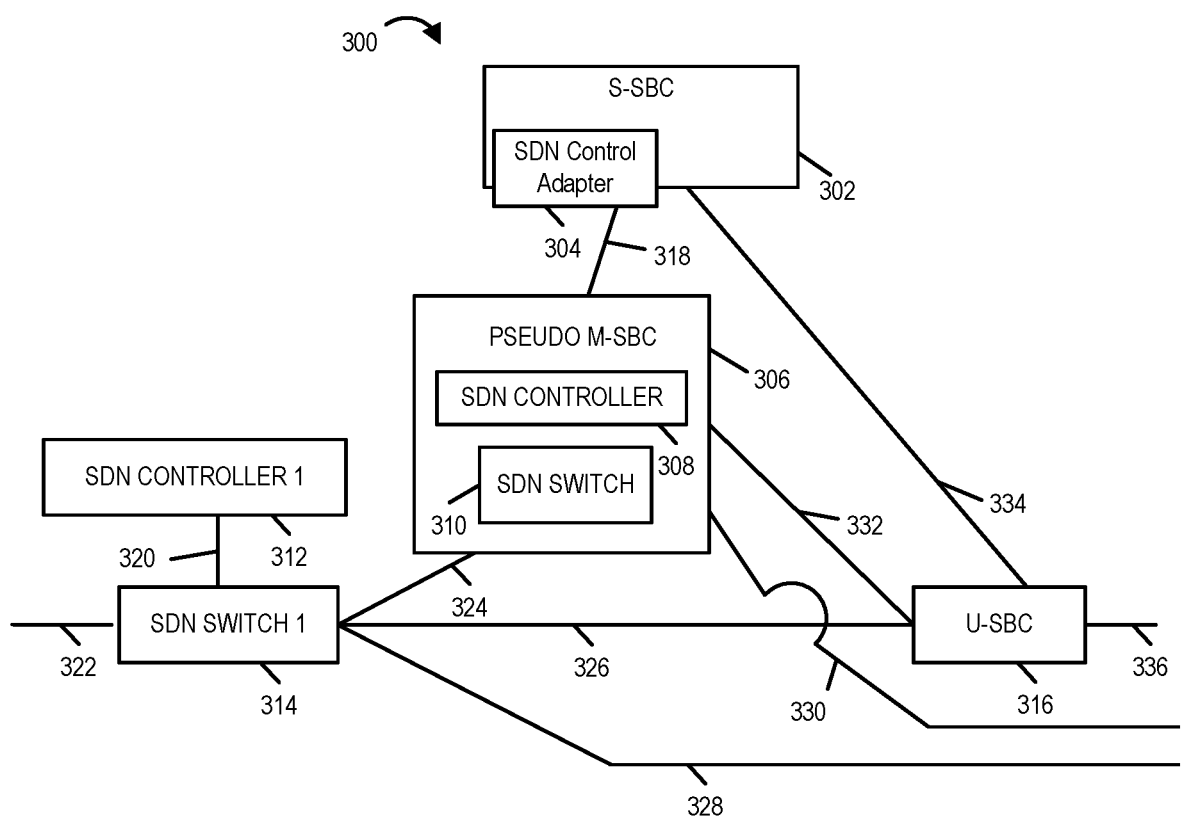
FIG. 4 illustrates another exemplary system in accordance with an embodiment of the present invention.

Exemplary system 300 shown in FIG. 4 illustrates a third exemplary embodiment of the present invention. In this deployment model, exemplary system 300 is a hybrid of system 200 shown in FIG. 2A and system 230 shown in FIG. 2B. This deployment model is useful in situation where the environment does have an SDN capability exposed to applications, but the version of the SDN software is lacking one or more features needed to provide various services (either due it being an older release or because the is uncomfortable or unwilling to expose certain capabilities to applications which the operators only trust to a limited extent.

In the architecture of system 300, there is a S-SBC 302 with a SDN Control Adapter component 304, a Pseudo M-SBC 306 which includes Software Defined Networking Controller element or component and/or functionality 306 and an SDN switch and/or functionality 310 typically implemented on a virtual machine as previously described. SDN controller 1 312, SDN Switch 1 314, and U-SBC. In some embodiments, the SDN Control Adapter 304 is a separate element, device or application from the S-SBC 302 which is coupled to the S-SBC 302 and the Pseudo M-SBC 306. Communications links 318, 320, 322, 324, 326, 328, 330, 332, 334 and 336 couple and/or connect the various elements of the system as shown and allow for the communication and exchange of signals, information, data, instructions, and/or messages between the various elements of system 300. The communications link 322 illustrates a link to peer devices and/or nodes on which messages containing media are exchanged with SDN switch 314, i.e., messages are received by the SDN switch 1 314 from the peer devices and/or nodes or are transmitted to the peer devices and/or nodes from the SDN switch 314. The communications link 336 illustrates a link to peer devices and/or nodes on which messages containing media are exchanged with U-SBC 336, i.e., messages are received by the U-SBC 336 from the peer devices and/or nodes or are transmitted to the peer devices and/or nodes from the U-SBC 316. The communications link 328 illustrates a link to peer devices and/or nodes on which messages containing media are exchanged with SDN Switch 1 314, i.e., messages are received by the SDN Switch 1 314 from the peer devices and/or nodes or are transmitted to the peer devices and/or nodes from the SDN switch 1 314. The communications link 330 illustrates a link to peer devices and/or nodes on which messages containing media are exchanged with M-SBC 306, i.e., messages are received by the M-SBC 306 from the peer devices and/or nodes or are transmitted to the peer devices and/or nodes from the M-SBC 306. Communications link 318 couples and/or connects the S-SBC 302 via SDN Control Adapter 304 to Pseudo M-SBC 306. Communications link 334 couples and/or connects S-SBC 302 to U-SBC 316. Communications link 332 couples and/or connects Pseudo M-SBC 306 to U-SBC 316. Communications link 320 couples and/or connects SDN Controller 1 312 to SDN Switch 1 314. Communications link 324 couples and/or connects Pseudo M-SBC 306 to SDN Switch 1 314. Communications link 326 couples and/or connects SDN Switch to U-SBC 316. In system 300, the behavior of the media flows depends on the type of functionality required by the session. For the most basic manipulations, the operator's SDN switch 1 314 can be programmed to direct the media. If the media flow requires more extensive features, the SDN Switch 1 314 can be, and in some embodiments is, programmed to direct the flow to the SDN Switch 310 which is part of the Pseudo M-SBC 306, which provides a richer set of services/capabilities. When the packet media flow requires extensive packet reconstruction and/or media manipulation, such as for example transcoding, then the media flow of the session can be further directed to the U-SBC 336.

The distributed architecture of the present invention also provides the advantage of being able to leverage PISA nodes/elements, e.g., P4 infrastructure nodes/elements, when they are already deployed at the Edge Node to "off load" the media processing at the Edge of a network without resorting to loading a media specific Virtual Machine.

In the distributed architecture of various embodiments of the present invention a session aware application (e.g., S-SBC) identifies the type of media flow to be established at the time of establishment and dynamically creates the flow using programmable elements and/or components, e.g., a U-SBC or PISA element or component such as a P4 switch, network interface card, router, or network equipment, e.g., virtual network equipment device or function and/or SDN switches, that can be accessed and programmed via a SDN controller using OpenFlow protocol, Open vSwitch Database Management Protocol (OVSDB), Network Configuration Protocol (NETCONF), Cisco Application Specific Integrated Circuit (ASIC) Switch protocol or OPFlex protocol.

A brief description of an exemplary SDN switch architecture and functionality will now be provided followed by a brief description and of an exemplary PISA element.

The exemplary SDN switch will be an openflow SDN switch and the exemplary PISA element will be a P4 (Programming Protocol-independent Packet Processors element.

Figure 13:
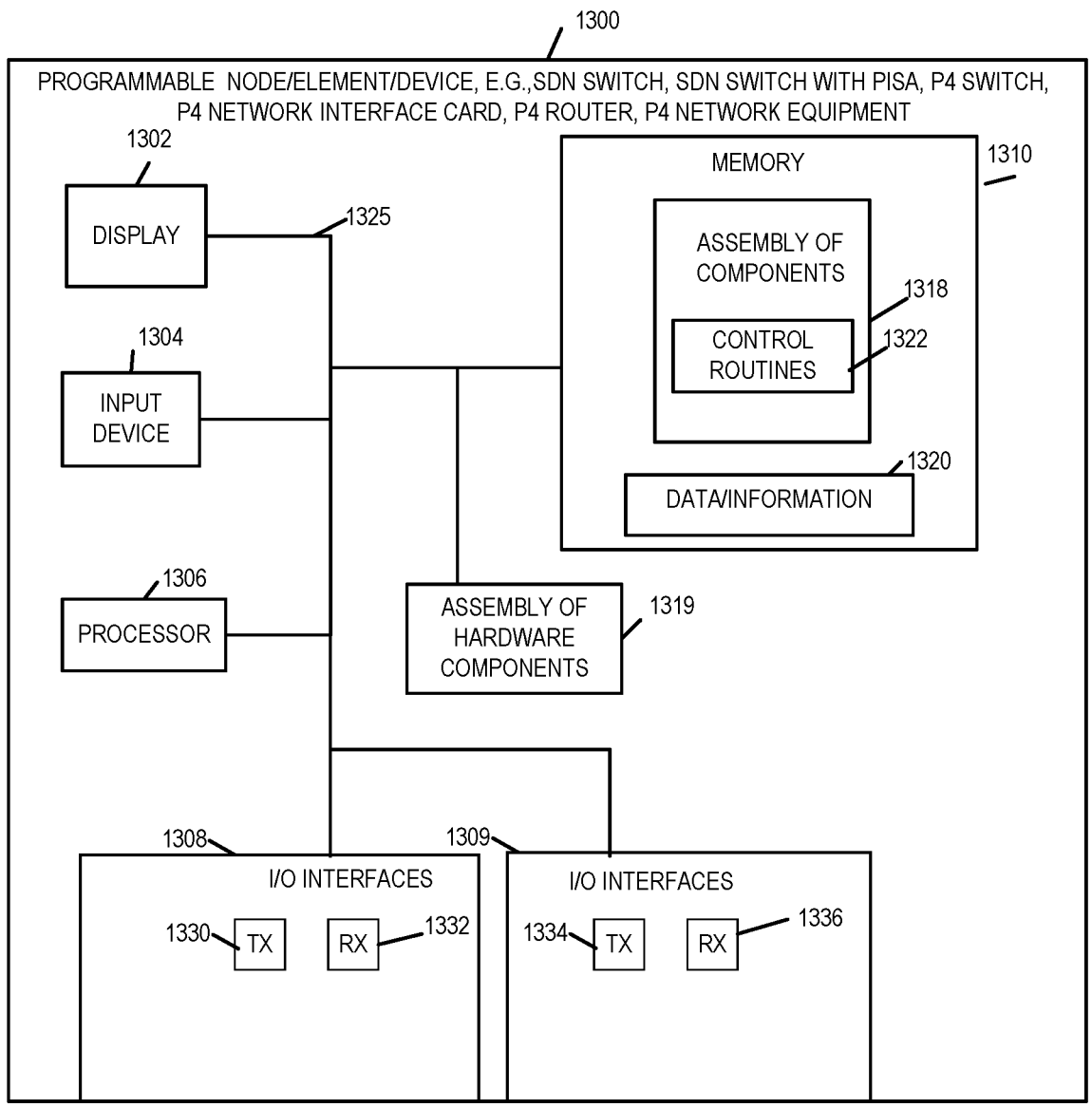
FIG. 13 illustrates details of an exemplary node, element or device in accordance with an embodiment of the present invention.

FIG. 13 illustrates an exemplary programmable node, element, or device 1300, e.g., a programmable switch such as a SDN switch, PISA switch or element, or a P4 switch or element, P4 network interface card, P4 router, P4 network equipment in accordance with an embodiment of the present invention. Exemplary programmable node, element or device 1300 includes a display 1302, an input device 1304, a processor 1306, e.g., a CPU, input/output (I/O) interfaces 1308 and 1309, which couple the element, node or device, e.g., programmable switch, to a core network or various other devices, nodes or elements including for example remote devices, SBC devices, controller(s), switches, and endpoint devices, such as user equipment, memory 1310, and an assembly of components 1319, e.g., circuits corresponding to different components, coupled together via a bus 1325 over which the various elements may interchange data and information. Memory 1310 includes an assembly of components 1318, e.g., an assembly of software modules, and data/information 1320. The assembly of components 1318 includes a control routines component 1322 which when processed and executed by the processor 406 controls the operation of the programmable node, element or device 1300 to perform various functions and/or one or more steps of the various method embodiments of the invention. The I/O interfaces 1308 include transmitters 1330 and receivers 1332. The I/O interfaces 1309 include transmitters 1334 and receivers 1336. The I/O Interfaces include hardware transmitters and receivers. The programmable node, element, or device 1300 is also configured to have a plurality of Internet Protocol (IP) address/transport number pairs, e.g., logical IP address/transport number pairs, for use in exchanging signaling information, e.g., SIP signaling messages for establishing media sessions, and media, e.g., Real-time Protocol Packets of a media session. The programmable node, element or device has a plurality of public IP/transport number pairs as well as private IP/transport number pairs used for media sessions.

The I/O interfaces in some embodiments are configured to communicate in accordance with the Internet Protocol, Transport Control Protocol, User Datagram Protocol (UDP), Session Initiation Protocol (SIP), Session Description Protocol (SDP), OpenFlow protocol, P4 interface and/or one or more proprietary protocols. In some embodiments, the programmable node, element, or device 1300 includes a communication component configured to operate using IP, TCP, UDP, SIP, SDP, SDN protocols, e.g., OpenFlow protocol, P4 protocol methods. In some embodiments, the communications component is a hardware component, a software component or component including hardware and software components. In some embodiments, the programmable node, element, or device 1300 includes one or more components for implementing received instructions, e.g., instructions received from a S-SBC or an SDN controller, the instructions including for example identifying packets of a media packet flow and performing actions, e.g., media manipulation, upon the packets of a media packet flow. In some embodiments, the instructions include matching a packet to a flow based on the contents of the IPv4 or IPv6 packet header and modifying the IP address, before forwarding. Furthermore, the programmable node, element or device 1300 supports dynamically adding and removing flows in near real-time. In some embodiments, the programmable switches or devices, e.g., SDN switch devices, P4 devices, SDN switch with PISA of FIGS. 2-12 are implemented in accordance with programmable node/element/device 1300. In some embodiments, the switch is implemented on hardware such as computer hardware that is deployed in the cloud. In some embodiments, the switch is implemented as a virtual machine on computer hardware that may be deployed in the cloud or on the Internet.

As previously discussed, while in the exemplary embodiment, the SDN network uses the OpenFlow protocol and OpenFlow switches, other SDN protocols and programmable switches, such as for example OVSDB, NETCONF, Cisco ASIC and OPFLEX as previously discussed may be used. Similarly, while P4 nodes, elements or devices are referred to in the exemplary embodiment other PISA nodes, elements, components, or devices may be, and in some embodiments are, utilized.

For explanatory purposes various features of an OpenFlow programmable switch are discussed in connection with FIG. 14.

Figure 15:
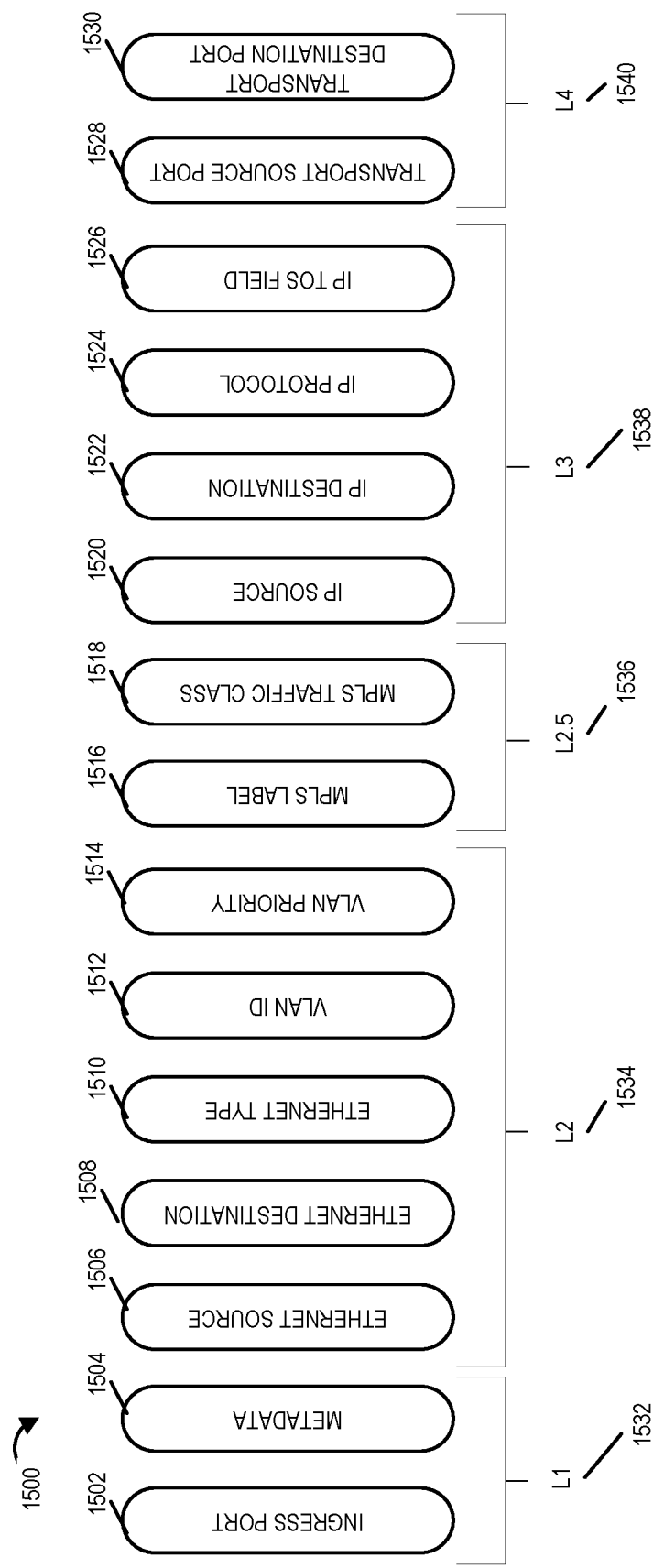
FIG. 15 illustrates various protocol layers.

Diagram 1500 of FIG. 15 illustrates the protocol layers which an SDN switch, e.g., an Open Flow switch, or a P4 element, node, or device, e.g., P4 switch, can modify which includes protocol layers 1, 2, 2.5, 3, and 4. The protocol layer 1 or L1 532 fields which the openflow switch can modify include: ingress port 1502 and metadata 1504. The protocol layer protocol layer 2 or L2 1534 fields which the openflow switch can modify include: Ethernet/MAC Source Address 1506, Ethernet/MAC Destination Address 1508, Ethernet Type 1510, VLAN ID 1512, VLAN Priority 1514. The protocol layer 2.5 or L2.5 1536 fields which the SDN switch, e.g., an openflow switch, or P4 switch can modify include: Multiprotocol Label Switching (MPLS) Label 1516, MPLS Traffic Class. The protocol layer 3 or L3 1538 fields which the SDN switch, e.g., an openflow switch, or a P4 switch can modify include: IP source address 1520, IP destination address 1522, IP protocol 1524, IP TOS Field 1526. The protocol layer 4 or L4 540 fields which the SDN switch, e.g., an openflow switch, or a P4 switch can modify include: transport source port 1528 and transport destination port 1530. References to source port and destination port used herein refer to the transport source port and transport destination port respectively. The P4 element, node or device can also modify an RTP payload and other elements of messages which an Openflow switch can not, as will be explained in further detail herein.

Figure 17:
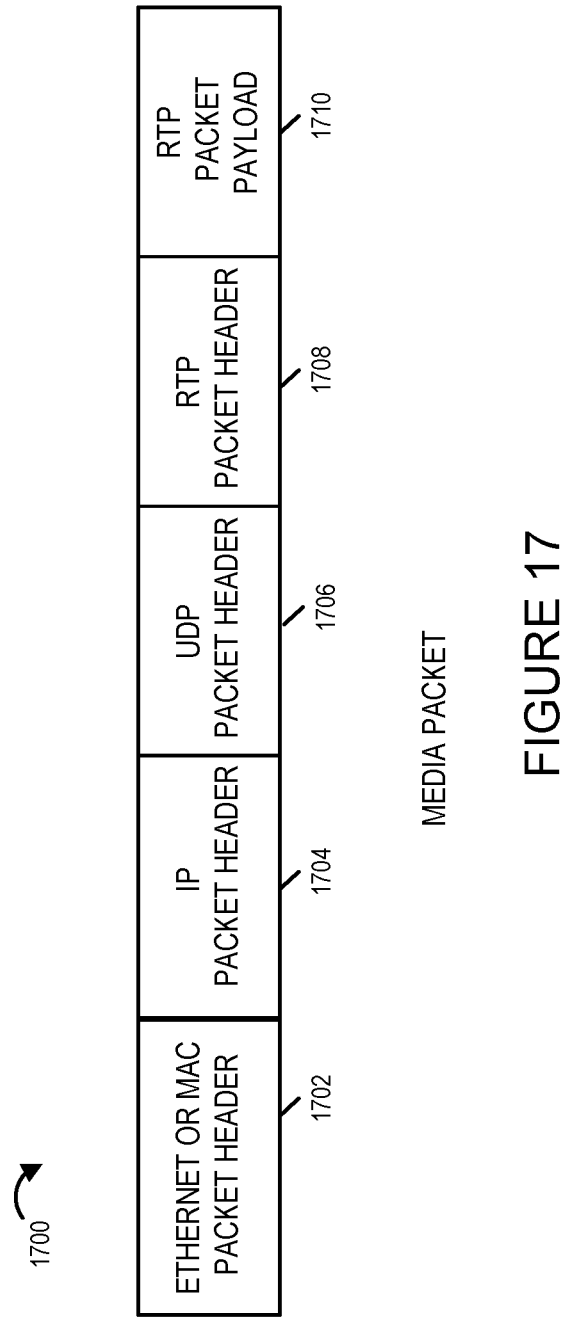
FIG. 17 illustrates the structure of an exemplary media packet.

Diagram 1700 of FIG. 17 illustrates the structure of an exemplary media packet with a Real-time Protocol payload. It includes the Ethernet packet header 1702 also referred to as MAC packet header, the Internet Protocol (IP) packet header 1704, the User Datagram Protocol (UDP) packet header 1706, the RTP packet header 1708, and the RTP payload 1710. References to media packet header or packet header herein refer to the packet headers attached to the packet payload. The media packet is an RTP packet encapsulated in a UDP packet which is encapsulated in a IP packet which is encapsulated in a Ethernet packet so that it can be communicated through various networks. The real-time media is included in the RTP packet payload 1710. The RTP header contains information related to the payload such as for example the SSRC ID, source, size, and encoding type. The Ethernet packet header (also referred to as the MAC packet header) 1702 includes the source and destination MAC addresses. The IP packet header 1704 includes, among other things, the IP source and destination addresses, the VLAN TAG, the protocol type which indicates the type of transport packet being carried (e.g., ICMP, TCP or UDP), Differentiated Services Point Code (DSPC). The UDP packet header 1706 includes the transport source and destination port numbers.

Figure 14:
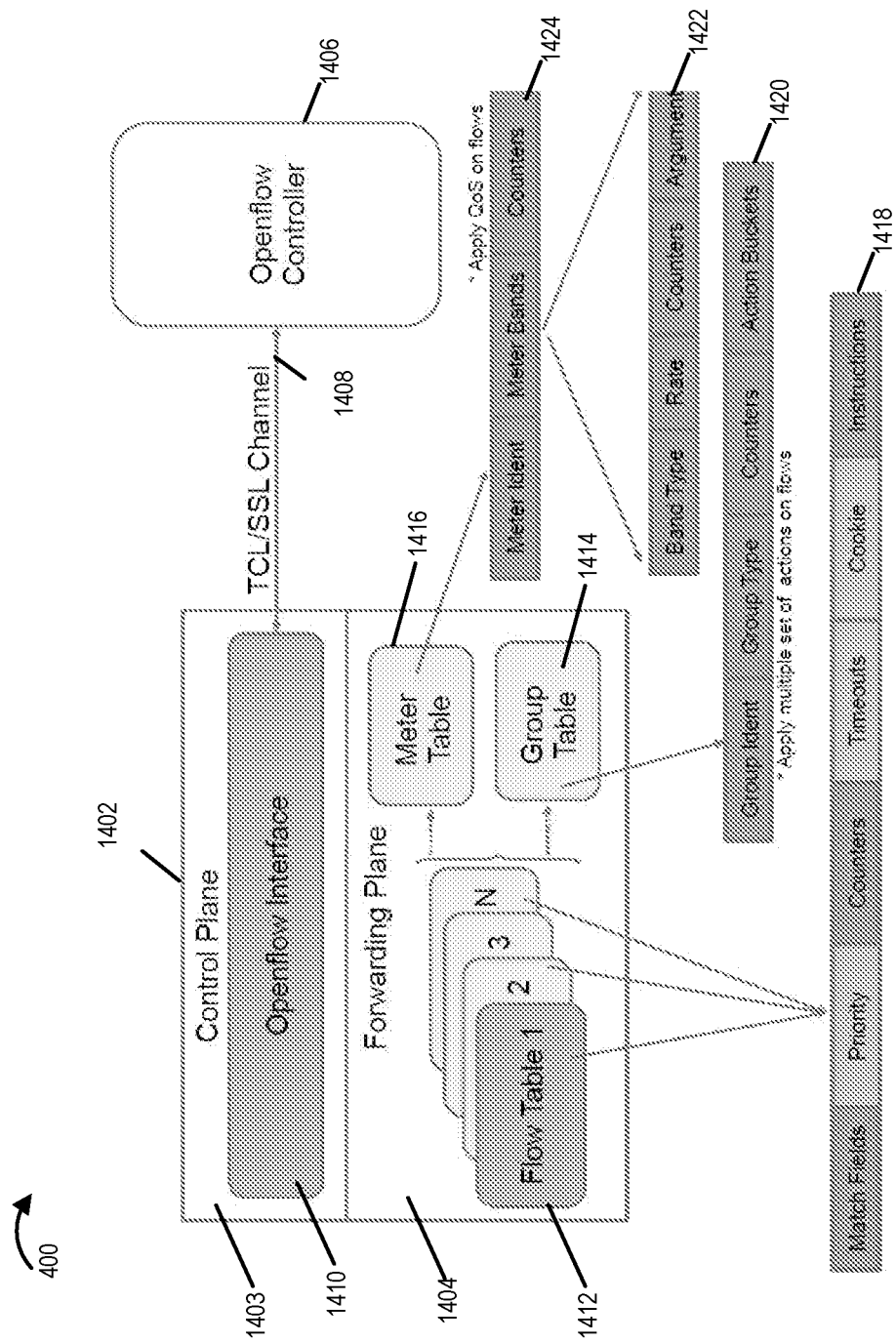
FIG. 14 illustrates an exemplary software controlled logical switch data structures of an SDN switch that is an open flow switch along with an open flow controller.

The diagram 1400 of FIG. 14 illustrates typical software controlled logical switch data structures namely for an Openflow switch. A description of an open flow switch and the switch's capabilities can be found in the OpenFlow Switch Specification version 1.5.0 (Protocol Version 0x06 published by the Open Networking Foundation dated Dec. 19, 2014 which is hereby explicitly incorporated herein by reference in its entirety.

In diagram 1400 the open flow switch 1402 illustrated via its logical data structures includes a control plane 1403 and a forwarding plane 1404. The open flow switch 1402 is coupled via an Openflow Interface 1410 which is part of the data plane 1404 to an external Openflow Controller 1406 (e.g., SDN controller 206 of FIG. 2) via a TCL/SSL (TCL/Secure Socket Layer) Channel 1408.

The forwarding plane includes a set of flow tables 1412 including Flow Table 1, 2, 3, . . . , N; a group table 1414 and a meter table 1416. Each of the flow tables of the set of flow tables 1412 contains a flow entry. The main components of a flow entry in a flow table are shown in element 1418. Each flow table entry contains match fields, priority, counters, timeouts, cookie, and instructions. A flow entry may also contain flags. As explained in the OpenFlow Switch Specification version 1.5.0 the match fields are used to match against packets. The match fields include the ingress port and packet headers and optionally other pipeline fields such as metadata specified by a previous table. The priority is used for matching the precedence of the flow entry. The counters are updated when packets are matched. The instructions are used to modify the action set or pipeline processing. A flow entry instruction may, and sometimes does, contain actions to be performed on the packet at some point of the pipeline. The set-field action can be used to specify some header fields to rewrite. The timeouts are the maximum amount of time or idle time before flow is expired by the switch. The cookie is an opaque data value chosen by the SDN OpenFlow controller and is sometime used by the SDN controller to filter flow entries affected by flow statistics, flow modification and flow deletion requests. It is not used when processing packets. The flags alter the way flow entries are managed. A flow table entry is uniquely identified by its match fields and priority. The match fields and priority together identify a unique flow entry in a specific flow table.

The Group table 1414 of the forwarding plane 1404 includes a group of entries. A flow entry in a flow table can point to a group. Each group entry is identified by its group identifier. The main components of the group entry are shown in group entry 1420 and include Group Identifier, Group Type, Counters and Action Buckets.

The meter table 1416 which is part of the forwarding plane is a table that consists of meter entries which define per-flow meters which enable the implementation of various simple QoS operations such as for example implementation of bandwidth policing of packet flows and the implementation of microflows. The main components of a meter entry 1424 in the meter table 1416 include meter identifier, meter bands and counters. The meter identifier is an integer that uniquely identifies the meter. The meter bands are an unordered list of meter bands with each meter band specifying the rate of the band and the way to process the packet. The counters are counters which are updated as packets are processed by the meter. The main components of a meter band are shown in element 1422 and include band type, rate, burst, counters, and arguments. The band type defines how a packet is processed. the rate is used by the meter to select the meter band. The burst defines the granularity of the meter band. The counters are counters which are updated as packets are processed by a meter band. The meter band entry may also include band type specific arguments. It is to be understand that the particular openflow switch functionality described is exemplary in nature and relates to a specific release of the Openflow protocol. It provides context to the discussion of SDN protocols and SDN programmable switches. Other functionality available in other releases of the Openflow protocol as well as different features of different SDN protocols are within the scope of the current invention.

In some embodiments, the SDN switch, e.g., open flow switch, includes one or more components or logic that may be implemented in software, hardware, e.g., circuits, or a combination of software and hardware to perform the functionality described herein. In some embodiments, a processor and/or device in the switch performs the functionality described herein in connection with SDN switches.

As described in the P416 Language Specification, version 1.2.1 from the P4 Language Consortium, dated Jun. 6, 2020 (see e.g., pages 6-7). P4 named for "Programming Protocol-independent Packet Processors" is a language for expressing how packets are processed by the data plane of a forwarding element such as for example a programmable hardware or software switch, network interface card, router, or network equipment device. Many targets or devices of P4 programs implement a separate control plane and data plain. The P4 programs do not specify the behavior of the control plane. However, P4 programs can be used along with P4Runtime to partially define the interface by which the control plane and the data-plane communicate. In such cases, a P4 program is first used to describe the forwarding behavior and this in turn is converted by a P4 compiler into the metadata needed for the control plane and data plane to communicate. The data plane need not be programmable for P4 and P4Runtime to define the capabilities of the data plane and how the control plane can control the defined capabilities. The P4 framework therefore allows one to define functionality based on your own P4 program software and P4runtime to execute your processing code. This allows a device's functionality, e.g., a programmable switch's functionality, to be extended by first defining the P4 interface for the device and the using P4Runtime code which is executed by the device during runtime to perform operations, e.g., on various message header fields and packet payloads such as RTP packet header fields and RTP packet payloads and RTCP packet header fields and RTCP packet payloads. P4 enabled devices can and in some embodiments of the invention are used to determine and/or collect and report RTP packet stream statics and/or RTCP packet stream statistics. Diagram 1800 of FIG. 18 shows the format, i.e., the fields, of an RTP packet including the RTP packet header fields and RTP packet payload.

Figure 16:
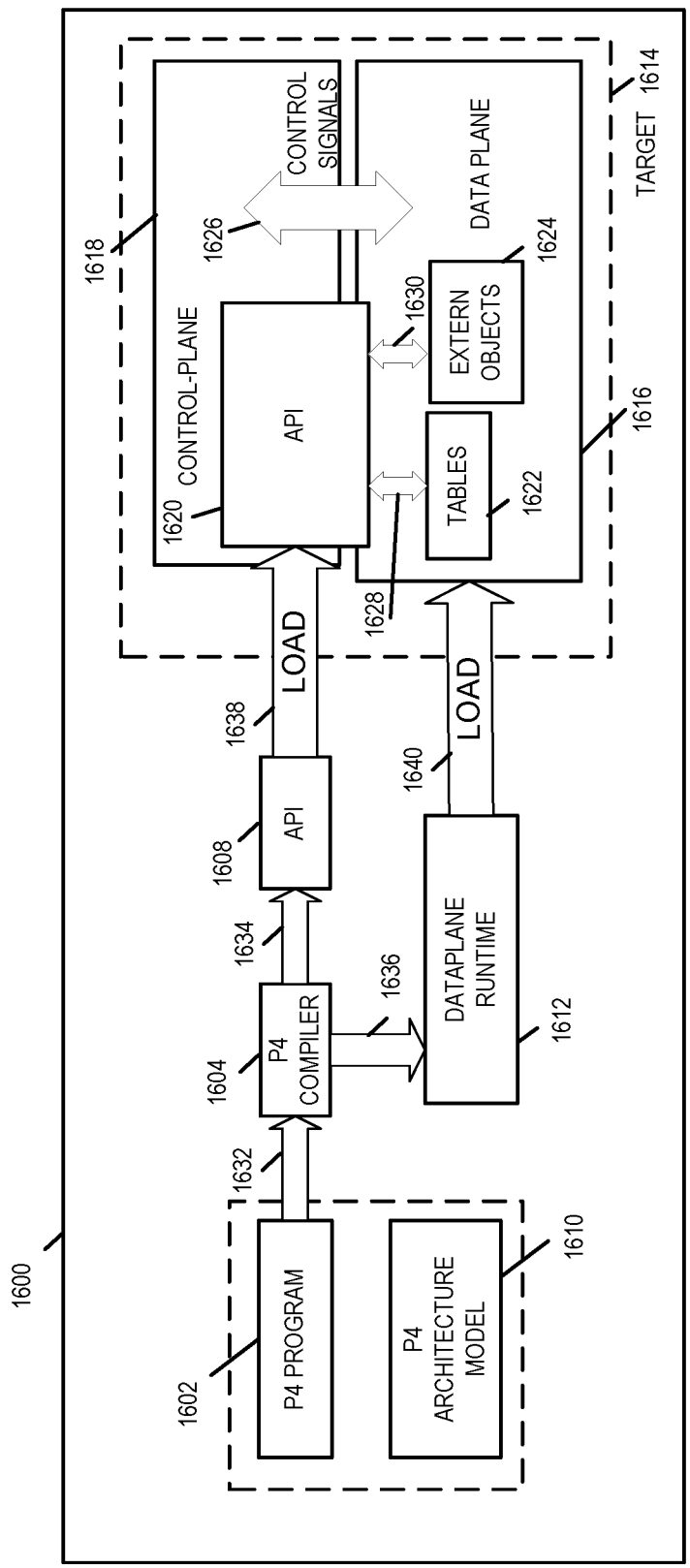
FIG. 16 illustrates details of programming a device using P4.

To provide further a further understanding of the P4 technology some of the details of how a target is programmed with P4 will now be discussed in connection with diagram 1600 of FIG. 16. Diagram 1600 shown in FIG. 16 is an illustration of a typical tool workflow when programming a target using P4. Diagram 1600 is essentially FIG. 2 of the P4$_{16}$ Language Specification, version 1.2.1 from the P4 Language Consortium, dated Jun. 6, 2020. As described in the P4$_{16}$ Language Specification version 1.2.1 from the P4 Language Consortium, dated Jun. 6, 2020 which is explicitly incorporated herein by reference in its entirety, "target manufacturers provide the hardware or software implementation framework, an architecture definition, and a P4 compiler for that target. P4 programmers write programs for a specific architecture, which defines a set of P4-programmable components on the target as well as their external data plane interfaces. Compiling a set of P4 programs produces two artifacts: a data plane configuration that implements the forwarding logic described in the input program and an API for managing the state of the data plane objects from the control plane." The P4 program 1602 is user supplied while the P4 architecture model 1610, P4 compiler 1604, Dataplane runtime 1612 and target 1614, e.g., switch, are manufacturer supplied elements. As shown in diagram 1600 the P4 program 1602 which is generated by a user is outputted to the P4 compiler 1604. Arrow 1632 representing the transfer of the program P4 program 1602 to the P4 compiler 1604. The P4 compiler compiles the P4 program 1602 which generates and outputs (represented by arrow 1634) API 1608 which is to be utilized by the target 1614. The API 1608 is loaded (represented by arrow 1638) onto the target 1614. The loaded API 1620 acts as an interface between the data plane 1616 of the target 1614 and the control plane 1618. Dataplane Runtime code 1612 is outputted from the P4 compiler 1604 and loaded into the target 1614 (arrow 1640 represents the loading of the Dataplane runtime code into the target 1614). The Dataplane runtime is the data plane configuration that implements the forwarding logic described in the input program. Arrows 1628 and 1630 illustrate communication between the data plane tables 1622 and extern objects 1630 using the API 1620. 1626 represents control signals being exchanged between the Data Plane and the control plane of the target 1614.

Additional information and specifications about P4 technology may be found on the Internet at https://p4.org/specs/. P4$_{16}$ Portable Switch Architecture (PSA) Version 1.1, by The P4.org Architecture Working Group, dated Nov. 22, 2018 currently available on the Internet at https://p4.org/p4-spec/docs/PSA-v1.1.0.pdf defines capabilities of a P4 entity, e.g., P4 switch. The P4$_{16}$ Language Specification version 1.2.0, by The P4 Language Consortium, dated Oct. 23, 2019 provides information on the capabilities of a P4 entity, e.g., a P4 switch, through programming and is currently available on the Internet at https://p4.org/p4-spec/docs/P4-16-v1.2.0.pdf. P4Runtime-Spec P4Runtime Specification version 1.1.0, by The P4.org API Working Group, dated Feb. 3, 2020 provides information on how the client running the program and the P4 entity, e.g., P4 switch, communicate. This specification is currently available on the Internet at https://p4.org/p4runtime/spec/v1.1.0/P4Runtime-Spec.pdf. Each of the aforementioned P4 specifications being explicitly incorporated herein by reference.

P4 devices such as P4 switches are currently provided by a variety of vendors including Barefoot Networks, Netronom and Nvidia/Mellanox. The P4 switches provided by one or more of these vendors may be utilized in implementing various embodiments of the present invention.

Additional details and advantages of the present invention in the context of new capabilities added to the SBC architecture and SDN model in order to realize the advantages of using PISA elements and devices, e.g., P4 devices, elements or nodes in various system and network configurations will be discussed below.

Figure 5:
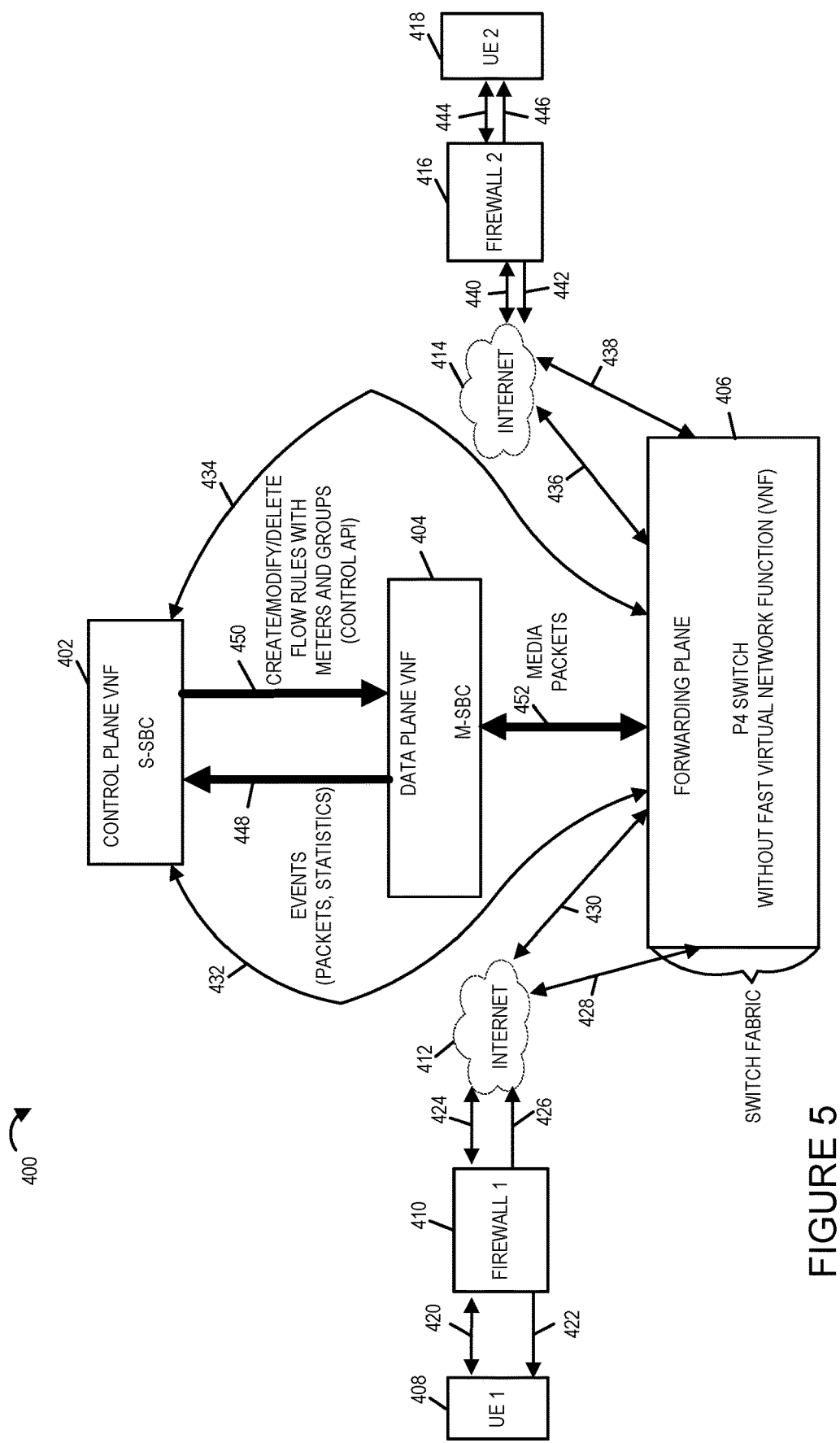
FIG. 5 illustrates another exemplary system in accordance with an embodiment of the present invention.

FIG. 5 illustrates a system 400 in which the media has to be relayed to a M-SBC.

Various SBC media relay flow capabilities and/or microservices may be, and in various embodiments are, realized using P4 capabilities and a distributed SBC architecture. Among the capabilities/micro-services are: (i) topology hiding for media flows by address rewrites (of L2/L3 and L4 Internet Protocol packet header) for each flow entry; (ii) Internet Protocol version 4 (IPv4) and Internet Protocol version 6 (IPv6) interworking; (iii) metering of each identified flow using metered table; Differentiated Services Code Point (DSCP) marking or DSCP pass-through, Virtual Local Area Network (VLAN) tagging for each media flow using L2 rewrite; (iv) packet statistics counted or determined for each flow; (v) Far end Network Address Translation (NAT) traversal; (vi) Real-time Transport Protocol (RTP) inactivity detection, (vii) RTP forking to support legal interception and recording including adding new header programmatically using P4 Runtime gRPC which is a an open source remote procedure call (RPC); and (viii) rogue media detection.

Additional examples of new functionality which is enabled by use of P4 switches and P4 SmartNICs include: (i) RFC4733 digit detection/reporting on RTP streams, (ii) RTP payload type interworking, (iii) media manipulation, e.g., transcoding of media of an RTP packet stream, (iv) RTCP termination, (v) RTCP generation, (vi) RTP sequence number manipulation, (vii) RTP SSRC manipulation, (viii) Reporting RTP/RTCP statistics, (ix) flow identification based on QUIC connection-id, wherein QUIC is a transport layer protocol; and (x) performing an action service on an Internet Protocol (IP) packet or a portion of an IP packet based on a regular expression match on the payload of the IP packet (e.g., dropping an IP packet which has an IP payload which matches a particular expression or matching criteria).

Various mechanisms, concepts and embodiments described in connection with the present invention are also applicable for P4 enabled SmartNICs (smart network interface cards) as well in addition to switches with P4 capabilities. Various micro-services or required set of functionalities may be covered or implemented by using both of these device types for a single flow, e.g., RTCP termination in a P4 enabled switch and RTP payload interworking in a P4 enabled SmartNIC device. Furthermore, SmartNICs with P4 capabilities can be, and in many embodiments are, used in place of the P4 enabled switches or SDN switches with PISA described in the various systems described.

Figure 6:
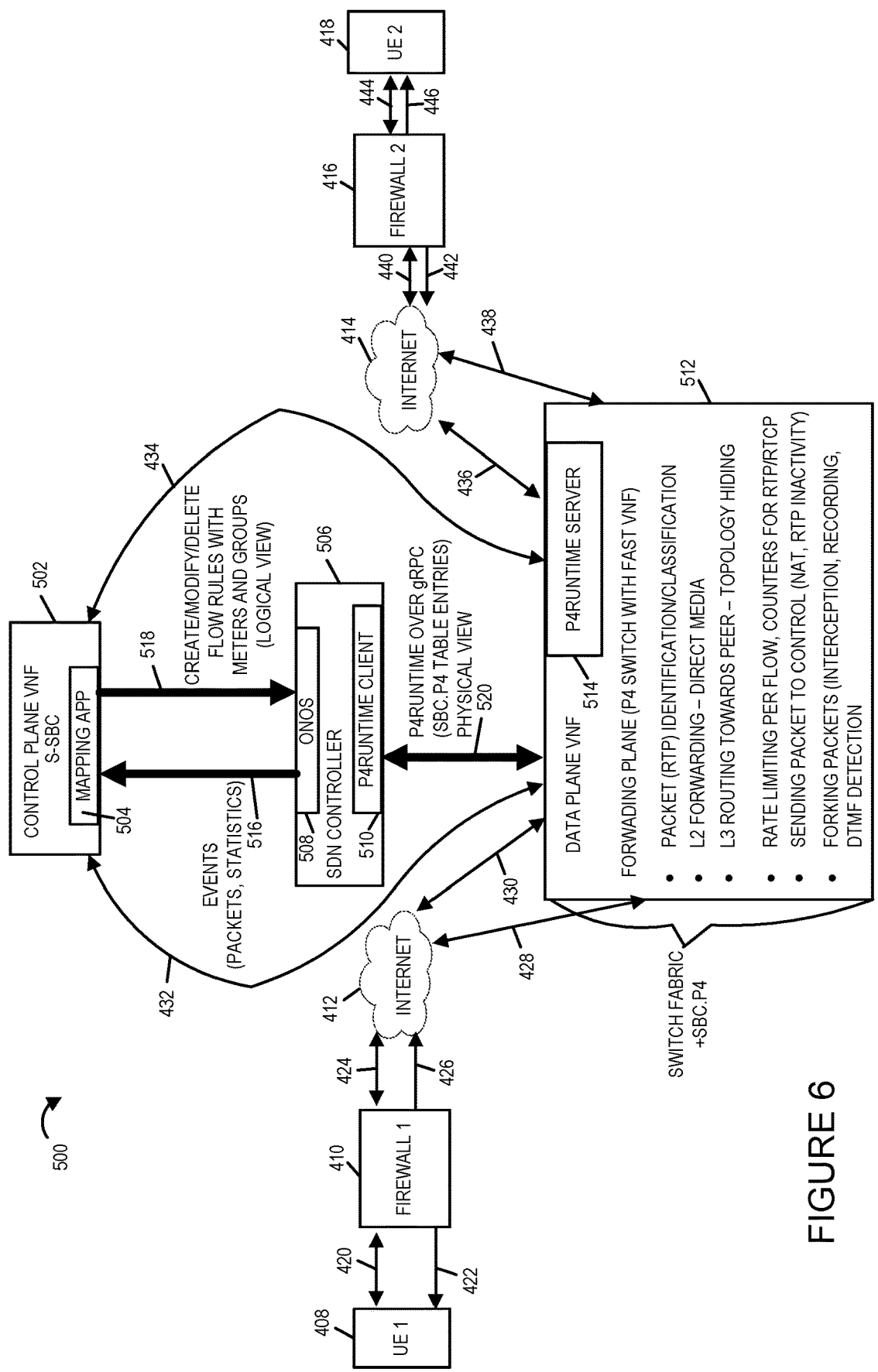
FIG. 6 illustrates another exemplary system in accordance with an embodiment of the present invention.

FIG. 6 illustrates an exemplary system 500 in accordance with an embodiment of the present invention wherein the various media relay flow capabilities/micro-services are implemented. System 500 includes user equipment 1 408, firewall 1 410, Internet 412, control plane virtual network function (VNF) S-SBC 502, SDN controller 506, Data Plane VNF 512, Internet 414, Firewall 2 416, and User Equipment 2 418. The system also includes communications links 420, 422, 424, 426, 428, 430, 432, 434, 436, 438, 440, 442, 444, 446, 516, and 518.

The control plan virtual network function (S-SBC) 502 includes a a mapping application/component 504 that communicates with a SDN controller 506 including an Open Network Operating System 508 and a P4runtime client component 510. The SDN controller 506 P4Runtime client 510 communicates with the Data Plan VNF 512 over communications link 520 using gRPC. The data plan VNF 512 includes a P4Runtime server 514. The VNF 512 provides switch fabric+SBC.P4 capabilities/microservices in response to messages/instructions/signals received from the SDN controller 506 and/or the Control Plane VNF S-SBC 502. The data plane VNF 512 includes forwarding plane (P4 switch with FAST VNF) capabilities/functionalities including for example: (i) Packet (RTP) identification/classification, (ii) L2 forwarding—direct media microservices, (iii) L3 routing towards peer-topology hiding microservices, (iv) rate limiting per flow, counters for RTP/RTCP, (v) sending packet to control (e.g. NAT, RTP inactivity microservices), and (vi) forking packets (interception, recording, Dual Tone Multi-Frequency (DTMF) detection microservices).

The mapping application 504 details are specified below. The new model has a "Packet Plane Control Service" component or entity. This component or entity provides the following functionalities.

It exposes its services to clients through an Application Programming Interface.

This API is proprietary and accommodates the needs of a particular client type.

Mapping the client (S-SBC in this example) request to a capability/connectivity set Capability refers to Internet Protocol (IP) level packet forwarding, application specific packet manipulation (e.g., RTP payload mapping), application specific report generation (e.g., reporting detected RPT digits in the media flow of a session), etc.

Connectivity refers to the ability to forward packets between different network segments.

Selecting a SDN controller and/or switch(es) for each element in the set.

SDN Application Programming Interface (e.g., OpenFlow API).

SDN API enhanced with P4 plug-ins (e.g., OpenFlow AP enhanced with P4 plug-ins; P4Runtime gRPC API.

Proprietary API (e.g., for transcoding and/or other microservices which cannot be represented in P4).

Figure 7:
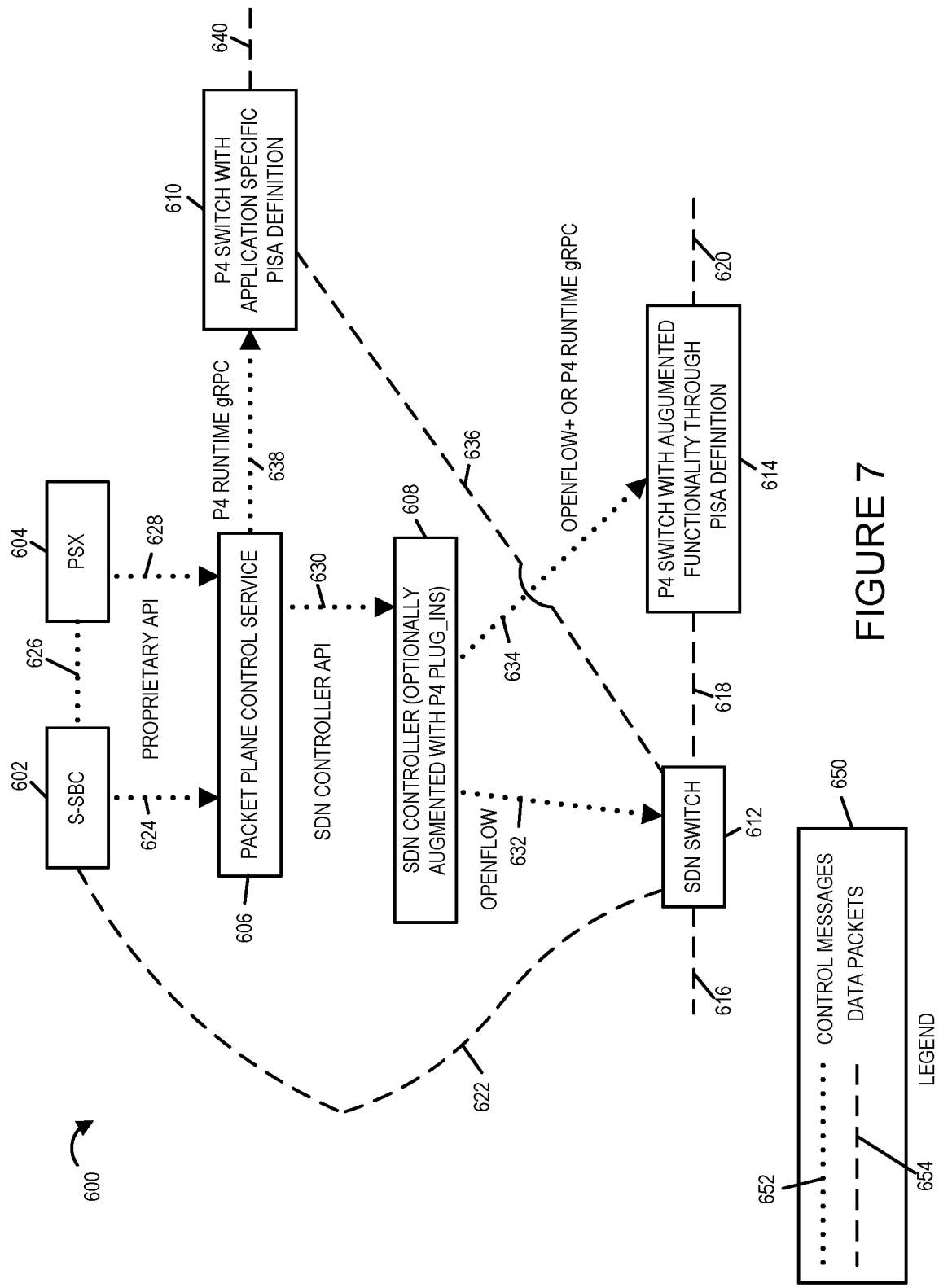
FIG. 7 illustrates another exemplary system in accordance with an embodiment of the present invention.

FIG. 7 illustrates another exemplary system 600 in accordance with another embodiment of the present invention. System 600 includes an S-SBC 602, a Policy and Routing entity/server (PSX) 604, a packet plane control service entity 606, a SDN controller 608 which is optionally augmented with P4 Plug-ins), one or more SDN switches (a single representative SDN switch 612 being illustrated) and one or more P4 Switches/devices with augmented functionality through Protocol Independent Switch Architecture (PISA) definition (a single representative P4 switch/device 614 being illustrated), and one or more P4 switches with application specific PISA definition (a single representative SDN switch 610 being illustrated) The various entities of the system being coupled together via communication links or path over which they can exchange control messages, signals and data packets. Legend 650 shows that control messages are illustrated in FIG. 7 as dotted lines having the shape 652 while data packets are illustrated as dashed lines having the shape 654.

The S-SBC 602 sends requests to the packet plane control service entity 606 over communications link 624 using a proprietary API. The S-SBC 602 receives policy and routing service update control messages from the PSX 604 via communications link 626. The packet plane control service entity 606 receives control messages, e.g., requests and/or instructions, from the S-SBC 602 over the communications link 624 through the use of a proprietary API. The packet plane control service entity 606 also receives control messages from the PSX 604 via communications link 628 through the use of the proprietary API. The packet plane control service entity 606 transmits control messages to P4 switch with application specific PISA definition 610 using P4 Runtime gRPC over communications link 638. The packet plane control service entity 606 also communicating control messages to the SDN controller 608 using an SDN controller API over the communications link 630. The SDN controller 608 communicates SDN control messages to the one or more SDN switches (e.g., SDN switch 612) over communications link 632 using an SDN protocol which in this example is the Openflow protocol. The SDN controller 608 control messages to the one or more P4 switches with augmented functionality (e.g., P4 switch 614) over communications link 634 using an SDN protocol (e.g., Openflow Protocol) over communications link 632 using an SDN protocol which in this example is the Openflow protocol and/or P4 runtime gRPC. The SDN switch 612 communicates data packets over the communications link 618 to the P4 switch 614. The SDN switch 612 communicates data packets 636 to P4 switch 610 over communications link 636. The P4 switch 610 communicates data packet to a peer device over communications link 640. The P4 switch 614 communicates data packets over communications link 620 to a peer device.

The establishment and operations of an exemplary session will now be discussed in connection with system 600 of FIG. 7.

The S-SBC 602 receives signaling, e.g., SIP messages, to establish a first communications session between a first peer device and a second peer device. The signaling received by the S-SBC 602 include information that identifies a first media flow that is to be established from the first peer device to the second peer device. The identification information may be, and in some embodiments is a 5-tuple (source IP address, source port number, destination IP address, destination port number, transport protocol) which uniquely identifies the first media flow. The S-SBC 602 determines one or more microservices that are to be implemented in connection with the first media stream. For example, the one or more microservice may be, and in some is a DTMF digit detection and reporting microservice and/or a media manipulation service such as a media transcoding microservice. In some embodiments, the microservice to be provided on the media flow is determined based on control messages and/or information received from the PSX device 604. For example, the PSX device 604 may send control messages to the S-SBC 602 instructing the S-SBC 602 to establish a legal intercept microservice for media flows exchanged with the first peer device.

Upon the identification of one or more microservices to be performed on the media flow being established between the first peer device and the second peer device, the S-SBC 602 send control messages to the packet plane control service entity 606 over communications link 624 using a proprietary API of the packet plane control service entity 606. In some embodiments, the PSX 604 also or alternatively sends policy and/or routing instructions to the packet plane control service entity 606 via communications link 628 using the packet plane control service entity proprietary API. For example, in some embodiments, the PSX 604 sends control messages to the packet plane control service 606 to perform legal intercept on any media flows to or from the first peer device. In various embodiments, the packet plane control service entity advertises the microservices and/or functionality it can provide for media flows to S-SBC and/or the PSX at time of installation or update of the packet plane control service entity 606 or in response to requests from entities to the packet plan control service entity 6060 for a listing of the micro-services and/or functionalities available from the packet plane control service entity 606.

The packet plane control service entity 606 in response to receiving a request for a microservice and the information identifying the media flow on which the microservice is to be performed generates instructions and/or requests to implement the microservice. The placket plane control service entity 606 determines which entities will be employed to implement the microservice, e.g., based on efficiency and/or resource availability and/or entity capabilities. For example, if the SDN switches of the system do not have the capability to perform the microservice, e.g., a transcoding or digit detection and reporting microservice, the packet plane control service entity will generate instructions to control the SDN controller to send programming instructions to one or more SDN switches to direct the first media flow to a P4 switch, e.g., P4 switch 614 or P4 switch 610 that will perform the requested service. In this example, the packet plane control service 606 determines that the microservice cannot be performed by an SDN switch and sends control messages to SDN controller 608 using an SDN controller API over communications link 630. The control messages sent by the packet plane control service entity 606 include identification information by which the first media flow can be identified and address information, e.g., IP address and port number on the P4 switch 610 to which the first media flow is to be sent. The packet plane control service entity 606 also generates and send instructions to the P4 switch 610 which program the P4 switch to provide the microservice, e.g., DTMF digit detection and reporting, legal intercept, or transcoding on the first media flow when it received at the IP address and port of the P4 switch identified to the SDN switch. Alternatively, the packet plane control service entity 606 provides the P4 switch 610 with media flow identification information which specifically identifies the first media flow and can be used to by the P4 switch 610 to identify the first media flow. The instructions are sent as control messages from the packet plane control service entity 606 to the P4 switch 610 over communications link 638 using a P4 runtime gRPC. In response to receiving the instructions the P4 switch 610 programs itself to identify the first media flow and perform the requested microservice on the first media flow, e.g., DTMF digit detection and reporting, legal intercept, or transcoding of the media of the first media flow.

The SDN controller 608 in response to receiving the control messages with the instructions to program one or more SDN switches to route or forward the first media flow to the P4 switch 610 generates one or more control messages to program one or more SDN switches to route or forward the first media flow to the P4 switch 610. The instructions typically include identification information that allows the SDN switches which received the instructions to identify the first media flow. The identification information in many embodiments is a 5-tuple (source IP address, port number, destination IP address, port number, transport protocol type). In this example, the SDN controller 608 is an openflow SDN controller and generates openflow instructions to forward or route the first media flow to the P4 switch 610. The SDN controller 608 sends the instructions to the SDN switch 612 which receives the instructions over communications link 632. The instructions being providing using the Openflow protocol. In some embodiments, the instructions are installed into the openflow switch and/or are implemented upon receipt by the SDN switch 612. The SDN switch 612 upon installation or implementation of the instructions from the SDN controller 608 now forwards data packets which it receives belonging to the first media flow to the P4 switch 610 over communications link 636. That is when data packets of the first media flow are received by the SDN switch 612 over communications link 616, the SDN switch 612 determines the packets belong to the first media flow based on the media identification information provided by the SDN controller 608. Once the SDN switch 612 determines that the received data packets belong to the first media flow it routes or forwards the received data packets to the P4 switch 610 over communications link 636. The P4 switch 610 upon receipt of the data packets from the SDN switch 612 determines that the data packets belong to the first media flow, e.g., via the IP address and port on which the data packets were received or based on media flow identification provided to the P4 switch 610 from the packet plane control service entity 606. In response to determining that the received data packets belong to the first media flow, the P4 switch implements the micro-service on the first media flow in accordance with the instructions provided by the packet plane control service entity 606. Once the microservice has been performed on the data packets of the first media flow, the data packets are communicated toward the second peer device over communications link 640. While the example has been discussed in terms of a single microservice multiple microservices may be, and sometimes are, implemented on a media flow. In various embodiments, multiple microservices may be, and sometimes are, implemented by a single P4 switch. While in other embodiments, a combination of different SDN switch(es) and/or P4 switches are used to implement the one or more microservices on a media flow.

The embodiment of system 600 provides a number of advantages/improvements over prior systems including for example: (i) it allows functionality to be provided by different packet plane entities, (ii) it allows utilizing the flexibility of P4 technology as available, and (iii) it utilizes topology awareness of each tier as available rather than duplicating it.

Figure 8:
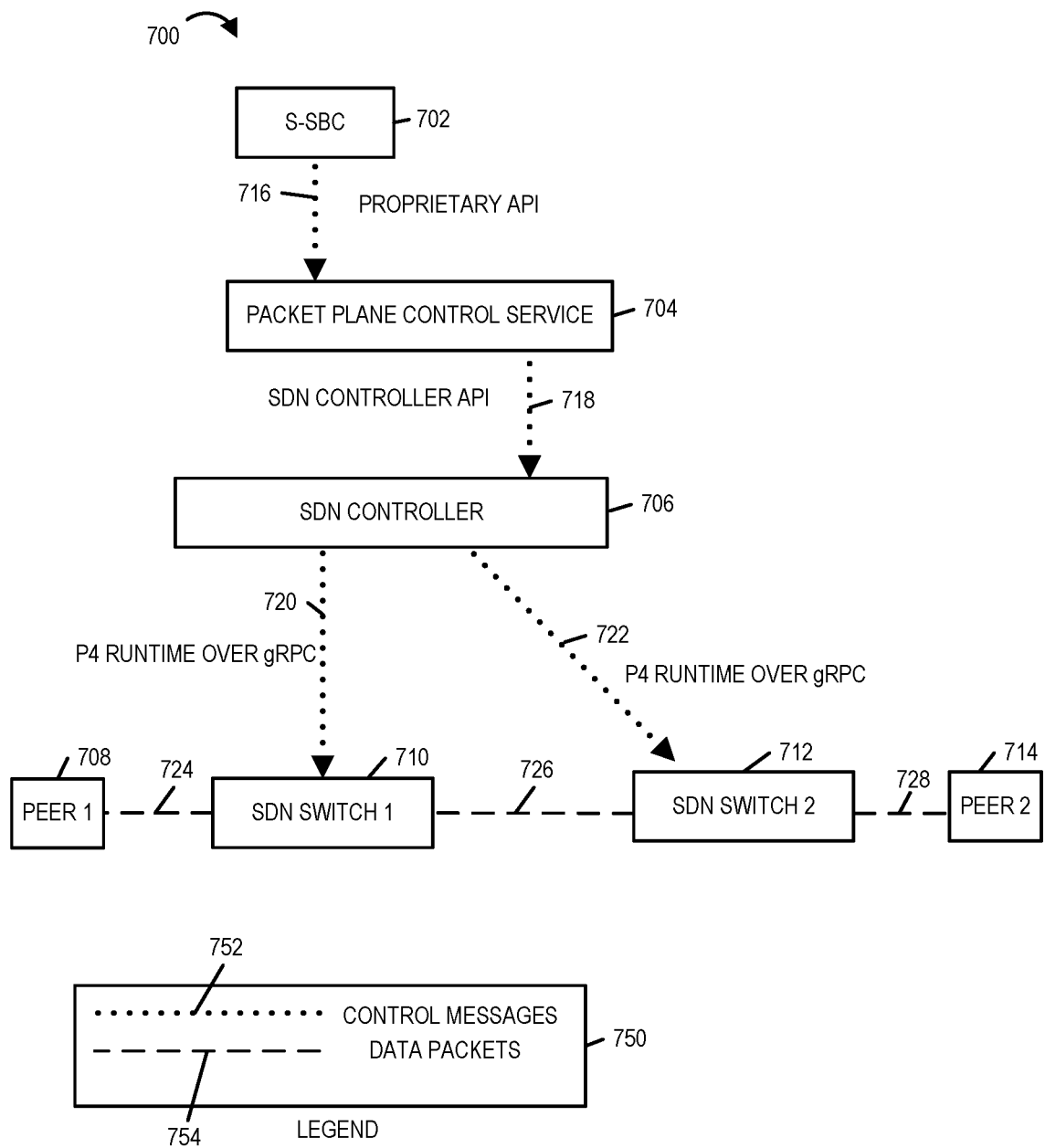
FIG. 8 illustrates another exemplary system in accordance with an embodiment of the present invention.

FIG. 8 illustrates exemplary system 700. System 700 includes a peer device 1 708, peer device 2 714, S-SBC 702, a packet plane control service entity 704, a SDN controller 706, a SDN switch 1 710 and a SDN switch 2 712. The SDN switch 1 710 and SDN switch 2 712 include P4 capabilities/functionality and support P4 runtime over gRPC. The S-SBC 702 is coupled or connected to the packet plane control service entity 704 by communications link 716. The packet plane control service entity 704 is coupled to the SDN controller 706 via communications link 718. The SDN controller 706 is coupled to the SDN switch 1 710 via communications link 720. The SDN controller is coupled to the SDN switch 2 712 via communications link 722. The peer 1 device 708 is coupled to the SDN switch 1 710 via communications link 724. The SDN switch 1 710 is coupled to the SDN switch 2 712 via communications link 726. The SDN switch 2 712 is coupled to the peer device 2 714 over communications link 728. Legend 750 shows that control messages in FIG. 8 are represented by dotted lines having the shape of dotted lines 752 and that data packets in FIG. 8 are represented by dashed lines have the shape of dashed lines 754.

A media bypass micro-service using a single SDN controller will now be described in connection with system 700 illustrated in FIG. 8. The S-SBC 702 sends a request for a media bypass service for a first media flow from peer 1 708 to peer 2 714 to packet plane control service 704. The peers have L2 connectivity. The request includes information identifying the first media flow. The packet plane control service 704 sends control messages to the SDN controller to establish a media bypass function for the first media flow. The SDN controller sends P4 runtime instructions over the gRPC to the SDN switch 1 and SDN switch 2 both of which have P4 capabilities to perform the media bypass micro-service with metering and statistics collection. The metering and statistics collection is retrieved by the S-SBC 702 from the SDN switches 710 and/or 712, which is otherwise not possible for a media bypass call realized by a SBC. The data packets of the first media flow do not undergo any address rewrites as an L2 level connection is established between SDN switch 1 710 and SDN switch 2 712.

A media passthrough micro-service example will now be described in connection with system 700 illustrated in FIG. 8. In the media passthrough micro-service, the packet plane control service entity 704 receives information from S-SBC 702 over communications link 716 for the ingress/egress media IP/port and maximum allowed bandwidth. It does not receive any instructions for any other micro-services for this particular session. This information is communicated from the S-SBC 702 to the packet plane control service entity 704 using a proprietary API. The packet plane control service entity 704 in response to receiving the information determines that both ingress/egress media peers (i.e., peer 1 708 and peer 2 714) can be connected via the same SDN Controller (i.e., SDN controller 706). The packet plane control service entity 704 sends instructions to the SDN controller 706 over communications link 718 using an SDN controller API to create a flow between {ingress peer IP address/port, egress peer IP/port} with the maximum allowed bandwidth. The ingress/egress media IP address/port and maximum allowed bandwidth being information received from the S-SBC 702. The packet process control service entity 704 reports the IP/port allocated by the SDN controller to the S-SBC 702 after receiving the information from the SDN controller 706 over communications link 718. The SDN controller 706 sends control messages, e.g., Openflow protocol, control messages to the SDN switch 1 710 and SDN switch 2 712 to implement the media passthrough micro-service. In response to receiving the control messages from the SDN controller, the SDN switch 1 710 and SDN switch 2 712 implement the instructions to provide the media passthrough microservice for the identified media flow having the ingress/egress media IP/port and the maximum allowed bandwidth. The SDN controller instructions to the SDN switches including the ingress/egress media IP addresses/ports and maximum allowed bandwidth provided by the S-SBC to the packet plane control service entity.

Figure 9:
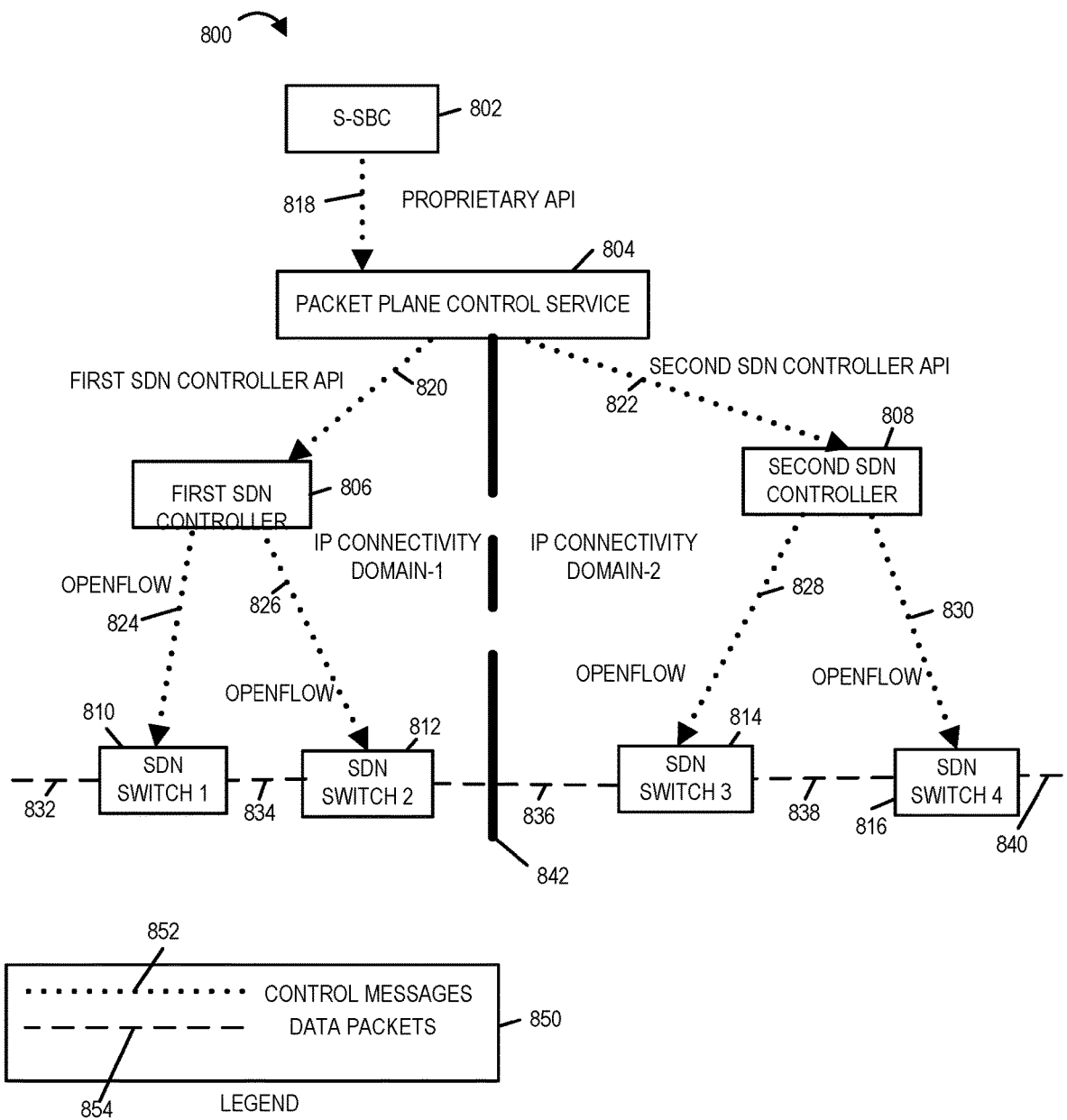
FIG. 9 illustrates another exemplary system in accordance with an embodiment of the present invention.

FIG. 9 illustrates an exemplary system 800 in accordance with another embodiment of the present invention. System 800 includes a S-SBC 802, a packet plane control service entity 804, a first SDN Controller 806, a first SDN switch 1 810, a second SDN switch 2 812, a second SDN controller 808, a third SDN switch 3 814, a fourth SDN switch 4 816, and a plurality of communications links 818, 820, 822, 824, 826, 828, 830, 832, 834, 836, 838, and 840.

The first SDN controller 806, the first SDN switch 1 810 and the second SDN switch 2 812 are located in a first Internet Protocol connectivity Domain-1. The second SDN controller 808, the third SDN switch 814, and the fourth SDN switch 4 816 are located in a second Internet Protocol connectivity Domain-2. The S-SBC 802 is coupled and/or connected to packet plane control service entity 804 via communications link 818. The S-SBC 802 utilizes a proprietary API to communicate with the packet plane control service entity 804. The packet plane control service entity 804 is coupled to the first SDN controller 806 via communications link 820. The packet plane control service entity 804 is coupled to the second SDN controller 808 via communications link 822. The packet plane control service entity 804 uses a first SDN controller API to communicate with the first SDN controller 806. The packet plane control service 804 uses a second SDN controller API to communicate with the second SDN controller 808.

In this example, the first and second SDN controller APIs are openflow SDN controller APIs as the first and second SDN controllers in this example are Openflow SDN controllers. The first SDN controller 806 communicates with the first SDN switch 1 810 using communications link 824. The first SDN controller 806 communicates with the second SDN switch 2 812 using communications link 826. In this example, the first and second SDN switches are Openflow switches or are Openflow protocol enabled. The first SDN controller 806 uses a first SDN protocol to communicate with the first and second SDN switches which in this example is the Openflow protocol. The second SDN controller 808 communicates with the third SDN switch 3 814 using communications link 828. The second SDN controller 808 communicates with the fourth SDN switch 4 816 using communications link 830. In this example, the third and fourth SDN switches are Openflow switches or are Openflow protocol enabled. The second SDN controller 808 uses a second SDN protocol to communicate with the third and fourth SDN switches which in this example is the Openflow protocol.

Communications link 832 couples the first SDN switch 1 810 to a first peer device not shown. The communications link 834 couples the first SDN switch 1 810 to the second SDN switch 2 812. The communications link 836 couples and/or connects the second SDN switch 2 812 to the third SDN switch 3 814. The communications link 838 couples the third SDN switch 3 814 to the fourth SDN switch 816. The communications link 840 couples the fourth SDN switch 4 816 to a second peer device which is not shown.

The dark broken line 842 illustrates a boundary between the first IP connectivity Domain-1 and the second IP connectivity Domain-2. The first SDN controller controls the SDN switches in first IP connectivity Domain-1 and the second SDN controller controls the SDN switches in the second IP connectivity Domain-2.

Legend 850 shows that control messages in FIG. 9 are represented by dotted lines having the shape of dotted lines 852 and that data packets in FIG. 9 are represented by dashed lines have the shape of dashed lines 854.

An example of operations to implement a media pass-through using multiple SDN controllers microservice will now be explained in connection with system 800 shown in FIG. 9. The packet plane control service entity 804 receives information from S-SBC 802 for ingress/egress media IP/port and maximum allowed bandwidth. It does not receive any instructions for any other micro-services for this particular session. The packet plane control service entity 804 determines that ingress/egress media peers are in different IP connectivity domains and these domains are controlled by different SDN controllers. A first peer device being in the first IP connectivity domain-1 and the second peer device being in the second IP connectivity domain-2. The first SDN controller 806 controls the SDN devices in the first IP connectivity domain-1, e.g., the first SDN switch 1 810 and second SDN switch 2 812. The second SDN controller 808 controls the SDN devices in the second IP connectivity domain-2, e.g., the third SDN switch 3 814 and the fourth SDN switch 816.

The packet plane control service entity 804 instructs the first SDN controller 806 to create a flow between {ingress peer IP/port, domain-2*} with maximum allowed bandwidth specified by the S-SBC 802. The * being a wildcard. The packet plane control service entity 804 instructs the second SDN controller 808 to create a flow between {first SDN controller reported IP address/port, egress IP address/port} with the maximum allowed bandwidth specified by the S-SBC 802. The packet plane control service entity 804 then updates the first SDN controller with the second SDN controller reported IP address/port facing it. The packet plane control service entity 804 reports the IP address/port allocated by the second SDN controller facing egress peer to S-SBC 802.

Figure 10:
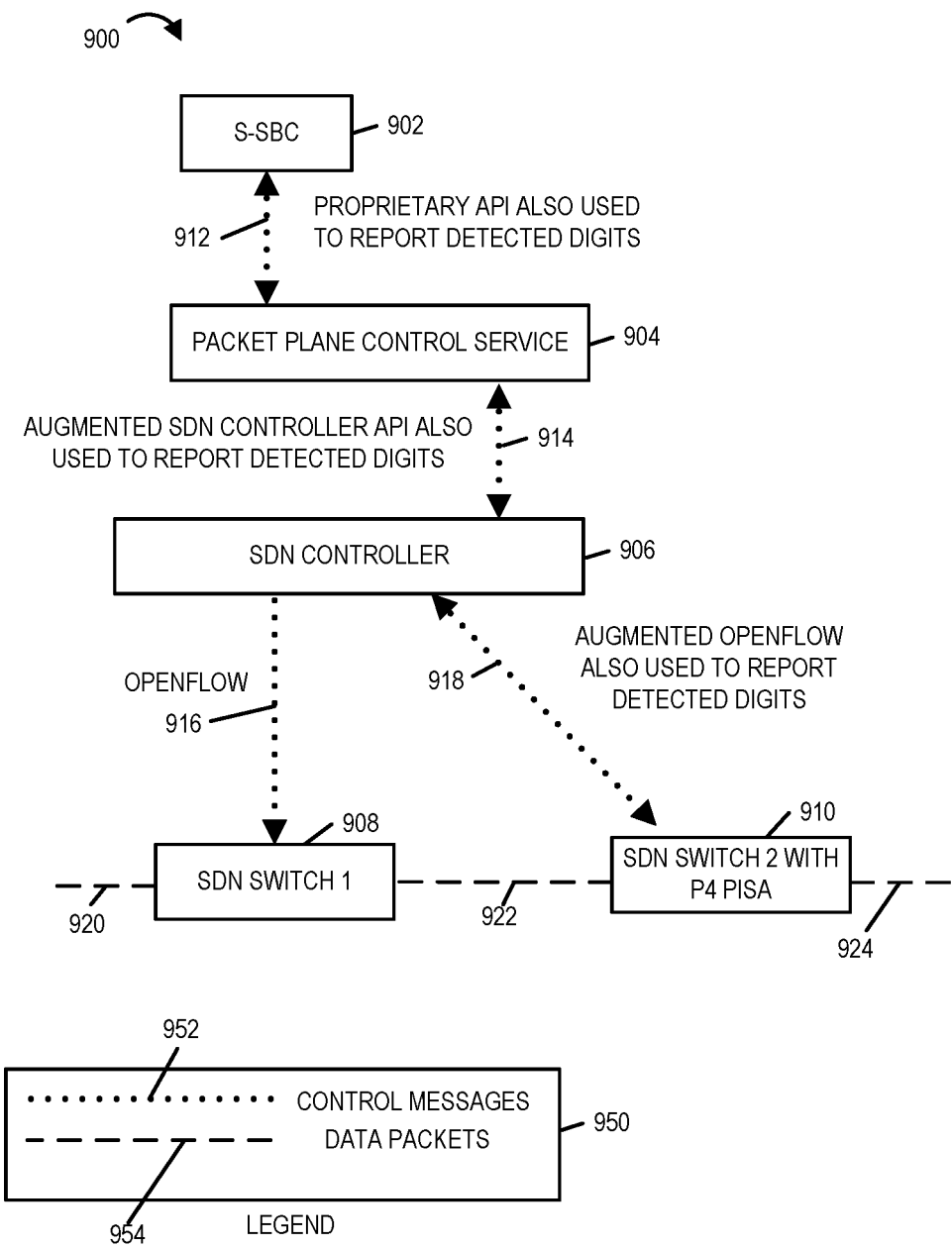
FIG. 10 illustrates another exemplary system in accordance with an embodiment of the present invention.

FIG. 10 illustrates an exemplary system 900 in accordance with another embodiment of the present invention. System 900 includes a S-SBC 902, a packet plane control service entity 904, an SDN Controller 906, a SDN switch 1 908, a SDN switch 2 with P4 PISA 910, and a plurality of communications links 912, 914, 916, 918, 920, 922, and 924.

The S-SBC 902 is coupled and/or connected to packet plane control service entity 904 via communications link 912. The S-SBC 902 utilizes a proprietary API to communicate with the packet plane control service entity 904 which is also used to report detected digits. The packet plane control service entity 904 is coupled to the SDN controller 906 via communications link 914. The packet plane control service entity 904 uses a SDN controller API to communicate with the SDN controller 906. The packet plane control service entity 904 uses an augmented SDN controller API which also is used to report detected digits to the packet plane control service entity 904 from the SDN controller 906. The SDN controller is coupled to the SDN switch 1 908 via communications link 908. The SDN controller 906 uses a SDN protocol which in this example is the Openflow protocol to communicate with the SDN switch 1 908. The SDN switch 1 in this example is a Openflow switch. The SDN controller 906 is coupled and/or connected to the SDN switch 2 which has P4 PISA capabilities via communications link 918. The SDN switch 2 has an augmented openflow interface which is used to send instructions to the SDN switch with P4 PISA as well as report detected digits from the SDN switch 910. The communications link 920 couples the SDN switch 1 908 to a first peer device also referred to as an ingress peer device and is used to receive data packets of a media flow of a session from a first peer device not shown. The communications link 922 couples the first SDN switch 1 908 to the second SDN switch 2 910. The communications link 924 couples the second SDN switch 2 to a second peer device also referred to as an egress peer device and is used to transmit data packets of a media flow of a session to the second peer device from the second SDN switch. The second peer device is not shown in FIG. 10.

Legend 950 shows that control messages in FIG. 10 are represented by dotted lines having the shape of dotted lines 952 and that data packets in FIG. 10 are represented by dashed lines have the shape of dashed lines 954.

An example of operations to implement a media pass-through with RTP Digit Detection and Reporting micro-service will now be explained in connection with system 900 shown in FIG. 10. The packet plane control service entity 904 receives information from S-SBC 902 for ingress/egress media IP/port and maximum allowed bandwidth. It also receives instructions for digit detection and reporting on the RTP stream, i.e., media flow for the session. The packet plane control service entity 904 determines that both ingress/egress media peers, i.e., peer device 1 and peer device 2, can be connected via the same SDN controller, i.e., SDN controller 906. Furthermore, the packet plane control service entity 904 is aware that switches in this domain are augmented with P4 PISA allowing digit detection and reporting. Moreover, the SDN Controller AIP is augmented or enhanced to expose this functionality. The packet plane control service entity instructs the SDN controller to create a flow between {ingress peer IP address/port, egress peer IP address/port} with the maximum allowed bandwidth. It also instructs the SDN controller to perform RTP digit detection and reporting. The packet plane control service entity 904 reports the IP address/port allocated by the SDN controller 906 to the S-SBC 902. The SDN controller 906 sends instructions to the SDN switch 1 to forward data packets of the flow to the second SDN switch 2 910. The SDN controller 906 also sends instructions which when executed by the SDN switch 2 with P4 PISA capabilities to detect RTP detects in the data packets of the flow and report the detected RTP digits to the SDN controller 906. The SDN switch 2 is also sent instructions from the SDN controller 906 which when implemented by the SDN switch limit the maximum allowed bandwidth to the maximum allowed bandwidth specified by the S-SBC 902. The SDN switch 2 upon the detect of RTP digits in the data packets of the flow reports the detected RTP digits to the SDN controller 906 using the augmented openflow protocol over communications link 918. The SDN controller 906 in response to receiving the detected RTP digits reports them to the packet plane control service entity 904 using the augmented SDN controller API. The packet plane control service entity 904 in response to receiving the detected RTP digits reports them to the S-SBC 902 over communications link 912 using the proprietary API.

Figure 11:
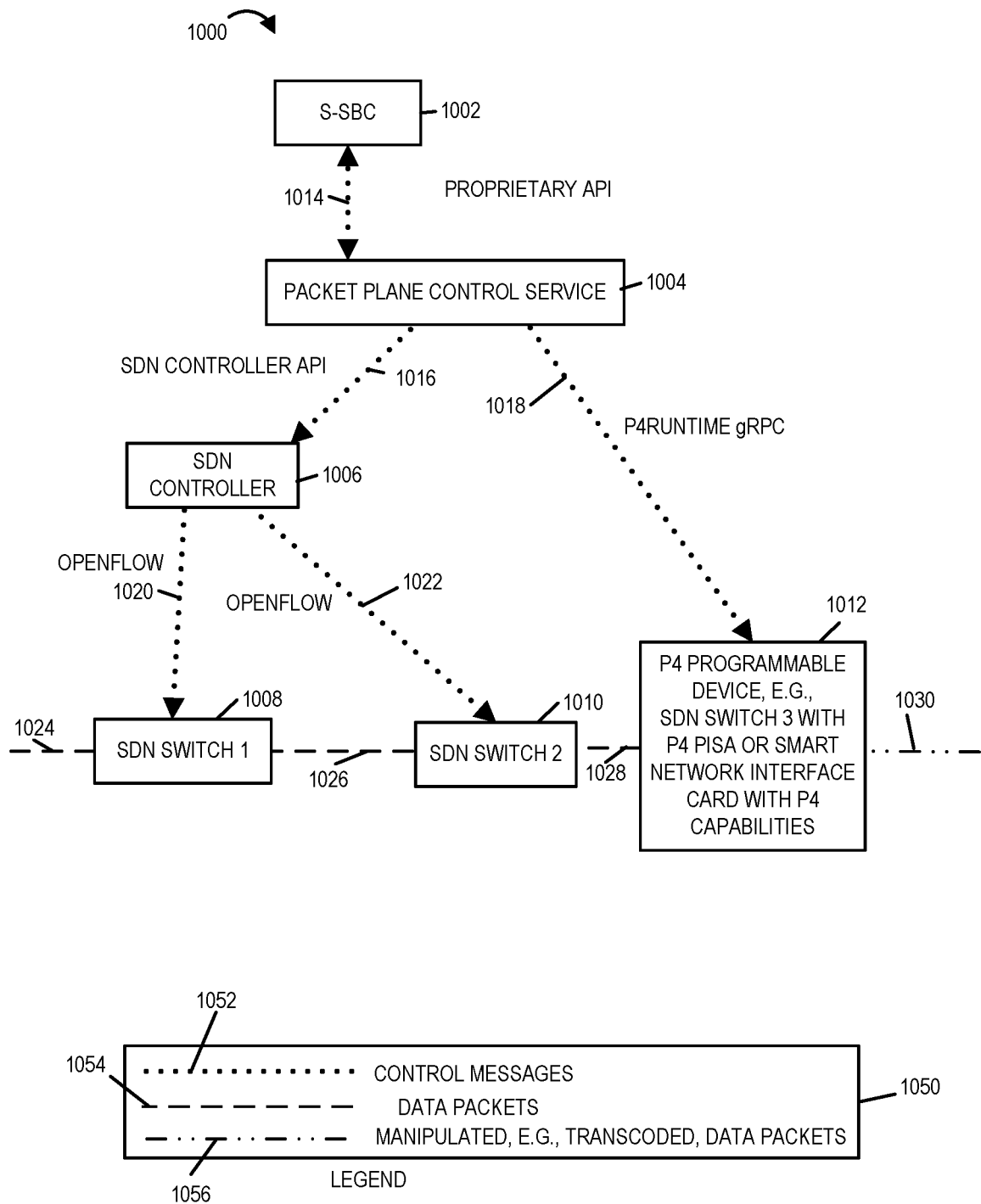
FIG. 11 illustrates another exemplary system in accordance with an embodiment of the present invention.

FIG. 11 illustrates an exemplary system 1000 in accordance with another embodiment of the present invention. System 1000 includes a S-SBC 1002, a packet plane control service entity 1004, an SDN Controller 1006, a SDN switch 1 1008, a SDN switch 2 1010, a P4 programmable device, e.g., a SDN switch 3 with P4 PISA or a SmartNIC with P4 capabilities, 1012, and a plurality of communications links 1014, 1016, 1018, 1020, 1022, 1024, 1026, 1028 and 1030.

The S-SBC 1002 is coupled and/or connected to the packet plane control service entity 1004 via communications link 1014 and uses a proprietary API to communicate with the packet plane control service entity 1004.

The packet plain control service entity 1004 is coupled to the SDN controller 1006 via communications link 1016 and uses an SDN controller API to communicate with the SDN controller 1006. The packet plane control service entity 1004 is coupled and/or connected to a P4 programmable device 1012, e.g., SDN switch 3 with P4 PISA or Smart Network Interface Card with P4 capabilities, via communication link 1018 and communicates with the SDN switch 3 using P4runtime gRPC. The SDN controller 1006 is coupled to the SDN switch 1 1008 via communications link 1020 and uses a SDN protocol which in this example is the Openflow protocol to communicate with the SDN switch 1 1008. The SDN controller 1006 is coupled to the SDN switch 2 1010 via communications link 1022 and uses a SDN protocol which in this example is the Openflow protocol to communicate with the SDN switch 2 1010. The SDN switches 1 1008 and 2 1010 in this example are both Openflow switches which support the Openflow protocol.

The communications link 1024 couples the SDN switch 1 1008 to a first peer device also referred to as an ingress peer device and is used to receive data packets of a media flow of a session from a first peer device not shown. The communications link 1026 couples the SDN switch 1 1008 to SDN switch 2 1010. The communications link 1028 couples the SDN switch 2 1010 to P4 programmable device 1012, e.g., SDN switch 3 with P4 PISA or SmartNIC with P4 capabilities. The communications link 1030 couples the P4 programmable device 1012, e.g., SDN switch 3 with P4 PISA or SmartNIC with P4 capabilities, to a second peer device also referred to as an egress peer device and is used to transmit data packets of a media flow of a session to the second peer device from the P4 programmable device 1012, e.g., SDN switch 3 with P4 PISA or SmartNIC with P4 capabilities. The second peer device is not shown in FIG. 11.

Legend 1050 shows that control messages in FIG. 11 are represented by dotted lines having the shape of dotted line 1052, that data packets in FIG. 11 are represented by dashed lines having the shape of dashed line 1054, and that manipulated, e.g., transcoded, data packets in FIG. 11 are represented by dashed dotted lines having the shape of dashed dotted line 1056.

An example of operations to implement a media pass-through with media manipulation micro-service will now be explained in connection with system 1000 shown in FIG. 11. The packet plane control service entity 1004 receives information from S-SBC 1002 for ingress/egress media IP/port and maximum allowed bandwidth. It also receives instructions for media manipulation of the RTP stream. The media manipulation being transcoding of the media of the RTP stream of the flow of the session. The packet plane control service entity 1004 determines that that transcoding requires services of a P4 switch with PISA supporting this capability. It further knows and/or determines that this P4 switch is not in the same domain as the domain providing generic IP connectivity and is not controlled by a SDN controller. The SDN controller 1006 being in a IP domain-1 and the SDN switch 3 with P4 PISA being in an IP domain-2. Therefore, the packet plane control service entity 1004 controls this P4 programmable device 1012 directly through P4Runtime gRPC. The packet plan control service entity 1004 instructs the SDN controller 1006 to create flow between the {ingress peer IP address/port, domain-2*} with the maximum allowed bandwidth as specified by the S-SBC 1002. The packet plane control service entity 1004 instructs the P4 programmable device 1012, e.g., SDN switch 3 with P4 PISA or SmartNIC with P4 capabilities, to create a flow between {SDN-Controller reported IP address/port, egress IP address/port} with the maximum allowed bandwidth specified by the S-SBC 1002. It further provides instructions for transcoding the media of the RTP data packets of the flow. The packet plane control service entity 1004 updates the SDN controller 1006 flow with the P4 programmable device 1012, e.g., SDN switch 3 with P4 PISA or SmartNIC with P4 capabilities reported IP address/port facing it. The packet plane control service entity 1004 reports the IP address/port allocated by the SDN switch 3 facing egress peer to the S-SBC 1002. Alternatively, the IP Address/port number or just the IP Address to be used by the P4 programmable device 1012 is provided by the Packet Plane Control Service entity 1004. In such embodiments, the P4 programmable switch addressing information for flows is controlled by and/or known to the packet plane control service entity and is not determined by the P4 programmable device.

A PISA SDN Switch may have capabilities to perform some application specific functionality, e.g., detecting/reporting IETF RFC 4733 based digits in RTP streams, in addition to supporting setting up flows. It could be the case that these two classes of functionalities need to be invoked by separate entities for reasons like separation of concern, security, etc. This model can be accommodated by using a SDN Controller controlling flows and Packet Plane Control Service controlling reporting functionality, both through P4Runtime gRPC. P4 multiple master controller support via a "Role Partitioning" capability is utilized for this mode.

Figure 12:
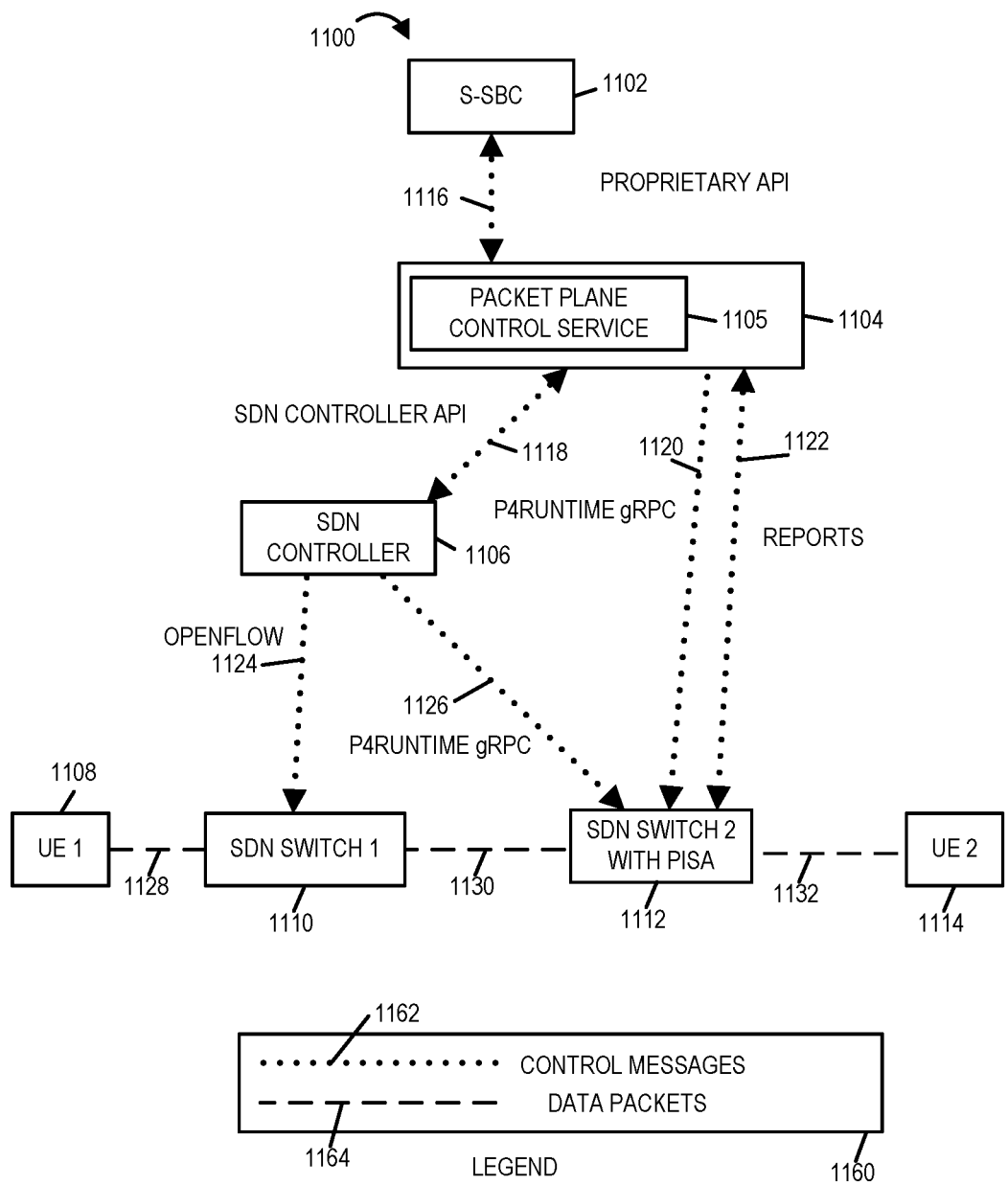
FIG. 12 illustrates another exemplary system in accordance with an embodiment of the present invention.

FIG. 12 illustrates an exemplary system 1100 in accordance with another embodiment of the present invention.

System 1100 includes a Signaling Session Border Controller (S-SBC) 1102, a packet plane control service device 1104, a Controller 1106, e.g., a Software Defined Network Controller, one or more programmable switches (SDN switch 1 1110, SDN switch 2 with PISA 1112), and one or more communications devices or peer devices, e.g., user equipment devices, UE 1 1108 and UE 2 1114). Communications links 1116, 1118, 1120, 1122, 1124, 1126, 1128, 1130, 1132 form a communications network that couples and/or connects together S-SBC 1102, packet plane control service entity 1104, controller 1106, UE 1 1108, UE 2 1114, SDN switch 1 1110 and SDN switch 2 with PISA 1112. The configuration of the system 1100 and the communications links 1116, 1118, 1120, 1122, 1124, 1126, 1128, 1130, and 1132 of the system is only exemplary and other configurations and/or communications link configuration may be, and in some embodiments are, implemented.

Legend 1160 shows that control messages in FIG. 12 are represented by dotted lines having the shape of dotted line 11162 and that data packets in FIG. 12 are represented by dashed lines having the shape of dashed line 1164.

The packet plane control service device 1104 is a device which hosts a packet plane control service 1105. The packet plane control service 1105 being an application or virtual network function executing on the device 1104. In some embodiments, the device 1104 is a node, e.g., a compute node, including a processor and memory or being connected to memory. The node in some embodiments is located in a cloud.

In some embodiments, the S-SBC 1102 and packet plane control service 1105 are implemented as applications on a single hardware device, e.g., a network device including one or more processors and memory which includes instructions that control the network device. In some embodiments, the S-SBC 1102 is implemented as a virtual S-SBC on a compute node located in the cloud. In some embodiments, the packet plane control service is an application implemented on the same or a different compute node in the cloud as the S-SBC 1102.

While the communications devices shown in the exemplary system 1100 are user equipment devices or endpoint devices, the invention is also applicable to peer devices or network equipment devices that initiate and/or process or route communications sessions, traffic, calls or flows.

In FIG. 12, UE 1 1108 exchanges session setup signaling with S-SBC 1102 to establish a communications session, e.g., a Voice Over Internet Protocol session also referred to as a VOIP call, with UE 2 1114. The S-SBC 1102 sends control messages or instructions over the communication link 1116 to the packet plane control service application 1105.

In some embodiments, the packet plane control service device 1104 includes an application programming interface, e.g., a proprietary application programming interface, which is used by the S-SBC 1102 to send the control messages or instructions to the packet plane control service application 1105.

The control messages and/or instructions include instructions and/or a request for establishing: (i) a micro-service and (ii) setting up a data path or flow for the communications session between UE 1 1108 and UE 2 1114. The micro-service which in some embodiments is an application specific function, in this example is detecting and reporting of Internet Engineering Task Force (IETF) Request For Comment (RFC) 4733 digits in Real-time Transport Protocol (RTP) packet payloads of a RTP packet stream of the communications session established between UE 1 1108 and UE 2 1114.

In some embodiments, the micro-service or application specific function of the packet plane control service 1105 is invoked by the S-SBC 1102 sending to the packet plane control service a command, e.g., detect and report digits, with a command parameter being an identifier for the RTP stream, media flow or data flow from which the digits are to be detected and reported. The identifier in some embodiments is a 5-tuple (source IP address, source port, destination IP address, destination port, transport protocol) which uniquely identifies the RTP stream, media flow or data flow session.

In various embodiments, the control messages and/or instructions from the S-SBC 1102 to the packet plane control service 1105 include a first IP address and port number of the UE 1 1108 and a second IP address and port number of the UE 2 1114. The first IP address and port number of the UE 1 1108 being the IP address and port from which RTP packets of the RTP packet stream of the communications session will be transmitted to the UE 2 1114, i.e., source IP address and port number of the RTP packet stream. The second IP address and port number of the UE 2 1114 is the IP address and port number of UE 2 which is to receive the packets of the RTP packet stream of the communications session, i.e., the destination IP address and port number of the RTP packet stream. The control messages and/or instructions further include the type of transport protocol being used for the RTP packet stream. This information is used to identify the RTP packet stream or flow.

The packet plane control service application 1105 in response to the received control messages and/or instructions and/or request for establishing: (i) the micro-service of digit detection and reporting and (ii) setting up a data path or flow for the communications session between UE 1 1108 and UE 2 1114 generates control messages and/or instructions for the SDN controller 1106 which when implemented by the SDN controller setup a data path or flow for the RTP packet stream of the communications session between UE 1 1108 and UE 2 1114. The packet plane control service application 1105 also generates control messages and/or instructions for controlling a programmable device, e.g., a switch or SmartNIC with P4 capabilities to implement the digit detection and reporting functionality. In this example, the SDN switch 2 with PISA 1112 is the programmable device.

In this example, the system 1100 has for security purposes partitioned or split the roles and responsibilities of generating flows, paths, or routes through the elements of the system 1100 with the implementation of micro-services on data packets of media packet streams, e.g., RTP packet, and/or data flows being routed through the elements of the system 1100. In this example, the SDN controller 1106 has been entrusted with creating and controlling data flows, routes, or paths through the system while the packet plane control service 1105 is response for controlling the implementation of micro-services on data packets of flows and/or media streams passing through the elements of system 1100.

The packet plane control service application 1105 sends the generated control messages and/or instructions to setup the data path or flow for the RTP packet stream of the communications session between UE 1 1108 and UE 2 1114 to the SDN controller 1106. In the generated control messages and/or instructions to the SDN controller the packet plane control service identifies the SDN switch 2 with PISA 1112 as being a switch that needs to be included in the data path or flow for the RTP packet stream of the communications session between UE 1 1108 and UE 2 1114. This is so because the packet plane control service 1105 has identified that the SDN switch 2 with PISA 1112 is to be used to implement the micro-service of digit detection and reporting. The generated control messages and/or instructions sent to the SDN include information to identify the RTP packet stream. This is typically the 5-tuple information received from the S-SBC 1102.

In response to control messages and/or instruction to setup the data path or flow for the RTP packet stream of the communications session between UE 1 1108 and UE 2 1114, the SDN controller determines a path or route including the SDN switch 1 1110 and the SDN Switch 2 with PISA 1112. The SDN controller generates control messages and/or instructions for the SDN switch 1 1108 to receive packets of the RTP packet and forward the packets to the SDN switch 2 1112. These control messages and/or instructions are SDN protocol messages and/or instructions, e.g., Openflow protocol messages when the SDN controller and SDN switch 1 1108 are Openflow devices. The SDN controller generates and sends control messages and instructions to the SDN switch 2 with PISA 1112 to set-up the portion of the path from the SDN switch 1 1110 to the UE 2 1114. These control messages and/or instructions are communicated to the SDN Switch 2 with PISA 1112 using the P4Runtime gRPC.

The SDN controller sends control messages to the packet plane control service 1105 in response to the request to setup the flow, route or path for the RTP packet stream from the UE 1 1108 to the UE 2 1114 with the packets of the RTP packet stream passing through the SDN switch 2 with PISA 1114. These control messages sent to the packet plane control service 1105 including routing information for the establishment of the path, route, or flow from the UE 1 1108 to the UE 2 1114. In some embodiments, this information includes an ingress IP address and port number of the SDN switch 1 1110, an egress IP address and port number of the SDN switch 1 1110, an ingress IP address and port number of the SDN switch 2 with PISA 1112, an egress IP address and port number of the SDN switch 2 with PISA 1112.

The packet plane control service application 1105 sends the generated control messages and/or instructions to implement the micro-service of digit detection and reporting to programmable switch 2 1112. Programmable switch 2 1112 in this example as previously discussed is a SDN switch with PISA, e.g., the SDN switch is a P4 switch having P4 functionality. The control messages and/or instructions generated by the packet plane control service application 1105 and sent to the programmable switch 2 1112 are P4Runtime remote procedure calls (P4Runtime RPC).

The packet plane control service 1105 includes in the control messages and/or instructions sent to the SDN switch 2 with PISA 1112 information for identifying the RTP packet stream on which the microservice is to be performed. In this example, this information includes the egress IP address and port number of the SDN switch 1 from which packets of the RTP packet stream will be sent and the ingress IP address and port number of the SDN switch 2 1112 on which they packets are to be received at the SDN switch 2 1112. This information identifies to the SDN switch 2 1112, the RTP packet stream of the communications session on which the SDN switch 2 1112 is to implement the instructions to perform the digit detection and reporting micro-service.

The packet plane control service 1105 communicates the SDN switch 1 ingress IP address and port number and the SDN switch 2 egress IP address and port number for the RTP packet stream to the S-SBC 1102 in response to the request and/or command and/or instruction from the S-SBC 1102 to the packet plane control service 1105 to set up a data path or flow for the RTP packet stream of the communications session between UE 1 1108 and UE 2 1114. The S-SBC 1102 communicates to the UE 1 1108 the ingress IP address and port number of the SDN 1 1110 switch to which the UE 1 1108 is to transmit packets of the RTP packet stream destined for the UE 2 1114. The S-SBC 1102 sends the UE 2 1114 the egress IP address and port number of SDN switch 2 from which the UE 2 1114 is to receive packets of the RTP packet stream of the communications session.

Upon completion of the session establishment for the media of the communications session between the UE 1 1108 and UE 2 1114, the UE 1 1108 beings transmitting data packets of the RTP packet stream from the first IP address and port number of the UE 1 1108 to the ingress IP address and port number of the SDN switch 1 1110. The SDN switch 1 1110 receives the data packets for the RTP packet stream on the ingress IP address and port number of the SDN switch 1 1110 and outputs the packets from the egress IP address and port number of the SDN switch 1 1110 to the ingress IP address and port number on the SDN switch 2 with PISA 1112. The SDN switch 2 with PISA receives the data packets of the RTP stream from the egress IP address and port number of the SDN switch 1 1110 via the ingress IP address and port number of the SDN switch 2 1112. The SDN switch 2 determines that the received data packets are part of the RTP packet stream of the communications session between UE 1 1108 and UE 2 1114 and implements the digit detection and reporting micro-service on the received data packets of the RTP packet stream by executing the instructions received from the packet plane control service 1105. Upon the detection of digits by the SDN switch 2 with PISA 1112, the SDN switch 2 1112 reports the detected digits to the packet plane control service 1105 via the P4Runtime gRPC protocol using the communications link 1122. In various embodiments the same communications link used to send the control messages and instructions to the SDN switch 2 from the packet plane control service 1105 is used to also send the reports of detected digits while in other embodiments a separate interface and/or communications link is used by the SDN switch and/or packet plane control service 1105 to send and receive the detected digits report(s).

The packet plane control service 1105 receives the detected digits reports from the SDN switch 2 1112. The packet plane control service 1105 forwards the report or information on the digits detected in the RTP session to the S-SBC 1102 using the application programming interface used to exchange messages, data, requests, instructions, commands and/or information between the S-SBC 1102 and the packet plane control service 1105.

In this example, the SDN switch 2 1114 continues to detect and report the detected digits to the packet plane control service until the RTP packet stream is terminated. The packet plane control service 1105 continues to receive the reports on the detected digits of the RTP stream and send the reports and/or information about the detected digits to the S-SBC 1102 until the RTP packet stream is terminated.

Figure 19:
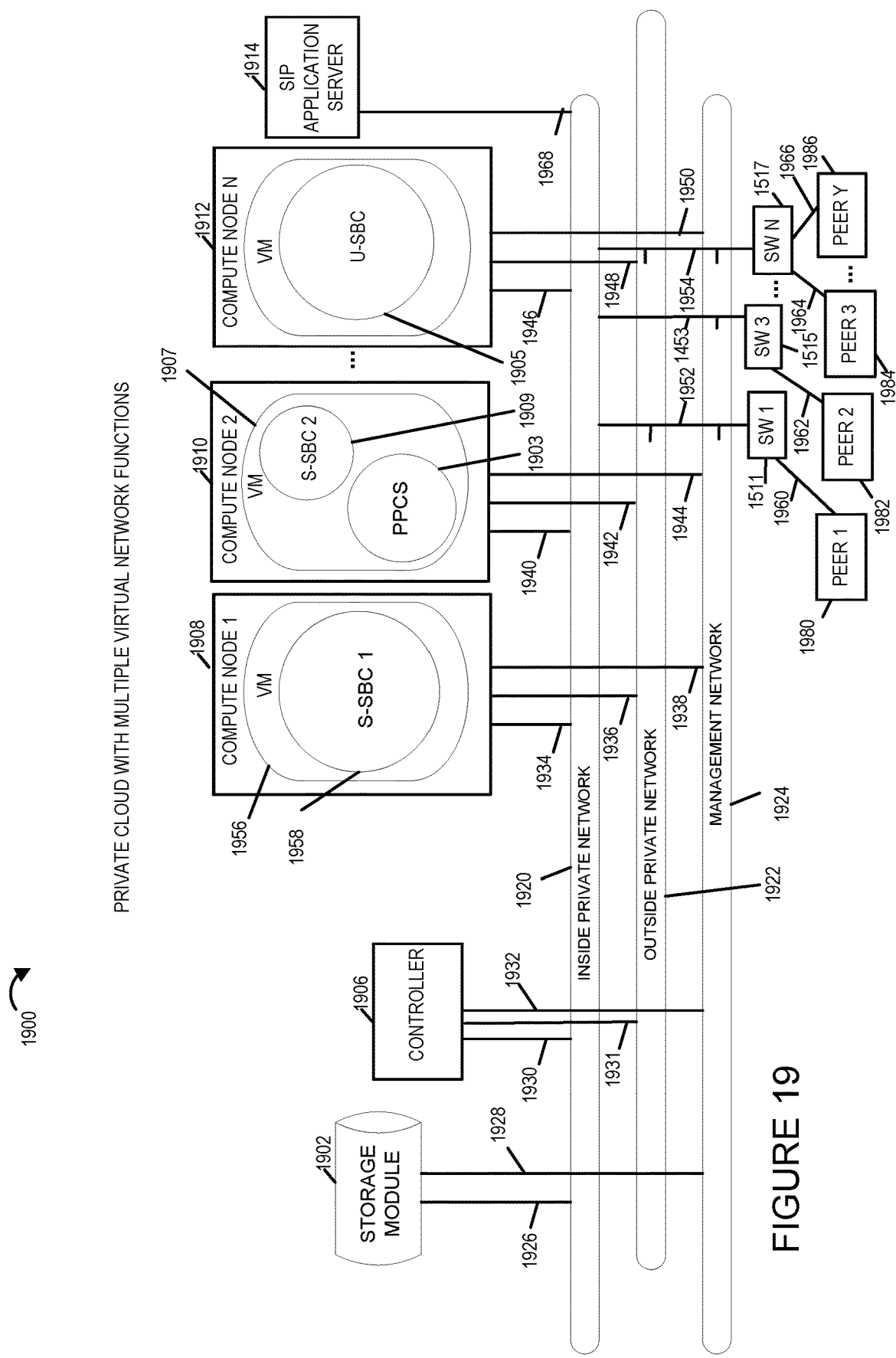
FIG. 19 illustrates an exemplary private cloud system with a virtual network functions in accordance with an embodiment of the present invention.
Figure 20A:
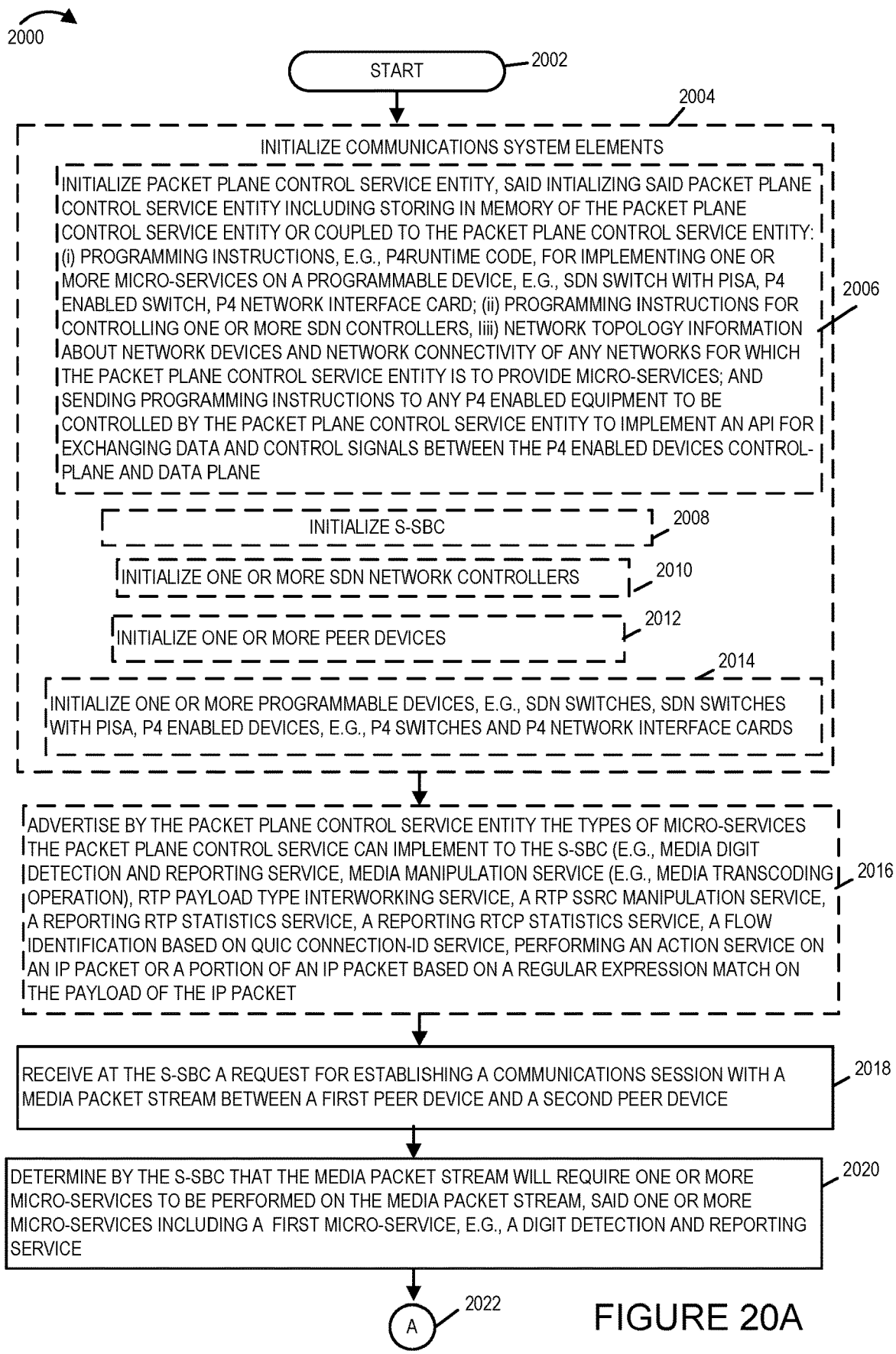
FIG. 20A illustrates a first part of a flowchart of an exemplary method in accordance with an embodiment of the present invention.
Figure 20C:
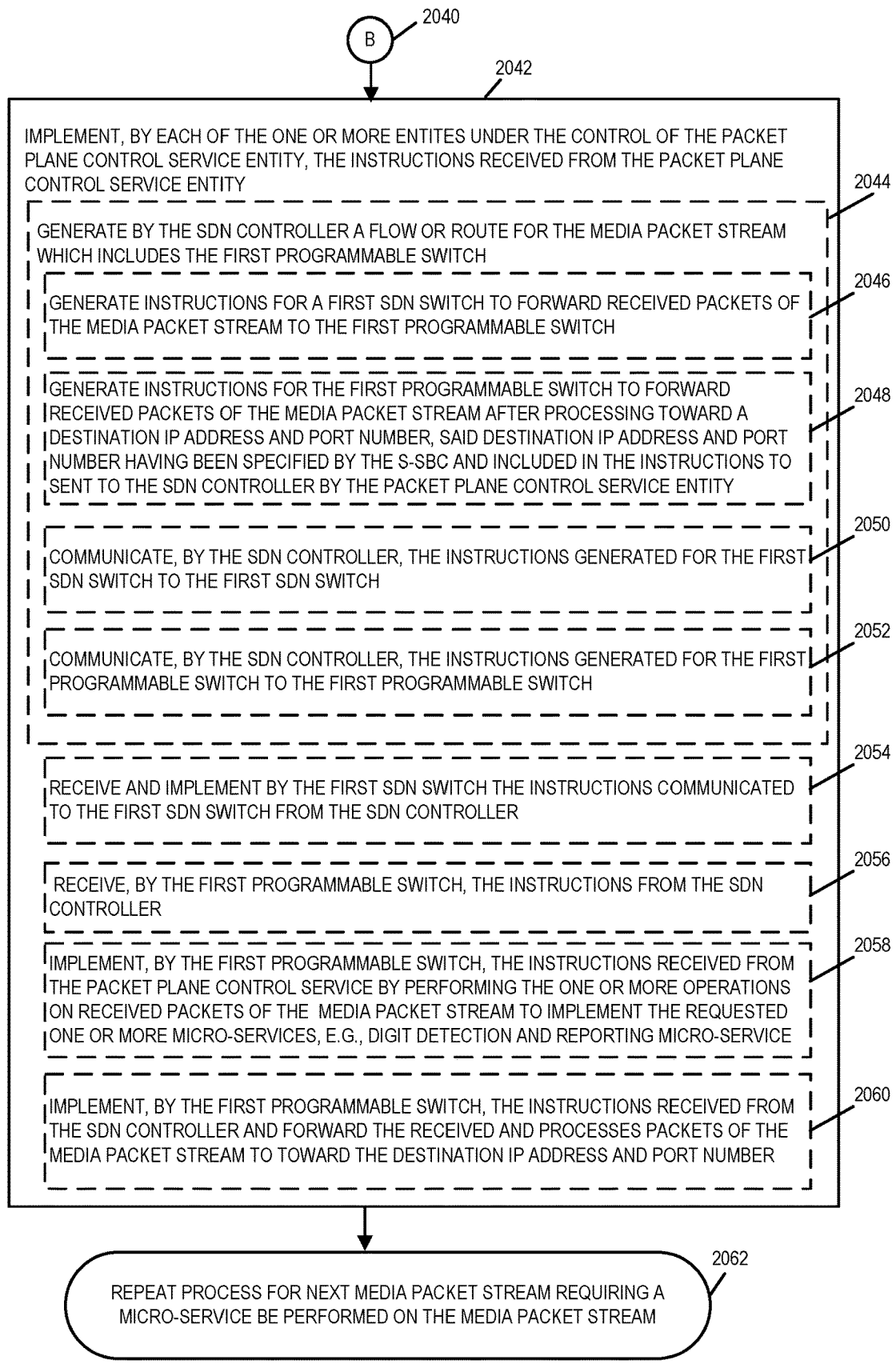
FIG. 20C illustrates a third part of a flowchart of an exemplary method in accordance with an embodiment of the present invention.

FIG. 20, comprising the combination of FIGS. 20A, 20B, and 20C is a flowchart 2000 of an exemplary communications method in accordance with an exemplary embodiment. The exemplary method 2000 may be, and in some embodiments is, implemented on nodes/entities/devices in the various exemplary systems disclosed in various Figures such as for example system 1100 of FIG. 12 and system 1900 of FIG. 19 or on the SBCs, packet plane control service entities, SDNs, SDN switches with PISA, P4 switches or programmable switches and/or devices/nodes/entities disclosed in such systems. It is to be understood that the communications method 2000 may be implemented on other systems and that the systems identified are only exemplary. While not discussed the control signaling for establishing the media session may, and typically is, also routed via the SDN switches to the S-SBC by instructions installed in the programmable SDN switches by the S-SBC via the SDN controller or packet plane control service entity. The method 2000 focuses on the steps which are important to understanding various aspects of the invention. It is to be understood that additional signaling and/or steps is required for establishing communications session and maintaining communications sessions and communicating information and/or instructions between devices such as acknowledgements which have not been shown or discussed for the sake of simplifying the explanation.

Communications method 2000 starts in start step 2002 shown on FIG. 20A and proceeds to optional step 2002. If optional step 2002 is not implemented operation proceeds to optional step 2004. In step 2002, the elements of the communications system are initialized. In some embodiments, step 2004 includes one or more sub-steps 2006, 2008, 2010, 2012, and 2014.

In sub-step 2006, the packet plane control service entity (e.g., packet plane control service device 1104 of FIG. 12) is initialized. The initialization of the packet plane control service entity includes storing in memory of the packet plane control service entity or coupled to the packet plane control service entity: (i) programming instructions for implementing one or more micro-services on a programmable device, e.g., SDN switch with PISA, P4 enabled switch, P4 network interface card, P4 switch, (ii) programming instructions for controlling one or more SDN controllers, (iii) network topology information about network devices and network connectivity of any networks for which the packet plane control service entity is to provide micro-services. In some embodiments the programming instructions are P4Runtime instructions. In addition, the packet plane control service entity during initialization may, and in some embodiments does, send programming instructions to any P4 enabled equipment to be controlled by the packet plane control service entity to implement an Application Programming Interface for exchanging data and control signals between the P4 enabled equipment's control-plane and data plane.

In sub-step 2008, an S-SBC, e.g., S-SBC 1102 of FIG. 12, is initialized.

In sub-step 2010, one or more SDN controllers (e.g., SDN controller 1106 of FIG. 12) is initialized.

In sub-step 2012, one or more peer devices, e.g., user equipment devices are initialized (e.g., UE 1 1108 and UE 2 1114 of FIG. 12).

In sub-step 2014, one or more programmable devices (e.g., SDN switches, SDN switches with PISA, P4 enabled devices, e.g., P4 switches and P4 network interface cards) are initialized. For example, SDN switch 1 1110, SDN switch 2 with PISA 1114. Operation proceeds from optional step 2004 to optional step 2016. If optional step 2016 is not implemented operation proceeds to step 2018.

In step 2016, the packet plane control service entity advertises the types of micro-services the packet plane control can implement to the S-SBC. For example such services may and in some embodiments do include one or more of the following micro-services: (i) media digit detection and reporting service, (ii) media manipulation service (e.g., media transcoding operation), (iii) RTP payload type interworking service, (iv) a RTP SSRC identification manipulation service, (v) a reporting RTP statistics service, (vi) a reporting RTCP statistics service, (vii) a flow identification based on QUIC connection-ID service; or (viii) performing an action service on an Internet Protocol (IP) packet or a portion of an IP packet based on a regular expression match on the payload of the IP packet (e.g., dropping an IP packet which has an IP payload which matches a particular expression or matching criteria). Operation proceeds from step 2016 to step 2018.

In step 2018, a request for establishing a communications session with a media packet stream between a first peer device, e.g., UE 1 1108 of FIG. 12, and a second peer device, e.g., UE 2 1114, is received at the S-SBC, e.g., S-SBC 1102 of FIG. 12. Operation proceeds from step 2018 to step 2020.

In step 2020, the S-SBC determines that the media packet stream, e.g., an RTP stream, will require one or more micro-services including a first micro-service, e.g., a digit detection and reporting service. Operation proceeds from step 2020 via connection node 2022 to step 2024 shown on FIG. 20B.

In step 2024, the packet plane control service entity receives the request from the Signaling-Session Border Controller (S-SBC) to implement one or more micro-services on the media packet stream for the communications session to be established. The request includes information about the media packet stream. The information about the media packet stream including media packet stream identification information (e.g., source IP address and port number, destination IP address and port number and transport protocol to be used for the media packet stream). Operation proceeds from step 2024 to step 2026.

In step 2026, the packet plane control service entity generates instructions for one or more entities under the control of the packet plane control service entity to implement the requested one or more micro-services on the media packet stream. The instructions including media stream identification information. In the system of FIG. 12 in this example, the packet plane control service entity controls SDN controller 1106 and SDN switch 2 with PISA 1112. Operation proceeds from step 2026 to step 2028.

In step 2028, the packet plane control service entity communicates to the one or more entities under the control of the packet plane control service entity, the generated instructions to implement the requested one or more micro-services on the media packet stream. In some embodiments step 2028 includes one or more sub-steps 2030 and 2032.

In sub-step 2030, the packet plane control service entity communicates to a SDN controller controlled by the packet plane control service entity, instructions to create a flow or route for the media packet stream including a first programmable switch (e.g., SDN switch 2 1112 of FIG. 12) controlled by the packet plane control service entity. In some embodiments, the packet plane control service entity uses and SDN controller API to communicate the instructions.

In sub-step 2032, the packet plane control service entity communicates instructions to the first programmable switch to perform one or more operations on the media packet stream to implement the requested one or more micro-services, e.g., digit detection and reporting micro-service. In some embodiments, the packet plane control service entity uses P4Runtime gRPC protocol to communicate the instructions, e.g., P4Runtime instructions to the SDN switch 2 with PISA 1112. In some embodiments, the SDN switch 2 1112 is a P4 switch. In this example, the instructions communicated in sub-steps 2030 and 2032 would have been generated in step 2026. Operation proceeds from step 2028 to step 2034.

In step 2034, the instructions generated for and communicated to the entities controlled by the packet plane service entity for implementing the one or more micro-services is received by the entities to which the instructions were communicated. In some embodiments step 2034 includes one or more sub-steps 2036 and 2038. In sub-step 2036, the SDN controller receives the instructions generated for and communicated to the SDN controller. In sub-step 2038, the first programmable switch receives the instructions generated for and communicated to the first programmable switch. Operation proceeds from step 2034 via connection node B 2040 to step 2042 shown on FIG. 20C.

In step 2042, each of the one or more entities under the control of the packet plane control service entity implements the instructions received from the packet plane control service entity therein implementing the requested one or more micro-services on the media packet stream. In some embodiments, step 2044 includes one or more sub-steps 2044, 2054, 2056, 2058, and 2060.

In sub-step 2044, the SDN controller generates a flow or route for the media packet stream which includes, i.e., passes through, the first programmable switch. In some embodiments sub-step 2044 includes one or more sub-steps 2046, 2048, 2050, and 2052. In sub-step 2046, the SDN controller generates instructions for a first SDN switch (e.g., SDN switch 1 1110 of FIG. 12) to forward received packets of the media packet stream to the first programmable switch (e.g., SDN switch 2 1112). In step 2048, the SDN controller generates instructions for the first programmable switch to forward received packets of the media packet stream after processing toward a destination IP address and port number, said destination address and port number having been specified by the S-SBC and included in the instructions sent to the SDN controller by the packet plane control service entity. In sub-step 2050, the SDN controller communications the instructions generated for the first SDN switch to the first SDN switch. In sub-step 2052, the SDN controller communicates the instructions generated for the first programmable switch to the first programmable switch.

In sub-step 2054, the first SDN switch receives and implements the instructions communicated to the first SDN switch from the SDN controller, i.e., packets of the media packet stream received by the first SDN switch (e.g., SDN switch 1110) are forwarded to the first programmable switch (e.g., SDN switch 2 with PISA 1112).

In sub-step 2056, the first programmable switch receives the instructions from the SDN controller.

In sub-step 2058, the first programmable switch implements the instructions received from the packet plane control service entity by performing the one or more operations on received packets of the media packet stream to implement the requested one or more micro-services, e.g., digit detection and reporting micro-service.

In sub-step 2060, the first programmable switch implements the instructions received from the SDN controller and forwards the received and processed packets of the media packet stream toward the destination IP address and port number. Operation proceeds from step 2042 to step 2062.

In step 2062, the process is repeated for the next media packet stream requiring a micro-service be performed on the media packet stream.

In some embodiments of the method 2000, the method further comprises the step of prior to generating said instructions, determining by the packet plane control service entity, (i) which of the one or more entities under the control of the packet plane control service entity can implement the requested one or more micro-services on the media packet stream or (ii) which combination of the one or more entities under the control of the packet plane control service entity can implement the requested one or more micro-services on the media packet stream. In some such embodiments, the packet plane control service entity makes the determination on network topology available to the packet plane control service entity as well as the known functionality of the entities under the control of the packet plane control service entity. In some embodiments of the method 2000, the packet plane control service entity obtains from the SDN controller information about the flow or route established by the SDN controller for the media packet stream and communicates that information to the S-SBC in response to the request for micro-services. In some embodiments, this includes sending to the S-SBC a first IP address and port number for sending packets of the media packet stream upon which the one or more micro-services is to be performed and sending to the S-SBC a second IP address and port number from which packet of the media packet stream will be egress after the one or more micro-services has been performed on the packets of the media packet stream. This information being used to establish the media packet stream between the first peer device and the second peer device. In some embodiments, the request of the route or path through the SDN network is a micro-service.

In some embodiments of the method 2000 the packet plane control service entity maintains network topology information including information on each of the programmable devices, e.g., SDN switches, P4 switches, P4 SmartNIC devices under the packet plane control service entity's control as well as information on the current utilization of each of those devices. In some of such embodiments, the packet plane control service determines the devices under its control through which packets of the media packet stream are to be routed. The instructions generated by the packet plane control service entity for each of the devices through which packets of the media packet stream are to be routed including information for each device to establish the flow, e.g., ingress and egress IP and/port number addressing for each device through which the packet is to flow. For example, the packet plane control service entity identifying for each device an ingress 5-tuple (source IP address, port number, destination IP address and port number, transport protocol) and an egress 5-tuple (source IP address, port number, destination IP address and port number, transport protocol).

In some embodiments of the method 2000 the S-SBC maintains network topology information including information on each of the programmable devices, e.g., SDN switches, P4 switches, P4 SmartNIC devices under the packet plane control service entity's control as well as information on the current utilization of each of those devices. In some of such embodiments, the S-SBC determines the devices under the packet plane control service entity's control through which packets of the media packet stream are to be routed. The S-SBC sending to the packet plane control service entity with its request for a micro-service information identifying for the packet plane control service entity the devices through which packets of the media packet stream are to be routed including information for each device to establish the flow, e.g., ingress and egress IP and/port number addressing for each device through which the packet is to flow. For example, the S-SBC identifying for each device an ingress 5-tuple (source IP address, port number, destination IP address and port number, transport protocol) and an egress 5-tuple (source IP address, port number, destination IP address and port number, transport protocol). The packet plane control service entity upon receipt of the request generates and sends instructions to the devices under its control either directly or indirectly, e.g., via an SDN controller, to implement the requested micro-service using the path identified in the request by the S-SBC.

FIG. 19 illustrates an exemplary private cloud system 1900 with a virtual signaling-SBC 1 1958 instantiated on a virtual machine 1956, a S-SBC 2 1909 instantiated on a virtual machine 1907, a packet plane control service entity 1903 also instantiated on the virtual machine 1907, a virtual U-SBC 1905 instantiated on a virtual machine on compute node N, in accordance with an embodiment of the present invention. In some embodiments, the packet plane control service entity 1903 is instantiated in a separate virtual machine than the S-SBC 2 but on the same compute node 2 as the S-SBC 2. In some embodiments, the packet plane control service entity 1903 is implemented on a virtual machine on a separate compute cloud from other virtual network functions.

The exemplary cloud system 1900 shown is a private cloud but the system may be, and in many embodiments is, implemented in a public cloud. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as signaling-SBC, U-SBC, and/or packet plane service control applications.

The system includes a storage module 1902, a controller 1906, a plurality of compute nodes, an optional SIP application server 1914, a SIP peer device 1 1980, SIP peer device 2 1982, SIP peer device 3 1984, . . . , SIP peer device Y 1986, programmable switch SW 1 1511, programmable switch 3 1515, . . . , programmable switch N 1517, an inside private communications network 1920, an outside private communications network 1922, a management network 1924, and a plurality of communications links 1926, 1928, 1930, 1931, 1932, 1934, 1936, 1938, 1940, 1942, 1944, 1946, 1948, 1950, 1952, 1953, 1954, 1960, 1962, 1964, . . . , 1966, and 1968. The inside private communications network 1920, the outside private communications network 1922, the management network 1924, and the plurality of communications links 1926, 1928, 1930, 1931, 1932, 1934, 1936, 1938, 1940, 1942, 1944, 1946, 1948, 1950, 1952, 1954, 1960, 1962, 1964, . . . , 1966 and 1968 are used to exchange messages, information and instructions between the various devices, endpoints, nodes, and entities in the system.

The plurality of compute nodes includes a compute node 1 1908, a compute node 2 1910, . . . , a compute node N 1912 where N is a positive number. The compute node 1 includes a virtual machine 1956 and a signaling-SBC application 1958. The compute node running a signaling-session border controller 1958, is a virtualized signaling-SBC device. Each of the compute nodes 2 1910, . . . , N 1912 include a virtual machine and one or more virtualized network function applications. For example, compute node 1910 including virtual machine 1907 running S-SBC 2 1909 and Packet Plane Control Service 1903. The resources, e.g., processing capabilities available to each of the virtual signaling-SBC, media processing of U-SBC and packet plane control service applications may be, and typically is, different, for example based on how the virtual applications are configured. The compute node 1 1908 is coupled to: the inside private network 1920 via communication link 1934, the outside private network 1922 via communications link 1936, and the management network 1924 via communications link 1938. The compute node 2 1910 is coupled to: the inside private network 1420 via communications link 1940, the outside private network 1922 via communications link 1942, and the management network 1924 via communications link 1944. The compute node N 1912 is coupled to: the inside private network 1920 via communication link 1946, the outside private network 1922 via communications link 1948, and the management network 1924 via communications link 1950.

The storage module 1002 is a storage device, e.g., memory, for storing instructions, information, and data. The storage module 1902 is coupled to the inside private network 1020 via communications link 1926 and to the management network 1924 via communications network 1928.

The controller 1906 is an SDN controller that operates to configure and manage the private cloud system. The controller 1906 is coupled to the inside private network 1920 via communications link 1930, the outside private network 1922 via communications link 1931, and the management network 1924 via communications link 1932. In some embodiments, the controller includes an orchestrator device or module, a Virtual Network Function manager device or module, and an element management system device or module. The orchestrator controls the orchestration and management of network function virtualized infrastructure and software resources and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualization of a network function. In this example, the virtualized network functions are signaling-SBCs, a U-SBC, packet plane control service application. The element management system or module performs management functions for one or several of the virtual network functions, e.g., virtual signaling termination application and media interworking application. Each compute node includes one or more processors. In some embodiments, one or more of the compute nodes in the system include a single processor upon which multiple virtual signaling-SBCs, U-SBCs and/or packet plane control service applications are instantiated. In some embodiments, each virtual signaling termination application and media interworking application is a set of programming instructions forming a signaling-SBC application, U-SBC application or a packet plane control service application which is executed on a processor of a compute node.

The SIP application server 1914 is coupled to the inside private network 1920 via communications link 1968.

The programmable switch SW 1 1511 is coupled to the inside private network 1920, the outside private network 1922, and the management network 1924 via communications link 1952. The programmable switch 3 1515 is coupled to the inside private network 1920, the outside private network 1922, and the management network 1924 via communications link 1953. The programmable switch N 1517 is coupled to the inside private network 1920, the outside private network 1922, and the management network 1924 via communications link 1954. Devices, elements and/or items shown in different Figures identified by the same number are to be considered the same or similar and having the same or similar functionality. The programmable switches SW 1 1511, SW 3 1515, . . . , SW N 1517 may be, and in some embodiments are, a combination of SDN switches, e.g., Openflow switches and P4 switches. The peer 1, peer 2 and peer 3, . . . , peer Y devices are communications devices the same as or similar to the communications devices UE 1 and UE 2 of FIG. 12.

The methods and steps described in connection with the S-SBC, U-SBC, packet plane control service entity, SDN controller, programmable switches, SDN switches, SDN enhanced switched with PISA, P4 switches, SDN switches with P4 capabilities of the various embodiments described herein may be, and sometimes are, implemented on the private cloud system 1900 of FIG. 19. In some such embodiments, instead of a private cloud system a public cloud system is employed.

Figure 22:
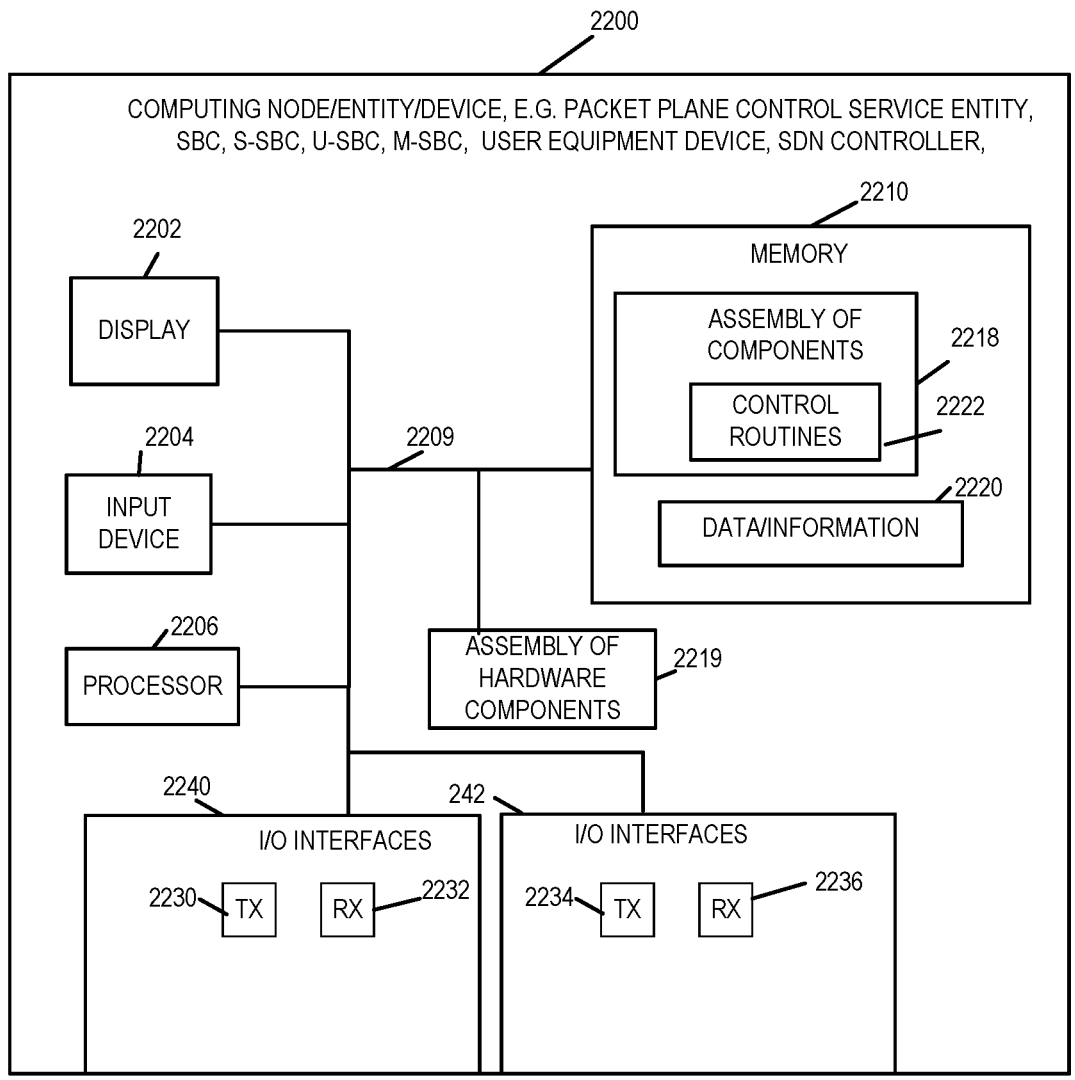
FIG. 22 illustrates an exemplary computing device in accordance with an embodiment of the present invention.

FIG. 22 illustrates an exemplary embodiment of a computing node/device/entity that may be, and in some embodiments is, used to implement nodes/devices/entities of various systems described in the Figures including nodes/devices/entities in FIGS. 2-12, e.g., a communications device or user equipment device (e.g., a packet plane control service entity/device/node, a User Equipment (UE) device such as for example, a computer or smartphone), a peer device, a SDN controller, an enhanced SDN controller with ability to program devices supporting P4 technology, e.g., SDN switch with PISA, a SBC, a S-SBC, a U-SBC, or a M-SBC) in accordance with embodiments of the present invention. Exemplary computing node/device/entity 2200 includes a display 2202, an input device 2204, a processor 2206, e.g., a CPU, input/output (I/O) interfaces 2240 and 2242, which couple the computing device to a network, e.g., SDN network or various other networks or devices including, e.g. programmable communications devices such as programmable switches and network interface cards, and an assembly of components 2219, e.g., circuits corresponding to different components, coupled together via a bus 2209 over which the various elements may interchange data and information. Memory 2210 includes an assembly of components 2218, e.g., an assembly of software components, and data/information 2220. The assembly of software components 2218 includes a control routines component 2222 which when processed and executed by the processor 2206 controls the operation of the computing device 2200 to perform various functions and/or one or more steps of the various method embodiments of the invention. The I/O interface 2240 includes transmitters 2230 and receivers 2232. The I/O interface 2242 includes transmitters 2234 and receivers 2236. The I/O Interfaces include hardware transmitters and receivers. The computing device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session, P4 language, P4Runtime over gRPC. In some embodiments the I/O interfaces include IP address/port pairs. The I/O Interfaces are hardware interfaces. The I/O interfaces in some embodiments are configured to communicate in accordance with the Internet Protocol, Transport Control Protocol (TCP), User Datagram Protocol (UDP), Session Initiation Protocol (SIP), Session Description Protocol (SDP), SDN control protocol (e.g., OpenFlow protocol) and/or other communications protocols. In some embodiments, the computing device 200 includes a communication component configured to operate using SDN, IP, TCP, UDP, SDP, SIP, P4 protocol signaling methods. In some embodiments, the communication component is a hardware component, a software component or a component including hardware and software components. In some embodiments, the packet plane control service entity, S-SBC, SDN controllers, U-SBC, user equipment devices and peer devices of FIGS. 2-12 are implemented in accordance with computing device 2200 of FIG. 22.

Figure 21:
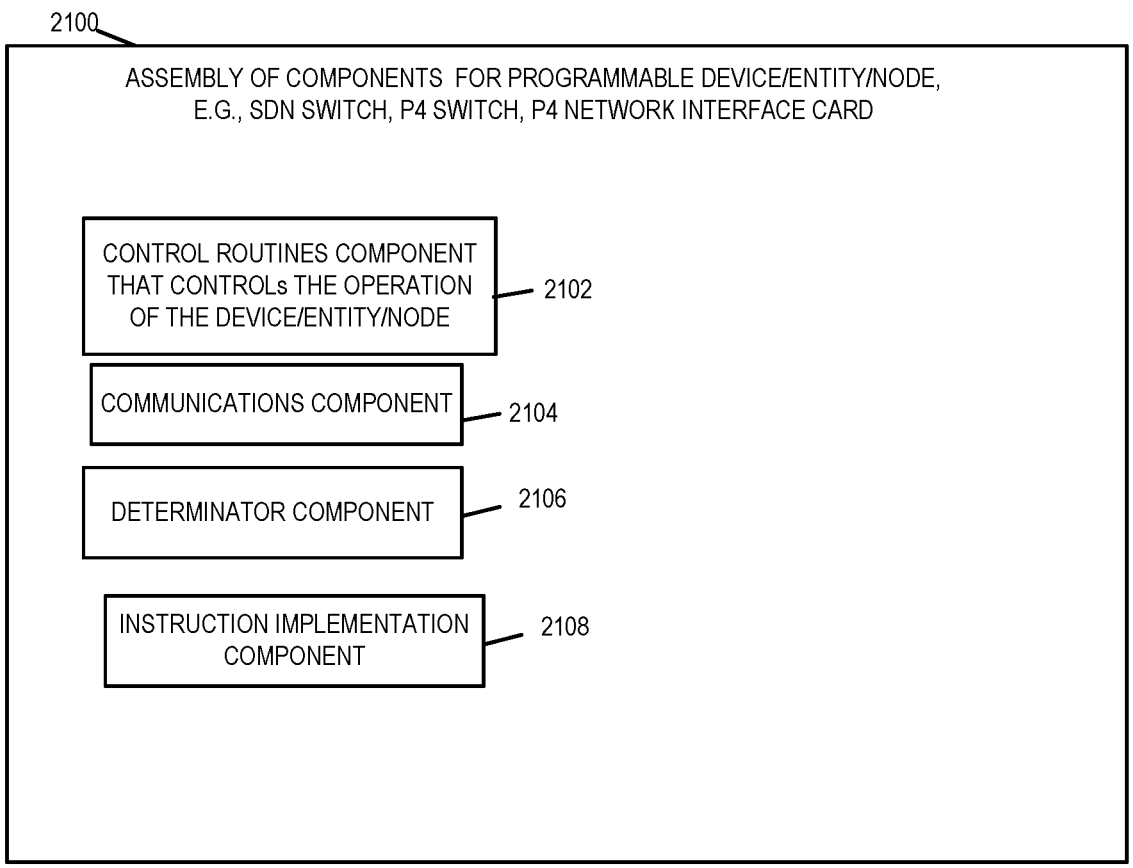
FIG. 21 illustrates an exemplary assembly of components for a programmable node, element or device in accordance with an embodiment of the present invention.

FIG. 21 is a drawing illustrating an assembly of components 2100 which may be included in a programmable node/entity/device 1300 of FIG. 13 implemented in accordance with an exemplary embodiment of the present invention. Assembly of components 2100 may be, and in some embodiments is, used in computing device/entity/node 1300. The components in the assembly of components 2100 can, and in some embodiments are, implemented fully in hardware within the processor 1306, e.g., as individual circuits. The components in the assembly of components 2100 can, and in some embodiments are, implemented fully in hardware within the assembly of components 1319, e.g., as individual circuits corresponding to the different components. In other embodiments some of the components are implemented, e.g., as circuits, within the processor 1306 with other components being implemented, e.g., as circuits within assembly of components 1319, external to and coupled to the processor 1306. As should be appreciated the level of integration of components on the processor and/or with some components being external to the processor may be one of design choice. Alternatively, rather than being implemented as circuits, all or some of the components may be implemented in software and stored in the memory 1310 of the computing node/entity/device 1300, with the components controlling operation of computing node/entity/device 1300 to implement the functions corresponding to the components when the components are executed by a processor, e.g., processor 1306. In some such embodiments, the assembly of components 2100 is included in the memory 1310 as assembly of components 1318. In still other embodiments, various components in assembly of components 1300 are implemented as a combination of hardware and software, e.g., with another circuit external to the processor providing input to the processor 1306 which then under software control operates to perform a portion of a component's function. While shown in the FIG. 13 embodiment as a single processor, e.g., computer, it should be appreciated that the processor 1306 may be implemented as one or more processors, e.g., computers.

When implemented in software the components include code, which when executed by the processor 1306, configure the processor 1306 to implement the function corresponding to the component. In embodiments where the assembly of components 2100 is stored in the memory 1310, the memory 1310 is a computer program product comprising a computer readable medium comprising code, e.g., individual code for each component, for causing at least one computer, e.g., processor 1306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 21—control and/or configure the computing node/entity/device 1300 or elements therein such as the processor 1306, to perform the functions of corresponding steps illustrated and/or described in the methods of flowchart of FIG. 20 and/or described with respect to any of the Figures or embodiments described herein. Thus, the assembly of components 1300 includes various components that perform functions of corresponding steps of FIG. 20.

Assembly of components 2100 includes components 2102, 2104, 2106, and 2108. The control routines component 2102 is configured to control the operation of the node/entity/device. The communications component 2104 is configured to provide communications functionality including communications signaling and support for various communications protocols and interfaces. The determinator component 2106 makes determinations for node/entity/device for example when the entity is a P4, the determinator component determines, among other things, one or more which media packet stream to implement the operations/functions of the programmed micro-service on. The instruction implementation component 2108 is configured to implement or execute instructions sent or installed into the entity/node/device, e.g., P4 programming instructions or P4Runtime code on P4 enabled programmable devices and SDN control instructions, e.g., Openflow instructions on SDN switches, e.g., Openflow switches.

Figure 23:
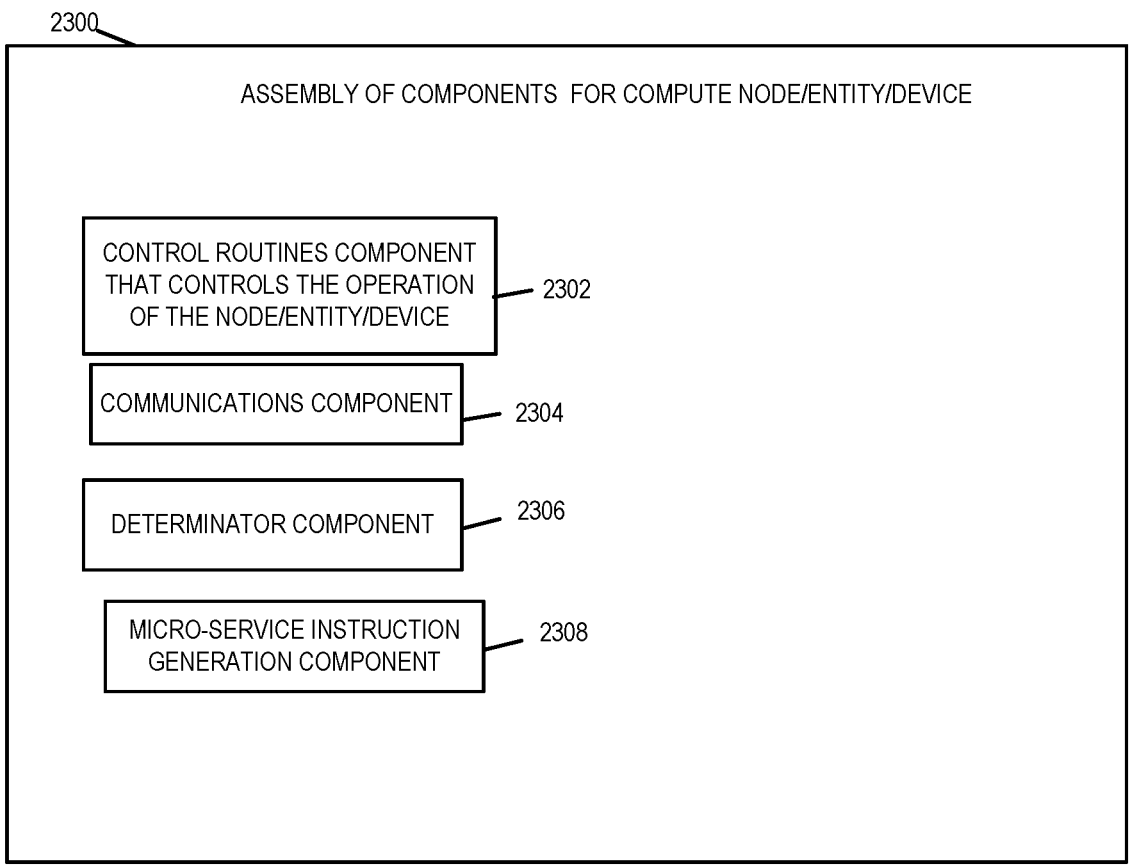
FIG. 23 illustrates an exemplary assembly of components for a compute node, entity, or device.

FIG. 23 is a drawing illustrating an assembly of components 2300 which may be included in a computing node/entity/device 2200 of FIG. 22 implemented in accordance with exemplary embodiment of the present invention. Assembly of components 2300 may be, and in some embodiments is, used in computing device/entity/node 2200. The components in the assembly of components 2300 can, and in some embodiments are, implemented fully in hardware within the processor 2206, e.g., as individual circuits. The components in the assembly of components 2300 can, and in some embodiments are, implemented fully in hardware within the assembly of components 2219, e.g., as individual circuits corresponding to the different components. In other embodiments some of the components are implemented, e.g., as circuits, within the processor 2206 with other components being implemented, e.g., as circuits within assembly of components 2219, external to and coupled to the processor 2206. As should be appreciated the level of integration of components on the processor and/or with some components being external to the processor may be one of design choice. Alternatively, rather than being implemented as circuits, all or some of the components may be implemented in software and stored in the memory 2210 of the computing node/entity/device 2200, with the components controlling operation of computing node/entity/device 2200 to implement the functions corresponding to the components when the components are executed by a processor, e.g., processor 2206. In some such embodiments, the assembly of components 2300 is included in the memory 2210 as assembly of components 2218. In still other embodiments, various components in assembly of components 2200 are implemented as a combination of hardware and software, e.g., with another circuit external to the processor providing input to the processor 2206 which then under software control operates to perform a portion of a component's function. While shown in the FIG. 22 embodiment as a single processor, e.g., computer, it should be appreciated that the processor 2206 may be implemented as one or more processors, e.g., computers.

When implemented in software the components include code, which when executed by the processor 2206, configure the processor 2206 to implement the function corresponding to the component. In embodiments where the assembly of components 2300 is stored in the memory 2210, the memory 2210 is a computer program product comprising a computer readable medium comprising code, e.g., individual code for each component, for causing at least one computer, e.g., processor 2206, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 23 control and/or configure the computing node/entity/device 2300 or elements therein such as the processor 2206, to perform the functions of corresponding steps illustrated and/or described in the methods of flowchart of FIG. 20 and/or described with respect to any of the Figures or embodiments described herein. Thus, the assembly of components 2300 includes various components that perform functions of corresponding steps of FIG. 20.

Assembly of components 2300 includes components 2302, 2304, 2306, and 2308. Not all components in the assembly of components need to be implemented in a particular device. The particular components implemented depends on the device in which they are included. The control routines component 2302 is configured to control the operation of the node/entity/device. The communications component 2304 is configured to provide communications functionality including communications signaling and support for various communications protocols and interfaces. The determinator component 2306 makes determinations for node/entity/device for example when the entity is a packet plane control service entity, the determinator component determines, among other things, one or more entities under its control that can be used to implement a requested micro-service. The micro-service instruction generation component 2308 is configured to generate instructions for one or more devices, e.g., P4 programming instructions or P4Runtime code, which when executed on a P4 enabled device performs functions to implement a micro-service, e.g., a media micro-service such as for example transcoding of media of packet stream.

Various exemplary numbered embodiments illustrating different features of the present invention will now be discussed.

List of Exemplary Numbered Method Embodiments

Method Embodiment 1. A communications method comprising: receiving by a packet plane control service entity a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; generating instructions, by the packet plane control service entity, for one or more entities under the control of the packet plane control service entity to implement the requested one or more micro-services on the media packet stream; communicating, by the packet plane control service entity, the generated instructions to the one or more entities under the control of the packet plane service control entity to implement the requested one or more micro-services on the media packet stream.

Method Embodiment 1A. The communications method of Method Embodiment 1 further comprising: advertising by the packet plane control service entity the types of micro-services, the packet plane control service can implement to the S-SBC.

Method Embodiment 1B. The communications method of Method Embodiment 1, wherein said one or more entities under the control of the packet plane control service entity includes: one or more Software Defined Networking (SDN) controllers, one or more programmable switches, and one or more programmable network interface cards.

Method Embodiment 1C. The communications method of Method Embodiment 1B, wherein said one or more programmable switches are P4 switches; and wherein said one or more programmable network interface cards are P4 enabled network interface cards.

Method Embodiment 1D. The communications method of Method Embodiment 1C, wherein each of said one or more SDN controllers control one or more programmable switches, each of said one or more programmable switches being either a SDN switch, a P4 switch, or an enhanced SDN switch with both SDN capabilities and P4 capabilities.

Method Embodiment 1E. The communications method of Method Embodiment 1D, wherein each of the one or more programmable switches controlled by one of the one or more SDN controllers is not also controlled by another SDN controller.

Method Embodiment 1F. The communications method of Method Embodiment 1D, wherein said one or more SDN controllers include a first SDN controller controlling a first SDN switch located in a first Internet Protocol address domain and a second SDN controller controlling a second SDN switch located in a second domain.

Method Embodiment 2. The method of Method Embodiment 1 further comprising: prior to generating said instructions, determining, by the packet plane control service entity, (i) which of the one or more entities under the control of the packet plane control service entity can implement the requested one or more micro-services on the media packet stream or (ii) which combination of the one or more entities under the control of the packet plane control service entity can implement the requested one or more micro-services on the media packet stream.

Method Embodiment 2A. The method of Method Embodiment 2 further comprising: sending to the S-SBC a first IP address and port number for sending packets of the media packet stream upon which the one or more micro-services is to be performed; and sending to the S-SBC a second IP address and port number from which the packets of the media packet stream upon which the one or more micro-services has been performed will be egressed.

Method Embodiment 2B. The method of Method Embodiment 2A wherein the first micro-service is a service which cannot be performed by an Openflow SDN switch.

Method Embodiment 2C. The communications method of Method Embodiment 2A, wherein the first micro-service includes one of the following: (i) a media digit detection and reporting service; (ii) a media manipulation service (e.g., media transcoding operation); (iii) a Real-time Transport Protocol (RTP) payload type interworking service; (iv) a RTP sequence number manipulation service; (v) a RTP SSRC manipulation service (i.e., a service that modifies a RTP packet Synchronization Source (SSRC) Identifier in the RTP packet's header); (vi) reporting RTP statistics services; (vii) reporting Real-time Transport Control Protocol (RTCP) statistics service; (viii) a flow identification based on QUIC connection-id service; or (ix) performing an action service on an Internet Protocol (IP) packet or a portion of an IP packet based on a regular expression match on a payload of the IP packet (e.g., dropping an IP packet which has an IP payload which matches a particular expression or matching criteria).

Method Embodiment 3. A communications method comprising: receiving by a packet plane control service entity a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; determining, by the packet plane control service entity, whether the first micro-service can be implemented by one or more programmable switches being controlled by a first SDN controller; and in response to determining that the first micro-service can not be implemented by one or more programmable switches being controlled by the first SDN controller, determining whether the first micro-service can be implemented by a first programmable switch not controlled by the first SDN controller.

Method Embodiment 4. The communications method of Method Embodiment 3 further comprising: in response to determining that the first micro-service can be implemented by a programmable switch not controlled by the SDN controller, operating the packet plane control service entity to: (i) generate instructions to control the first programmable switch to implement the first micro-service; and (ii) send the generated instructions to the first programmable switch.

Method Embodiment 5. The communications method of Method Embodiment 4 further comprising: generating instructions, by the packet plane control service entity, to control the first SDN controller to establish a flow through one or more programmable switches (e.g., SDN switches) to route packets of the media packet stream to the first programmable switch; and communicating to the first SDN controller said generated instructions to control the first SDN controller.

Method Embodiment 5A. The communications method of Method Embodiment 5, wherein said generated instructions to control the first SDN controller include instructions to generate a flow path for the media packet stream from an ingress peer Internet Protocol address and port number to an Internet Protocol address and port number of the first programmable switch, said ingress peer Internet Protocol address and port number being part of the media packet stream information provided by the S-SBC to the packet plane control service entity.

Method Embodiment 5B. The communications method of Method Embodiment 5A, wherein the Internet Protocol address and port number of the first programmable switch is provided to the packet plane control service entity by the first programmable switch in response to receiving the instructions communicated from the packet plane control service entity.

Method Embodiment 5C. The communication method of Method Embodiment 5B further comprising: sending, by the packet plane control service entity, an ingress IP address and port number of a programmable switch controlled by the first SDN controller to the S-SBC to which packets of the media packet stream are to be directed; and sending, by the packet plane control service entity, an egress IP address and port number of the first programmable switch from which packets of the media packet stream will be egressed after the first programmable switch has performed the first micro-service on the packets.

Method Embodiment 5D. The communication method of Method Embodiment 5A further comprising: sending, by the packet plane control service entity, an ingress IP address and port number of a programmable switch controlled by the first SDN controller to the S-SBC to which packets of the media packet stream are to be directed; and sending, by the packet plane control service entity, an egress IP address and port number of the first programmable switch from which packets of the media packet stream will be egressed after the first programmable switch has performed the first micro-service on the packets.

Method Embodiment 5D1. The communications method of Method Embodiment 5D, wherein said egress IP address and port number of the first programmable switch from which packets of the media packet stream will be egressed after the first programmable switch has performed the first micro-service on the packets is determined by the packet plane control service entity.

Method Embodiment 5D2. The communications method of Method Embodiment 5D1, wherein said determination of the egress IP address and port number of the first programmable switch by the packet plane control service entity is based on information about the first programmable switch maintained by the packet plane control service entity.

Method Embodiment 5D3. The communications method of Method Embodiment 5D2, wherein said determination of the egress IP address and port number of the first programmable switch is made as part of generating instructions to be sent to the first programmable switch.

Method Embodiment 6. The communications method of Method Embodiment 5 further comprising: prior to generating said instructions to control the first SDN controller, determining, by the packet plane control service entity, whether data packets of the media packet stream need to be routed through one or more programmable switches controlled by the first SDN controller (e.g., SDN switches which do not have the capability to perform the first micro-service) to reach the first programmable switch (e.g., the originating device of the media stream is connected or coupled to SDN switches in a first IP domain controlled by the first SDN controller and the first programmable switch is in a second IP domain, packet plane control service being able to send instructions to control the SDN controller in the first IP domain as well as being able to send instructions to the first programmable switch to control its operations in the second IP domain), and performing said operation of generating said instructions to control the first SDN control in response to determining that the data packets of the media packet stream need to be routed through one or more programmable switches controlled by the first SDN controller to reach the first programmable switch.

Method Embodiment 7. The communications method of Method Embodiment 4, wherein the generated instructions to control the first programmable switch to implement the first micro-service include said media stream identification information.

Method Embodiment 7A. The communications method of Method Embodiment 4, wherein the generated instructions to control the first programmable switch further include instructions on a first IP address and port number of the first programmable switch on which the media packet stream is to be received and a second IP address and port number of the first programmable switch from which packets of the media packet stream are to be egressed after the micro-service has been implemented on the packets of the media packet stream.

Method Embodiment 8. The communications method of Method Embodiment 7, wherein said programmable switch is a Programming Protocol-Independent Packet Processors (P4) switch.

Method Embodiment 9. The communications method of Method Embodiment 8, wherein said instructions define the micro-service operations to be performed by the first programmable switch.

Method Embodiment 10. The communications method of Method Embodiment 9, wherein the first micro-service includes one of the following: (i) a media digit detection and reporting service; (ii) a media manipulation service [e.g., a transcoding operation]; (iii) a Real-time Transport Protocol (RTP) payload type interworking service; (iv) a RTP sequence number manipulation service; (v) a RTP SSRC manipulation service; (vi) reporting RTP statistics service; (vii) reporting RTCP statistics service; (viii) a flow identification based on QUIC connection-id service; or (ix) performing an action service on an Internet Protocol (IP) packet or a portion of an IP packet based on a regular expression match on a payload of the IP packet (e.g., dropping an IP packet which has an IP payload which matches a particular expression or matching criteria).

Method Embodiment 11. The communications method of Method Embodiment 3, wherein the packet plane control service entity is an application implemented on a first virtual machine executing on a first compute node in a cloud.

Method Embodiment 11A. The communications method of Method Embodiment 3, wherein the packet plane control service entity is an application implemented on a first container executing on a first compute node in a cloud.

Method Embodiment 12. The communications method of Method Embodiment 11, wherein the S-SBC is an application implemented on a second virtual machine executing on the first compute node.

Method Embodiment 12A. The communications method of Method Embodiment 11A, wherein the S-SBC is an application implemented on a second container executing on a second compute node.

Method Embodiment 13. The communications method of Method Embodiment 8, wherein the generated instructions are P4Runtime instructions which are executed during runtime by the first programmable switch to implement the first micro-service on the media packet stream.

Method Embodiment 14. The communications method of Method Embodiment 3 further comprising: receiving, at the packet plane control service entity, information about the capabilities of the first SDN controller and the programmable switches controlled by the first SDN controller prior to determining, by the packet plane control service entity, whether the first micro-service can be implemented by one or more programmable switches being controlled by a first SDN controller.

Method Embodiment 15. The communications method of Method Embodiment 3 further comprising: receiving at the S-SBC prior to sending said request for said one or more micro-services to said packet plane control service entity, session initiation negotiation messages for initiating a session including the media packet stream between a first device and a second device, said session initiation negotiation messages including media stream identification information.

Method Embodiment 15A. The communications method of Method Embodiment 15, wherein the session initiation negotiation messages are Session Initiation Protocol (SIP) messages including SDP messages.

Method Embodiment 16. The communications method of Method Embodiment 15, wherein the session initiation negotiation messages include a Session Description Protocol (SDP) Offer message from the first device and a SDP answer message from the second device.

Method Embodiment 17. The communications method of Method Embodiment 16, wherein said session initiation negotiation information includes a first Internet Protocol address and port number to be used by the first device for the media packet stream, a second Internet Protocol address and port number to be used by the second device for the media packet stream and the transport protocol to be used for the media stream.

List of Exemplary Numbered System Embodiments

System Embodiment 1. A communications system comprising: a packet plane control service entity including: memory; and a processor, said processor controlling the packet plane control service entity to perform the following operations: receive, by a packet plane control service entity, a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; generate instructions, by the packet plane control service entity, for one or more entities under the control of the packet plane control service entity to implement the requested one or more micro-services on the media packet stream; communicate, by the packet plane control service entity, the generated instructions to the one or more entities under the control of the packet plane control service entity to implement the requested one or more micro-services on the media packet stream.

System Embodiment 1A. The communications system of System Embodiment 1 wherein the processor further controls the packet plane control service entity to perform the following additional operation: advertise by the packet plane control service entity the types of micro-services, the packet plane control service can implement to the S-SBC.

System Embodiment 1B. The communications system of System Embodiment 1, wherein said one or more entities under the control of the packet plane control service entity includes: one or more Software Defined Networking (SDN) controllers, one or more programmable switches, and one or more programmable network interface cards.

System Embodiment 1C. The communications system of System Embodiment 1B, wherein said one or more programmable switches are P4 switches; and wherein said one or more programmable network interface cards are P4 enabled network interface cards.

System Embodiment 1D. The communications system of System Embodiment 1C, wherein each of said one or more SDN controllers control one or more programmable switches, each of said one or more programmable switches being either a SDN switch, a P4 switch, or an enhanced SDN switch with both SDN capabilities and P4 capabilities.

System Embodiment 1E. The communications system of System Embodiment 1D, wherein each of the one or more programmable switches controlled by one of the one or more SDN controllers is not also controlled by another SDN controller.

System Embodiment 1F. The communications system of System Embodiment 1D, wherein said one or more SDN controllers include a first SDN controller controlling a first SDN switch located in a first Internet Protocol address domain and a second SDN controller controlling a second SDN switch located in a second domain.

System Embodiment 2. The communications system of System Embodiment 1, wherein the processor further controls the packet plane control service entity to perform the following additional operation prior to generating said instructions: determining, by the packet plane control service entity, (i) which of the one or more entities under the control of the packet plane control service entity can implement the requested one or more micro-services on the media packet stream or (ii) which combination of the one or more entities under the control of the packet plane control service entity can implement the requested one or more micro-services on the media packet stream.

System Embodiment 2A. The communications system of System Embodiment 2, wherein the processor further controls the packet plane control service entity to perform the following additional operations: send to the S-SBC a first IP address and port number for sending packets of the media packet stream upon which the one or more micro-services is to be performed; and send to the S-SBC a second IP address and port number from which the packets of the media packet stream upon which the one or more micro-services has been performed will be egressed.

System Embodiment 2B. The communications system of System Embodiment 2A wherein the first micro-service is a service which cannot be performed by an Openflow SDN switch.

System Embodiment 2C. The communications system of System Embodiment 2A, wherein the first micro-service includes one of the following: (i) a media digit detection and reporting service; (ii) a media manipulation service (e.g., media transcoding operation); (iii) a Real-time Transport Protocol (RTP) payload type interworking service; (iv) a RTP sequence number manipulation service; (v) a RTP SSRC manipulation service; (vi) reporting RTP statistics service; (vii) reporting RTCP statistics service; (viii) a flow identification based on QUIC connection-id service; or (ix) performing an action service on an Internet Protocol (IP) packet or a portion of an IP packet based on a regular expression match on a payload of the IP packet (e.g., dropping an IP packet which has an IP payload which matches a particular expression or matching criteria).

System Embodiment 3. A communications system comprising: a Signaling-Session Border Controller; and a packet plane control service entity including: memory; and a processor, said processor controlling the packet plane control service entity to perform the following operations: receiving by a packet plane control service entity a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; determining, by the packet plane control service entity, whether the first micro-service can be implemented by one or more programmable switches being controlled by a first SDN controller; and in response to determining that the first micro-service can not be implemented by one or more programmable switches being controlled by the first SDN controller, determining whether the first micro-service can be implemented by a first programmable switch not controlled by the first SDN controller.

System Embodiment 4. The communications system of System Embodiment 3 wherein said processor further controls the packet plane control service to perform the following additional operations: in response to determining that the first micro-service can be implemented by a programmable switch not controlled by the SDN controller: (i) generate instructions to control the first programmable switch to implement the first micro-service; and (ii) send the generated instructions to the first programmable switch.

System Embodiment 5. The communications system of System Embodiment 4 wherein said processor further controls the packet plane control service to perform the following additional operations: generate instructions, by the packet plane control service entity, to control the first SDN controller to establish a flow through one or more programmable switches (e.g., SDN switches) to route packets of the media packet stream to the first programmable switch; and communicate to the first SDN controller said generated instructions to control the first SDN controller.

System Embodiment 5A. The communications system of System Embodiment 5, wherein said generated instructions to control the first SDN controller include instructions to generate a flow path for the media packet stream from an ingress peer Internet Protocol address and port number to an Internet Protocol address and port number of the first programmable switch, said ingress peer Internet Protocol address and port number being part of the media packet stream information provided by the S-SBC to the packet plane control service entity.

System Embodiment 5B. The communications system of System Embodiment 5A, wherein the Internet Protocol address and port number of the first programmable switch is provided to the packet plane control service entity by the first programmable switch in response to receiving the instructions communicated from the packet plane control service entity.

System Embodiment 5C. The communication system of System Embodiment 5B wherein said processor further controls the packet plane control service entity to perform the following additional operations: send, by the packet plane control service entity, an ingress IP address and port number of a programmable switch controlled by the first SDN controller to the S-SBC to which packets of the media packet stream are to be directed; and send, by the packet plane control service entity, an egress IP address and port number of the first programmable switch from which packets of the media packet stream will be egressed after the first programmable switch has performed the first micro-service on the packets.

System Embodiment 5D. The communication system of System Embodiment 5A, wherein said processor further controls the packet plane control service entity to perform the following additional operations: send, by the packet plane control service entity, an ingress IP address and port number of a programmable switch controlled by the first SDN controller to the S-SBC to which packets of the media packet stream are to be directed; and send, by the packet plane control service entity, an egress IP address and port number of the first programmable switch from which packets of the media packet stream will be egressed after the first programmable switch has performed the first micro-service on the packets.

System Embodiment 5D1. The communications system of System Embodiment 5D, wherein said egress IP address and port number of the first programmable switch from which packets of the media packet stream will be egressed after the first programmable switch has performed the first micro-service on the packets is determined by the packet plane control service entity.

System Embodiment 5D2. The communications system of System Embodiment 5D1, wherein said determination of the egress IP address and port number of the first programmable switch by the packet plane control service entity is based on information about the first programmable switch maintained by the packet plane control service entity.

System Embodiment 5D3. The communications system of System Embodiment 5D2, wherein said determination of the egress IP address and port number of the first programmable switch is made as part of generating instructions to be sent to the first programmable switch.

System Embodiment 6. The communications system of System Embodiment 5, wherein said processor further controls the packet plane control service entity to perform the following additional operations: prior to generating said instructions to control the first SDN controller, determining, by the packet plane control service entity, whether data packets of the media packet stream need to be routed through one or more programmable switches controlled by the first SDN controller (e.g., SDN switches which do not have the capability to perform the first micro-service) to reach the first programmable switch (e.g., the originating device of the media stream is connected or coupled to SDN switches in a first IP domain controlled by the first SDN controller and the first programmable switch is in a second IP domain, packet plane control service being able to send instructions to control the SDN controller in the first IP domain as well as being able to send instructions to the first programmable switch to control its operations in the second IP domain), and performing said operation of generating said instructions to control the first SDN control in response to determining that the data packets of the media packet stream need to be routed through one or more programmable switches controlled by the first SDN controller to reach the first programmable switch.

System Embodiment 7. The communications system of System Embodiment 4, wherein the generated instructions to control the first programmable switch to implement the first micro-service include said media stream identification information.

System Embodiment 7A. The communications system of System Embodiment 4, wherein the generated instructions to control the first programmable switch further include instructions on a first IP address and port number of the first programmable switch on which the media packet stream is to be received and a second IP address and port number of the first programmable switch from which packets of the media packet stream are to be egressed after the micro-service has been implemented on the packets of the media packet stream.

System Embodiment 8. The communications system of System Embodiment 7, wherein said programmable switch is a Programming Protocol-Independent Packet Processors (P4) switch.

System Embodiment 9. The communications system of System Embodiment 8, wherein said instructions define the micro-service operations to be performed by the first programmable switch.

System Embodiment 10. The communications system of System Embodiment 9, wherein the first micro-service includes one of the following: (i) a media digit detection and reporting service; (ii) a media manipulation service [e.g., a transcoding operation]; (iii) a Real-time Transport Protocol (RTP) payload type interworking service; (iv) a RTP sequence number manipulation service; (v) a RTP SSRC manipulation service; (vi) reporting RTP statistics service; (vii) reporting RTCP statistics service; (viii) a flow identification based on QUIC connection-id service; or (ix) performing an action service on an Internet Protocol (IP) packet or a portion of an IP packet based on a regular expression match on a payload of the IP packet (e.g., dropping an IP packet which has an IP payload which matches a particular expression or matching criteria).

System Embodiment 11. The communications system of System Embodiment 3, wherein the packet plane control service entity is an application implemented on a first virtual machine executing on a first compute node in a cloud.

System Embodiment 11A. The communications system of System Embodiment 3, wherein the packet plane control service entity is an application implemented on a first container executing on a first compute node in a cloud.

System Embodiment 12. The communications system of System Embodiment 11, wherein the S-SBC is an application implemented on a second virtual machine executing on the first compute node.

System Embodiment 12A. The communications system of System Embodiment 11A, wherein the S-SBC is an application implemented on a second container executing on a second compute node.

System Embodiment 13. The communications system of System Embodiment 8, wherein the generated instructions are P4Runtime instructions which are executed during runtime by the first programmable switch to implement the first micro-service on the media packet stream.

System Embodiment 14. The communications system of System Embodiment 3, wherein the processor further controls the packet plane control service entity to perform the following additional operations: receive, at the packet plane control service entity, information about the capabilities of the first SDN controller and the programmable switches controlled by the first SDN controller prior to determining, by the packet plane control service entity, whether the first micro-service can be implemented by one or more programmable switches being controlled by a first SDN controller.

System Embodiment 15. The communications system of System Embodiment 3, wherein the S-SBC receives session initiation negotiation messages for initiating a session including the media packet stream between a first device and a second device, said session initiation negotiation messages including media stream identification information, said session initiation negotiation messages being received prior to the S-SBC sending said request for said one or more micro-services to said packet plane control service entity, System Embodiment 15A. The communications system of System Embodiment 15, wherein the session initiation negotiation messages are Session Initiation Protocol (SIP) messages including SDP messages.

System Embodiment 16. The communications system of System Embodiment 15, wherein the session initiation negotiation messages include a Session Description Protocol (SDP) Offer message from the first device and a SDP answer message from the second device.

System Embodiment 17. The communications system of System Embodiment 16, wherein said session initiation negotiation information includes a first Internet Protocol address and port number to be used by the first device for the media packet stream, a second Internet Protocol address and port number to be used by the second device for the media packet stream and the transport protocol to be used for the media stream.

List of Exemplary Numbered Non-transitory
Computer Readable Medium Embodiments

Non-transitory Computer Readable Medium Embodiment 1. A non-transitory computer readable medium including processor executable instructions which when executed by a processor included in a packet plane control service entity control the packet plane control service entity to: receive a request from a Signaling SBC (S-SBC) to implement one or more micro-services on a media packet stream (e.g., RTP or RTCP packet stream), said request including information about the media packet stream, said information about the media packet stream including media packet stream identification information, said one or more micro-services including a first micro-service; generate instructions for one or more entities under the control of the packet plane control service entity to implement the requested one or more micro-services on the media packet stream; communicate the generated instructions to the one or more entities under the control of the packet plane control service entity to implement the requested one or more micro-services on the media packet stream.

While the invention has been described in connection with various implementations including the use of virtual machine(s), virtual network function(s), and/or virtual network function manager(s), the invention may be, and in some embodiment is, implemented using container(s), container network function(s) and/or a combination of virtual machine(s), virtual network function(s), virtual network function manager(s), container(s) and/or container network function(s). As one of skill in the art will appreciate a virtual machine is a virtualization or emulation of a computer system at the hardware level and includes its own guest operating system. Containers unlike virtual machines do not virtualize the computer system at the hardware level but just the operating system (OS) level. In various embodiments, containers are implemented on top of a physical server and its host OS. Each container shares the host OS kernel and typically other OS resources such as for example binaries and libraries. Containers are normally lightweight, require less memory, and are much faster than virtual machines. However, containers may not provide the same level of security as virtual machines which are fully isolated. In some embodiments, where the invention is described as using a virtual machine a container is used in place of the virtual machine. In some embodiments, where the invention is described as using a virtual network function a container network function is used in place of the virtual network function.

The techniques of various embodiments may be implemented using software, hardware and/or a combination of software and hardware. Various embodiments are directed to apparatus, e.g., signaling session border controllers, controllers including SDN controllers, packet plane control service entity, switches including SDN switches, P4 switches, P4 network interface cards, telecommunications systems, network nodes, compute nodes, and/or network equipment devices. Various embodiments are also directed to methods, e.g., method of controlling and/or operating devices, signaling session border controllers, user devices, P4 devices, P4 switches, P4 network interface cards, OpenFlow switches, SDN switches, SDN controllers, enhanced SDN switches with P4 or PISA capabilities, real-time communications entities, packet plane control service entity, telecommunications systems, network nodes, compute nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., signaling session border controller, switch, packet plane control service device, network interface card or controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., signaling session border controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a signaling session border controller, with a processor which includes a component corresponding to each of the steps of the various described methods performed by the device in which the processor is included. In some but not all embodiments a device, e.g., communications node such as a packet plane control service entity or a signaling session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a packet plane control service entity, programmable switch, a session border controller, controller, SDN controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a packet plane control service entity, a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
advertising, by a packet plane control service entity, types of micro-services the packet plane control service entity can implement to a Signaling-Session Border Controller (S-SBC);
receiving, by the packet plane control service entity, a request from the S-SBC to implement a first micro-service on a media packet stream, said first micro-service being one of the advertised types of micro-services the packet plane control service entity can implement, said request including information about the media packet stream, said information about the media packet stream including media packet stream identification information;
generating instructions, by the packet plane control service entity, for one or more entities under the control of the packet plane control service entity to implement the requested first micro-service on the media packet stream, said one or more entities under the control of the packet plane control service entity including one or more programmable network interface cards; and
communicating, by the packet plane control service entity, the generated instructions to the one or more entities under the control of the packet plane control service entity to implement the requested first micro-service on the media packet stream.

2. The communications method of claim 1, wherein the types of micro-services the packet plane control service entity advertises to the S-SBC includes:
(i) a media digit detection and reporting service;
(ii) a media manipulation service;
(iii) a Real-time Transport Protocol (RTP) payload type interworking service;
(iv) a RTP sequence number manipulation service;
(v) a RTP Synchronization Source (SSRC) manipulation service;
(vi) a reporting RTP statistics service;
(vii) a reporting Real-time Transport Control Protocol (RTCP) statistics service;
(viii) a flow identification based on Quick User Datagram Protocol (UDP) Internet Connections (QUIC) connection-id service; and
(ix) performing an action service on an Internet Protocol (IP) packet or a portion of an IP packet based on a regular expression match on a payload of the IP packet.

3. The communications method of claim 1 further comprising:
prior to generating said instructions, determining, by the packet plane control service entity, (i) which of the one or more entities under the control of the packet plane control service entity can implement the requested first micro-service on the media packet stream or (ii) which combination of the one or more entities under the control of the packet plane control service entity can implement the requested first micro-service on the media packet stream.

4. The communications method of claim 3, further comprising:
when the packet plane control service entity determines that the first micro-service can be implemented by a first programmable network interface card of the one or more programmable network interface cards under the control of the packet plane control service entity, said generating instructions, by the packet plane control service entity, for one or more entities under the control of the packet plane control service entity to implement the requested first micro-service on the media packet stream includes: generating instructions to control the first programmable network interface card to implement the first micro-service; and
wherein communicating, by the packet plane control service entity, the generated instructions to the one or more entities under the control of the packet plane control service entity to implement the requested first micro-service on the media packet stream includes: sending the generated instructions to the first programmable network interface card.

5. The communications method of claim 4, wherein the generated instructions to control the first programmable network interface card to implement the first micro-service include said media packet stream identification information.

6. The communications method of claim 5, wherein said first programmable network interface card is a Programming Protocol-Independent Packet Processors (P4) device.

7. The communications method of claim 6, wherein said instructions define the micro-service operations to be performed by the first programmable network interface card.

8. The communications method of claim 7, wherein the generated instructions are P4Runtime instructions which are executed during runtime by the first programmable network interface card to implement the first micro-service on the media packet stream.

9. The communications method of claim 2, wherein the packet plane control service entity is an application implemented on a first virtual machine executing on a first compute node in a cloud.

10. The communications method of claim 9, wherein the S-SBC is an application implemented on a second virtual machine executing on a second compute node in the cloud.

11. A packet plane control service entity including:
memory; and
a processor, said processor controlling the packet plane control service entity to perform the following operations:
advertising, by the packet plane control service entity, types of micro-services the packet plane control service entity can implement to a Signaling-Session Border Controller (S-SBC);
receiving, by the packet plane control service entity, a request from the S-SBC to implement a first micro-service on a media packet stream, said first micro-service being one of the advertised types of micro-services the packet plane control service entity can implement, said request including information about the media packet stream, said information about the media packet stream including media packet stream identification information;
generating instructions, by the packet plane control service entity, for one or more entities under the control of the packet plane control service entity to implement the requested first micro-service on the media packet stream, said one or more entities under the control of the packet plane control service entity including one or more programmable network interface cards; and
communicating, by the packet plane control service entity, the generated instructions to the one or more entities under the control of the packet plane control service entity to implement the requested first micro-service on the media packet stream.

12. The packet plane control service entity of claim 11, wherein the types of micro-services the packet plane control service entity advertises to the S-SBC includes:

(i) a media digit detection and reporting service;
(ii) a media manipulation service;
(iii) a Real-time Transport Protocol (RTP) payload type interworking service;
(iv) a RTP sequence number manipulation service;
(v) a RTP Synchronization Source (SSRC) manipulation service;
(vi) a reporting RTP statistics service;
(vii) a reporting Real-time Transport Control Protocol (RTCP) statistics service;
(viii) a flow identification based on Quick User Datagram Protocol (UDP) Internet Connections (QUIC) connection-id service; and
(ix) performing an action service on an Internet Protocol (IP) packet or a portion of an IP packet based on a regular expression match on a payload of the IP packet.

13. The packet plane control service entity of claim 11, wherein said processor further controls the packet plane control service entity to perform the following operations:
prior to generating said instructions, determining, by the packet plane control service entity, (i) which of the one or more entities under the control of the packet plane control service entity can implement the requested first micro-service on the media packet stream or (ii) which combination of the one or more entities under the control of the packet plane control service entity can implement the requested first micro-service on the media packet stream.

14. The packet plane control service entity of claim 13, wherein when the packet plane control service entity determines that the first micro-service can be implemented by a first programmable network interface card of the one or more programmable network interface cards under the control of the packet plane control service entity, said generating instructions, by the packet plane control service entity, for one or more entities under the control of the packet plane control service entity to implement the requested first micro-service on the media packet stream includes: generating instructions to control the first programmable network interface card to implement the first micro-service; and
wherein communicating, by the packet plane control service entity, the generated instructions to the one or more entities under the control of the packet plane control service entity to implement the requested first micro-service on the media packet stream includes: sending the generated instructions to the first programmable network interface card.

15. The packet plane control service entity of claim 14, wherein the generated instructions to control the first programmable network interface card to implement the first micro-service include said media packet stream identification information.

16. The packet plane control service entity of claim 15, wherein said first programmable network interface card is a Programming Protocol-Independent Packet Processors (P4) device.

17. The packet plane control service entity of claim 16, wherein said instructions define the micro-service operations to be performed by the first programmable network interface card.

18. The packet plane control service entity of claim 17, wherein the generated instructions are P4Runtime instructions which are executed during runtime by the first programmable network interface card to implement the first micro-service on the media packet stream.

19. A non-transitory computer readable medium including processor executable instructions which when executed by a processor included in a packet plane control service entity control the packet plane control service entity to:
advertise types of micro-services the packet plane control service entity can implement to a Signaling-Session Border Controller (S-SBC);
receive a request from the S-SBC to implement a first micro-service on a media packet stream, said first micro-service being one of the advertised types of micro-services the packet plane control service entity can implement, said request including information about the media packet stream, said information about the media packet stream including media packet stream identification information;
generate instructions for one or more entities under the control of the packet plane control service entity to implement the requested first micro-service on the media packet stream, said one or more entities under the control of the packet plane control service entity including one or more programmable network interface cards; and
communicate the generated instructions to the one or more entities under the control of the packet plane control service entity to implement the requested first micro-service on the media packet stream.

20. The non-transitory computer readable medium of claim 19, wherein the types of micro-services the packet plane control service entity advertises to the S-SBC includes:
(i) a media digit detection and reporting service;
(ii) a media manipulation service;
(iii) a Real-time Transport Protocol (RTP) payload type interworking service;
(iv) a RTP sequence number manipulation service;
(v) a RTP Synchronization Source (SSRC) manipulation service;
(vi) a reporting RTP statistics service;
(vii) a reporting Real-time Transport Control Protocol (RTCP) statistics service;
(viii) a flow identification based on Quick User Datagram Protocol (UDP) Internet Connections (QUIC) connection-id service; and
(ix) performing an action service on an Internet Protocol (IP) packet or a portion of an IP packet based on a regular expression match on a payload of the IP packet.

* * * * *